(12) United States Patent
Kubo et al.

(10) Patent No.: US 7,256,238 B2
(45) Date of Patent: Aug. 14, 2007

(54) MODIFIED BLOCK COPOLYMER

(75) Inventors: Nobuaki Kubo, Kawasaki (JP);
Yasuhiro Kusanose, Yokohama (JP);
Shigeo Nakajima, Fujisawa (JP);
Takaaki Matsuda, Fujisawa (JP);
Shigeki Takayama, Tokyo (JP);
Toshinori Shiraki, Yamato (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 169 days.

(21) Appl. No.: 10/479,754

(22) PCT Filed: Jul. 18, 2002

(86) PCT No.: PCT/JP02/07296

§ 371 (c)(1),
(2), (4) Date: Dec. 4, 2003

(87) PCT Pub. No.: WO03/008466

PCT Pub. Date: Jan. 30, 2003

(65) Prior Publication Data

US 2004/0157994 A1    Aug. 12, 2004

(30) Foreign Application Priority Data

| Jul. 18, 2001 | (JP) | ............... 2001-218658 |
| Aug. 10, 2001 | (JP) | ............... 2001-243776 |
| Oct. 30, 2001 | (JP) | ............... 2001-331967 |
| Jan. 7, 2002 | (JP) | ............... 2002-000827 |
| Jan. 18, 2002 | (JP) | ............... 2002-010384 |
| Apr. 22, 2002 | (JP) | ............... 2002-118700 |

(51) Int. Cl.
*C08L 53/02* (2006.01)

(52) U.S. Cl. .................... 525/88; 525/89; 525/123; 525/128; 525/218; 525/259; 525/296; 525/316

(58) Field of Classification Search ................. 525/88, 525/89, 123, 128, 218, 259, 253, 296, 316
See application file for complete search history.

(56) References Cited

U.S. PATENT DOCUMENTS

| 2,975,160 | A | 3/1961 | Zelinski et al. |
| 3,281,383 | A | 10/1966 | Zelinski et al. |
| 3,333,024 | A | 7/1967 | Haefele et al. |
| 3,639,517 | A | 2/1972 | Kitchen et al. |
| 3,706,814 | A | 12/1972 | Kirsch et al. |
| 4,465,809 | A | 8/1984 | Smith |
| 4,501,857 | A | 2/1985 | Kishimoto et al. |
| 4,603,155 | A | 7/1986 | Muramori et al. |
| 4,673,714 | A | 6/1987 | Kishimoto et al. |
| 4,791,174 | A | 12/1988 | Bronstert et al. |
| 4,816,520 | A | 3/1989 | Bronstert |
| 4,972,023 | A | 11/1990 | Bronstert |
| 4,988,773 | A | 1/1991 | Bronstert |
| 5,064,907 | A | 11/1991 | Bronstert et al. |
| 5,216,074 | A | 6/1993 | Imai et al. |
| 5,332,784 | A | 7/1994 | Shiraki et al. |
| 6,043,315 | A * | 3/2000 | Gottschalk et al. ........ 525/92 B |
| 6,218,478 | B1 | 4/2001 | Bening et al. |
| 2005/0171276 | A1* | 8/2005 | Matsuda et al. ............ 524/572 |

FOREIGN PATENT DOCUMENTS

| EP | 0 260 325 A1 | 3/1988 |
| EP | 0 498 426 A1 | 8/1992 |
| EP | 0 564 050 A2 | 10/1993 |
| EP | 0 842 982 A2 | 5/1998 |
| JP | 43-17979 | 7/1968 |
| JP | 46-32415 | 9/1971 |
| JP | 48-2423 | 1/1973 |
| JP | 63-41547 A | 2/1988 |
| JP | 1-53851 B2 | 11/1989 |
| JP | 2-9041 B2 | 2/1990 |
| JP | 2-60948 A | 3/1990 |
| JP | 4-38777 B2 | 6/1992 |
| JP | 6-322050 A | 11/1994 |
| JP | 7-173390 A | 7/1995 |
| JP | 8-109219 A | 4/1996 |
| JP | 8-127623 A | 5/1996 |
| JP | 2000-119483 A | 4/2000 |
| JP | 2000-219800 A | 8/2000 |
| JP | 2000-302982 A | 10/2000 |
| JP | 2001-55492 A | 2/2001 |
| JP | 2002-201333 A | 7/2002 |
| JP | 2003-183473 A | 7/2003 |

\* cited by examiner

OTHER PUBLICATIONS

Kolthoff et al., Journal of Polymer Science, vol. 1, No. 5, pp. 429-433 (1946).
Coran et al., Rubber Chemistry and Technology, vol. 53, No. 1, pp. 141-150 (1980).

*Primary Examiner*—James J. Seidleck
*Assistant Examiner*—Olga Asinovsky
(74) *Attorney, Agent, or Firm*—Birch, Stewart, Kolasch & Birch, LLP

(57) ABSTRACT

A second-order modified block copolymer which can be obtained by reacting a first-order modified block copolymer with a second-order modifier, wherein the first-order modified block copolymer comprises a base block copolymer and a functional group-containing first-order modifier group bonded to the base block copolymer, wherein the base block copolymer comprises at least one polymer block comprised mainly of vinyl aromatic hydrocarbon monomer units and at least one polymer block comprised mainly of conjugated diene monomer units, and wherein the second-order modifier has a specific functional group which is reactive to the functional group of the first-order modifier group of the first-order modified block copolymer. A second-order modified block copolymer-containing polymer composition comprising the second-order modified block copolymer as well as a thermoplastic resin and/or a rubbery polymer.

9 Claims, No Drawings

MODIFIED BLOCK COPOLYMER

BACKGROUND OF THE INVENTION

1. Field of the Invention

The present invention relates to a modified block copolymer which can be advantageously used for producing a polymer composition which exhibits an excellent balance of stiffness and impact resistance. More particularly, the present invention is concerned with a modified block copolymer (which is hereinafter frequently referred to as "second-order modified block copolymer") which can be obtained by reacting a semimodified (i.e., first-order modified) block copolymer with a second-order modifier having a specific functional group, wherein the semimodified block copolymer comprises a base block copolymer and a functional group-containing first-order modifier group bonded to the base block copolymer, wherein the base block copolymer comprises at least one polymer block comprised mainly of vinyl aromatic hydrocarbon monomer units and at least one polymer block comprised mainly of conjugated diene monomer units. Further, the present invention is also concerned with a second-order modified block copolymer-containing polymer composition which is obtained by adding the above-mentioned second-order modified block copolymer (i.e., modified block copolymer) to a thermoplastic resin and/or a rubbery polymer. The second-order modified block copolymer-containing polymer composition exhibits an excellent balance of stiffness and impact resistance. By injection molding, extrusion molding or the like, this polymer composition containing the second-order modified block copolymer of the present invention can be shaped into various shaped articles. The shaped articles can be advantageously used in various fields, such as the fields of automobile parts (interior and exterior parts for automobiles), various containers (such as food packaging), parts for household electrical appliances, parts for medical equipments, industrial parts, toys and the like.

Furthermore, the present invention is also concerned with a polymer composition comprising the above-mentioned first-order modified block copolymer (i.e., semimodified block copolymer), a thermoplastic resin and/or a rubbery polymer, and the above-mentioned second-order modifier. Also by melt-kneading this polymer composition, the above-mentioned second-order modified block copolymer-containing polymer composition can be obtained.

2. Prior Art

In the fields of sheets, films and other shaped articles which are produced from polymeric materials, there have been made a number of proposals in which there is used a polymer composition or laminate comprising a plurality of types of polymeric materials in order to obtain advantages in that a satisfactory strength is imparted to the sheets, films or the like, or the processability of the sheets, films or the like is improved, or the production cost of the sheets, films or the like is reduced. However, when producing a polymer composition by mixing different polymeric materials together, the number of combinations of different polymeric materials which exhibit good compatibility with each other, is limited. In the case of a polymer composition comprising different polymeric materials which exhibit poor compatibility with each other, a problem is likely to arise in that, due to the poor compatibility, the composition becomes non-homogeneous, and a delamination occurs between layers of different polymeric materials, thus rendering it impossible to obtain a satisfactory improving effect aimed at by using a combination of different polymeric materials.

It is well known that, as a polymeric material for obtaining a composition having excellent properties, there are used a styrene-butadiene block copolymer or a hydrogenation product thereof, and a styrene-isoprene block copolymer or a hydrogenation product thereof. However, since these block copolymers have poor compatibility with polymers having a polar functional group, such as polyamide, polyester and polyurethane, there cannot be obtained a satisfactory improving effect aimed at by using these block copolymers, and hence a useful composition cannot be obtained.

Various proposals have been made for improving the compatibility between a polymer having a polar functional group and a block copolymer selected from the group consisting of a styrene-butadiene block copolymer, a hydrogenation product thereof, a styrene-isoprene block copolymer and a hydrogenation product thereof. For example, Examined Japanese Patent Application Publication No. Hei 4-39495 (corresponding to U.S. Pat. No. 5,332,784) discloses a composition comprising a block copolymer having a modified terminal group and a thermoplastic resin. Unexamined Japanese Patent Application Laid-Open Specification No. Hei 7-173390 discloses a composition comprising a polyamide resin, a graft copolymer comprising a hydrogenated block copolymer having a polyamide grafted thereon, and a hydrogenated block copolymer having bonded thereto a specific amount of an unsaturated carboxylic acid or a derivative thereof. Unexamined Japanese Patent Application Laid-Open Specification No. 2000-219800 discloses a composition comprising a polyester resin, a polyamide resin and an epoxidized block copolymer. Unexamined Japanese Patent Application Laid-Open Specification No. 2001-55492 discloses a composition comprising a polyester resin, an epoxidized block copolymer, a multifunctional compound and a polyether-ester elastomer.

On the other hand, as a method for producing a block copolymer having a functional group, Unexamined Japanese Patent Application Laid-Open Specification No. Sho 59-98106 (corresponding to U.S. Pat. No. 4,465,809) discloses a method for producing a carboxyl group-containing polymer, in which a polymer-alkali metal composition is contacted with an epoxy compound, and the resultant product is directly contacted with a cyclic, acid anhydride, thereby obtaining a carboxyl group-containing polymer. However, such carboxyl group-containing polymer (which has a terminal epoxy compound residue having bonded thereto a cyclic, acid anhydride residue) has poor affinity to a thermoplastic resin and/or a rubbery polymer, an inorganic filler, and the like.

Unexamined Japanese Patent Application Laid-Open Specification No. Sho 63-238107 (corresponding to U.S. Pat. No. 4,972,023) discloses a polymer which is modified with a terminal acid group (or a salt thereof) which is bonded to the polymer through an acid amido group, and discloses a method for producing the modified polymer as well as applications for the modified polymer. This modified polymer is obtained by a method in which the modification is performed using 1,5-diaza-bicylo[3.1.0]-hexane and a derivative thereof and a Schiff base derived from an aliphatic or aromatic amine and aldehiyde. The modified polymer (which is modified with a terminal acid group (or a salt thereof) which is bonded to the polymer through an acid amido group) has poor affinity to a thermoplastic resin and/or a rubbery polymer, an inorganic filler, and the like.

Thus, in the prior art, no composition has been obtained, which comprises a block copolymer comprised of vinyl aromatic hydrocarbon monomer units and conjugated diene monomer units, and a thermoplastic resin and/or a rubbery polymer and which exhibits an excellent balance of stiffness and impact resistance.

SUMMARY OF THE INVENTION

In this situation, the present inventors have made extensive and intensive studies with a view toward solving the above-mentioned problems accompanying the prior art. More specifically stated, studies have been made for improving the properties of a composition which comprises a block copolymer comprised of vinyl aromatic hydrocarbon monomer units and conjugated diene monomer units, and a thermoplastic resin and/or a rubbery polymer. As a result, it has unexpectedly been found that a second-order modified block copolymer can be obtained by reacting a first-order modified block copolymer with a second-order modifier, wherein the first-order modified block copolymer comprises a base block copolymer and a functional group-containing first-order modifier group bonded to the base block copolymer, wherein the base block copolymer comprises at least one polymer block comprised mainly of vinyl aromatic hydrocarbon monomer units and at least one polymer block comprised mainly of conjugated diene monomer units, and wherein the second-order modifier has a specific functional group which is reactive to the functional group of the first-order modifier group of the first-order modified block copolymer. By mixing the obtained second-order modified block copolymer with a thermoplastic resin and/or a rubbery polymer, there can be obtained a second-order modified block copolymer-containing polymer composition which exhibits an excellent balance of stiffness and impact resistance. It has also been found that a second-order modified block copolymer-containing polymer composition exhibiting an excellent balance of stiffness and impact resistance, can alternatively be obtained by melt-kneading a polymer composition comprising the above-mentioned first-order modified block copolymer, a thermoplastic resin and/or a rubbery polymer, and the above-mentioned second-order modifier. It has also been found that, by mixing the second-order modified block copolymer with an appropriate component selected from various components, such as an inorganic filler, a tackifier, and an asphalt, there can be obtained a polymer composition having excellent properties suitable for various application fields, depending on the selected component. Based on these findings, the present invention has been completed.

Accordingly, it is an object of the present invention to provide the above-mentioned second-order modified block copolymer which is advantageous in that, by mixing it with a thermoplastic resin and/or a rubbery polymer, there can be obtained a second-order modified block copolymer-containing polymer composition which exhibits an excellent balance of stiffness and impact resistance.

It is another object of the present invention to provide a polymer composition having excellent properties, which can be obtained by mixing the above-mentioned second-order modified block copolymer with an appropriate component selected from various components, such as an inorganic filler, a tackifier, and an asphalt.

The foregoing and other objects, features and advantages of the present invention will be apparent from the following detailed description and the appended claims.

DETAILED DESCRIPTION OF THE INVENTION

In one aspect of the present invention, there is provided a modified block copolymer comprising:

a base block copolymer comprising at least one polymer block (A) comprised mainly of vinyl aromatic hydrocarbon monomer units and at least one polymer block (B) comprised mainly of conjugated diene monomer units, the amounts of the vinyl aromatic hydrocarbon monomer units and the conjugated diene monomer units in the base block copolymer being, respectively, 5 to 95% by weight and 95 to 5% by weight, based on the total weight of the vinyl aromatic hydrocarbon monomer units and the conjugated diene monomer units, and a functional group-containing modifier group bonded to the base block copolymer, the base block copolymer being unhydrogenated or at least partially hydrogenated, wherein the modified block copolymer is represented by a formula selected from the group consisting of the following formulae (1) to (5):

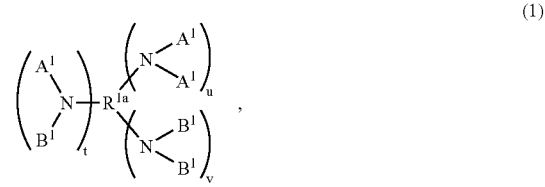

(1)

(2)

$C^1$—$NR^3$-$D^1$, (3)

$C^1$-$D^1$, and (4)

$E^1$-$F^1$ (5)

wherein:

$A^1$ represents a unit which is represented by any one of the following formulae (a) and (b):

(a)

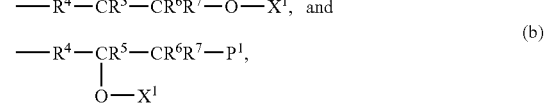

(b)

$B^1$ represents a unit which is represented by any one of the following formulae (c) to (e):

(c)

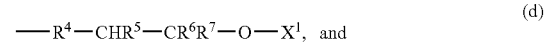

(d)

-continued

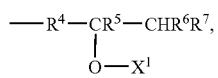 (e)

$C^1$ represents a unit which is represented by any one of the following formulae (f) to (h):

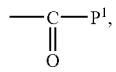 (f)

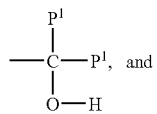 (g)

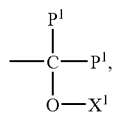 (h)

$D^1$ represents a unit which is represented by the following formula (i):

$$-R^8-NR^3-X^1, \quad (i)$$

$E^1$ represents a unit which is represented by the following formula (j):

$$-R^9-P^1, \text{ and} \quad (j)$$

$F^1$ represents a unit which is represented by any one of the following formulae (k) to (m):

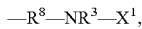 (k)

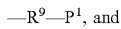 (l)

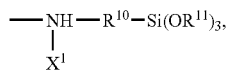 (m)

wherein:

$X^1$ represents a unit which is selected from the group consisting of a unit represented by any one of the below-mentioned formulae (n) to (s) and a unit having an acid anhydride group,

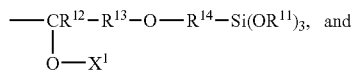 (n)

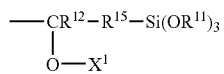 (o)

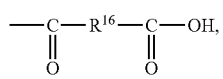 (p)

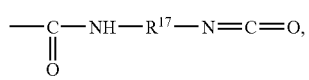 (q)

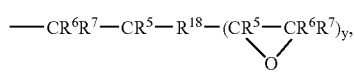 (r)

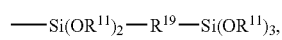 (s)

wherein, in the formulae (1) to (3) and (a) to (s):

N represents a nitrogen atom, Si represents a silicon atom, O represents an oxygen atom, C represents a carbon atom, and H represents a hydrogen atom, $P^1$ represents the base block copolymer, $R^{1a}$ represents a trivalent aliphatic $C_1$-$C_{48}$ hydrocarbon group, each of $R^{1b}$, $R^4$, $R^8$ to $R^{10}$ and $R^{13}$ to $R^{20}$ independently represents a $C_1$-$C_{48}$ alkylene group, each of $R^2$, $R^3$ and $R^{11}$ independently represents a $C_1$-$C_{48}$ alkyl group, a $C_6$-$C_{48}$ aryl group, an alkylaryl group comprised of $C_1$-$C_{48}$ alkyl and $C_6$-$C_{48}$ aryl, an aralkyl group comprised of $C_1$-$C_{48}$ alkyl and $C_6$-$C_{48}$ aryl, or a $C_3$-$C_{48}$ cycloalkyl group, wherein each of $R^{1a}$, $R^{1b}$, $R^3$, $R^4$, $R^8$ to $R^{10}$, $R^{13}$ to $R^{15}$ and $R^{17}$ to $R^{20}$ optionally independently has at least one functional group selected from the group consisting of a hydroxyl group, an epoxy group, an amino group, a silanol group and a $C_1$-$C_{24}$ alkoxysilane group, each of $R^5$ to $R^7$ and $R^{12}$ independently represents a hydrogen atom, a $C_1$-$C_{48}$ alkyl group, a $C_6$-$C_{48}$ aryl group, an alkylaryl group comprised of $C_1$-$C_{48}$ alkyl and $C_6$-$C_{48}$ aryl, an aralkyl group comprised of $C_1$-$C_{48}$ alkyl and $C_6$-$C_{48}$ aryl, or a $C_3$-$C_{48}$ cycloalkyl group, wherein each of $R^{1a}$, $R^{1b}$, $R^2$ to $R^4$ and $R^8$ to $R^{20}$ optionally independently has bonded thereto at least one atom selected from the group consisting of an oxygen atom, a nitrogen atom, a sulfur atom, and a silicon atom, the at least one atom being bonded in a form other than a hydroxyl group, an epoxy group, an amino group, a silanol group and an alkoxysilane group, and each of t, u, v and x is independently an integer of 0 or more, provided that both t and u are not simultaneously 0, and each of w, y, z and α is independently an integer of 1 or more.

For easy understanding of the present invention, the essential features and various preferred embodiments of the present invention are enumerated below.

1. A modified block copolymer comprising:

a base block copolymer comprising at least one polymer block (A) comprised mainly of vinyl aromatic hydrocarbon monomer units and at least one polymer block (B) comprised mainly of conjugated diene monomer units, the amounts of the vinyl aromatic hydrocarbon monomer units and the conjugated diene monomer units in the base block copolymer being, respectively, 5 to 95% by weight and 95 to 5% by weight, based on the total weight of the vinyl aromatic hydrocarbon monomer units and the conjugated diene monomer units, and a functional group-containing modifier group bonded to the base block copolymer, the base block copolymer being unhydrogenated or at least partially hydrogenated, wherein the modified block copolymer is represented by a formula selected from the group consisting of the following formulae (1) to (5):

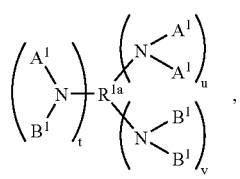

(1)

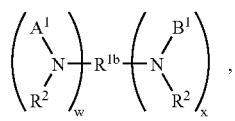

(2)

$C^1-NR^3-D^1$, (3)

$C^1-D^1$, and (4)

$E^1-F^1$ (5)

wherein:

A$^1$ represents a unit which is represented by any one of the following formulae (a) and (b):

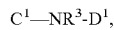 (a)

 (b)

B$^1$ represents a unit which is represented by any one of the following formulae (c) to (e):

—R$^4$—CR$^5$—CR$^6$R$^7$, (c)
   \O/

—R$^4$—CHR$^5$—CR$^6$R$^7$—O—X$^1$, and (d)

 (e)

C$^1$ represents a unit which is represented by any one of the following formulae (f) to (h):

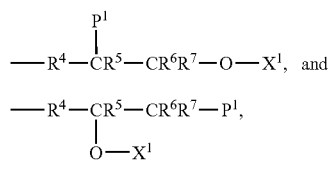

(f), (g)

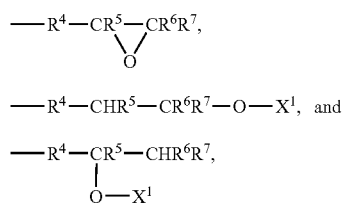

(h)

D$^1$ represents a unit which is represented by the following formula (i):

—R$^8$—NR$^3$—X$^1$, (i)

E$^1$ represents a unit which is represented by the following formula (j):

—R$^9$—P$^1$, and (j)

F$^1$ represents a unit which is represented by any one of the following formulae (k) to (m):

 (k)

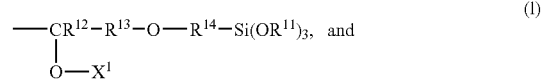 (l)

 (m)

wherein:

X$^1$ represents a unit which is selected from group consisting of a unit represented by any one of the below-mentioned formulae (n) to (s) and a unit having an acid anhydride group,

 (n)

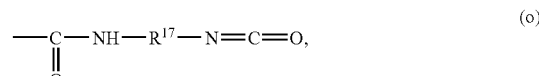 (o)

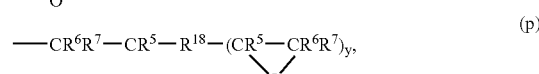 (p)

—Si(OR$^{11}$)$_2$—R$^{19}$—Si(OR$^{11}$)$_3$, (q)

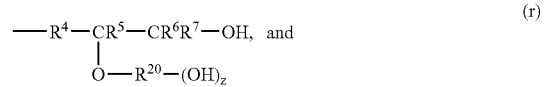 (r)

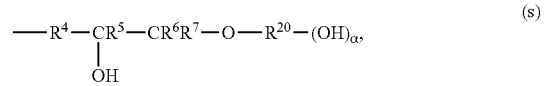 (s)

wherein, in the formulae (1) to (3) and (a) to (s):

N represents a nitrogen atom, Si represents a silicon atom, O represents an oxygen atom, C represents a carbon atom, and H represents a hydrogen atom, P$^1$ represents the base block copolymer, R$^{1a}$ represents a trivalent aliphatic C$_1$-C$_{48}$ hydrocarbon group, each of R$^{1b}$, R$^4$, R$^8$ to R$^{10}$ and R$^{13}$ to R$^{20}$ independently represents a C$_1$-C$_{48}$ alkylene group, each of $R^2$, $R^3$ and $R^{11}$ independently represents a $C_1$-$C_{48}$ alkyl group, a $C_6$-$C_{48}$ aryl group, an alkylaryl group comprised of $C_1$-$C_{48}$ alkyl and $C_6$-$C_{48}$ aryl, an aralkyl group comprised of $C_1$-$C_{48}$ alkyl and $C_6$-$C_{48}$ aryl, or a $C_3$-$C_{48}$ cycloalkyl group, wherein each of $R^{1a}$, $R^{1b}$, $R^3$, $R^4$, $R^8$ to $R^{10}$, $R^{13}$ to $R^{15}$ and $R^{17}$ to $R^{20}$ optionally independently has at least one functional group selected from the group consisting of a hydroxyl group, an epoxy group, an amino group, a silanol group and a $C_1$-$C_{24}$ alkoxysilane group, each of $R^5$ to $R^7$ and $R^{12}$ independently represents a hydrogen atom, a $C_1$-$C_{48}$ alkyl group, a $C_6$-$C_{48}$ aryl group, an alkylaryl group comprised of $C_1$-$C_{48}$ alkyl and $C_6$-$C_{48}$ aryl, an aralkyl group comprised of $C_1$-$C_{48}$ alkyl and $C_6$-$C_{48}$ aryl, or a $C_3$-$C_{48}$ cycloalkyl group, wherein each of $R^{1a}$, $R^{1b}$, $R^2$ to $R^4$ and $R^8$ to $R^{20}$ optionally independently has bonded thereto at least one atom selected from the group consisting of an oxygen atom, a nitrogen atom, a sulfur atom, and a silicon atom, the at least one atom being bonded in a form other than a hydroxyl group, an epoxy group, an amino group, a silanol group and an alkoxysilane group, and each of t, u, v and x is independently an integer of 0 or more, provided that both t and u are not simultaneously 0, and each of w, y, z and α is independently an integer of 1 or more.

2. The modified block copolymer according to item 1 above, which is represented by the formula (1).
3. The modified block copolymer according to item 1 above, which is represented by the formula (2).
4. The modified block copolymer according to item 1 above, which is represented by the formula (3).
5. The modified block copolymer according to item 1 above, which is represented by the formula (4).
6. The modified block copolymer according to item 1 above, which is represented by the formula (5).
7. A polymer composition comprising:
1 to 99% by weight, based on the total weight of components (I) and (II), of (I) the modified block copolymer of any one of items 1 to 6 above, and
99 to 1% by weight, based on the total weight of components (I) and (II), of (II) at least one polymer selected from the group consisting of a thermoplastic resin and a rubbery polymer.
8. The polymer composition according to item 7 above, wherein the thermoplastic resin in component (II) is a functional group-containing thermoplastic resin and the rubbery polymer in component (II) is a functional group-containing rubbery polymer.
9. The polymer composition according to item 8 above, wherein:
the functional group-containing thermoplastic resin comprises at least one member selected from the group consisting of a polyester resin, a polyamide resin, a polycarbonate resin, a polyurethane resin, a polyphenylene ether resin and a polyoxymethylene resin, and
the functional group-containing rubbery polymer comprises at least one member selected from the group consisting of an olefin elastomer and a styrene elastomer each of which contains at least one functional group selected from the group consisting of an acid anhydride group, a carboxyl group, a hydroxyl group, an epoxy group and an amino group.

10. A polymer composition comprising:
1 to 99% by weight, based on the total weight of components (I-1) and (II), of (I-1) a semimodified block copolymer comprising:
a base block copolymer comprising at least one polymer block (A) comprised mainly of vinyl aromatic hydrocarbon monomer units and at least one polymer block (B) comprised mainly of conjugated diene monomer units, the amounts of the vinyl aromatic hydrocarbon monomer units and the conjugated diene monomer units in the base block copolymer being, respectively, 5 to 95% by weight and 95 to 5% by weight, based on the total weight of the vinyl aromatic hydrocarbon monomer units and the conjugated diene monomer units, and
a functional group-containing first-order modifier group bonded to the base block copolymer,
the base block copolymer being unhydrogenated or at least partially hydrogenated,
wherein the semimodified block copolymer (I-1) is represented by a formula selected from the group consisting of the below-mentioned formulae (6) to (10),
99 to 1% by weight, based on the total weight of components (I-1) and (II), of (II) at least one polymer selected from the group consisting of a thermoplastic resin and a rubbery polymer, and
0.01 to 20 parts by weight, relative to 100 parts by weight of the total of components (I-1) and (II), of (III) a second-order modifier having a functional group which is reactive to the functional group of the first-order modifier group of the semimodified block copolymer (I-1),

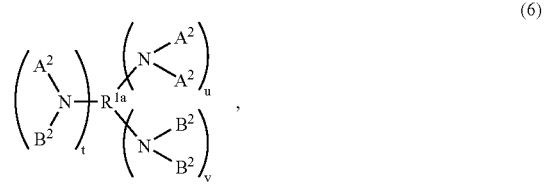
(6)

(7)

$C^2$—$NR^3$-$D^2$, (8)

$C^2$-$D^2$, and (9)

$E^2$-$F^2$ (10)

wherein:
$A^2$ represents a unit which is represented by any one of the following formulae (a-1) and (b-1):

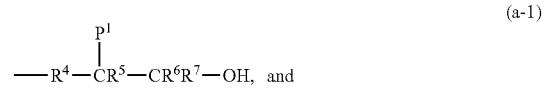
(a-1)

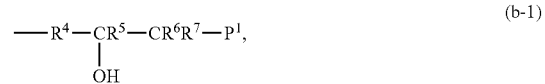
(b-1)

$B^2$ represents a unit which is represented by the following formula (c-1):

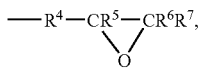 (c-1)

$C^2$ represents a unit which is represented by any one of the following formulae (d-1) and (e-1):

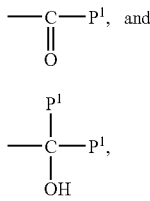

$D^2$ represents a unit which is represented by the following formula (f-1):

—$R^8$—$NHR^3$, (f-1)

$E^2$ represents a unit which is represented by the following formula (g-1):

—$R^9$—$P^1$, and (g-1)

$F^2$ represents a unit which is represented by any one of the following formulae (h-1) to (j-1):

—NH—$R^{10}$—$Si(OR^{11})_3$, (h-1)

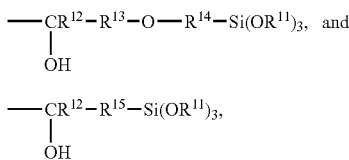

wherein, in the formulae (6) to (8) and (a-1) to (j-1):
N represents a nitrogen atom, Si represents a silicon atom, O represents an oxygen atom, C represents a carbon atom, and H represents a hydrogen atom,
$P^1$ represents the base block copolymer,
$R^{1a}$ represents a trivalent aliphatic $C_1$-$C_{48}$ hydrocarbon group,
each of $R^{1b}$, $R^4$, $R^8$ to $R^{10}$ and $R^{13}$ to $R^{20}$ independently represents a $C_1$-$C_{48}$ alkylene group,
each of $R^2$, $R^3$ and $R^{11}$ independently represents a $C_1$-$C_{48}$ alkyl group, a $C_6$-$C_{48}$ aryl group, an alkylaryl group comprised of $C_1$-$C_{48}$ alkyl and $C_6$-$C_{48}$ aryl, an aralkyl group comprised of $C_1$-$C_{48}$ alkyl and $C_6$-$C_{48}$ aryl, or a $C_3$-$C_{48}$ cycloalkyl group,
wherein each of $R^{1a}$, $R^{1b}$, $R^3$, $R^4$, $R^8$ to $R^{10}$ and $R^{13}$ to $R^{15}$ optionally independently has at least one functional group selected from the group consisting of a hydroxyl group, an epoxy group, an amino group, a silanol group and a $C_1$-$C_{24}$ alkoxysilane group,
each of $R^5$ to $R^7$ and $R^{12}$ independently represents a hydrogen atom, a $C_1$-$C_{48}$ alkyl group, a $C_6$-$C_{48}$ aryl group, an alkylaryl group comprised of $C_1$-$C_{48}$ alkyl and $C_6$-$C_{48}$ aryl, an aralkyl group comprised of $C_1$-$C_{48}$ alkyl and $C_6$-$C_{48}$ aryl, or a $C_3$-$C_{48}$ cycloalkyl group,
wherein each of $R^{1a}$, $R^{1b}$, $R^2$ to $R^4$ and $R^8$ to $R^{15}$ optionally independently has bonded thereto at least one atom selected from the group consisting of an oxygen atom, a nitrogen atom, a sulfur atom and a silicon atom, the at least one atom being bonded in a form other than a hydroxyl group, an epoxy group, an amino group, a silanol group and an alkoxysilane group, and
each of t, u, v and x is independently an integer of 0 or more, provided that both t and u are not simultaneously 0, and w is an integer of 1 or more.

11. The polymer composition according to item 10 above, wherein the thermoplastic resin in component (II) is a functional group-containing thermoplastic resin and the rubbery polymer in component (II) is a functional group-containing rubbery polymer.

12. The polymer composition according to item 11 above, wherein:
the functional group-containing thermoplastic resin comprises at least one member selected from the group consisting of a polyester resin, a polyamide resin, a polycarbonate resin, a polyurethane resin, a polyphenylene ether resin and a polyoxymethylene resin, and
the functional group-containing rubbery polymer comprises at least one member selected from the group consisting of an olefin elastomer and a styrene elastomer each of which contains at least one functional group selected from the group consisting of an acid anhydride group, a carboxyl group, a hydroxyl group, an epoxy group and an amino group.

13. The polymer composition according to item 11 or 12 above, wherein the functional group of the second-order modifier (III) is reactive to both the functional group of the first-order modifier group of the semimodified block copolymer (I-1) and the functional group of the component (II).

14. The polymer composition according to any one of items 10 to 13 above, wherein the functional group of the second-order modifier (III) comprises at least one member selected from the group consisting of a carboxyl group, an acid anhydride group, an isocyanate group, an epoxy group and an alkoxysilane group.

15. A flame retardant polymer composition comprising:
100 parts by weight of (I) the modified block copolymer of any one of items 1 to 6 above,
10 to 2000 parts by weight of (VI) an inorganic filler, and
0 to 1000 parts by weight of an olefin polymer.

16. A flame retardant polymer composition comprising:
100 parts by weight of the polymer composition of item 7 above, and
10 to 2000 parts by weight of (VI) an inorganic filler.

17. A flame retardant polymer composition comprising:
100 parts by weight of the polymer composition of item 10 above, and
10 to 2000 parts by weight of (VI) an inorganic filler.

18. A crosslinked product obtained by subjecting a crosslinkable material to melt-kneading in the presence of a vulcanizing agent,
the crosslinkable material comprising:
10 to 100% by weight, based on the total weight of components (I) and (II), of (I) the modified block copolymer of any one of items 1 to 6 above, and 90 to 0% by weight, based on the total weight of components (I) and (II), of (II) at least one polymer selected from the group consisting of a thermoplastic resin and a rubbery polymer.

19. A crosslinked product obtained by subjecting the polymer composition of item 10 above to melt-kneading in the presence of a vulcanizing agent.

20. An adhesive composition comprising:
   100 parts by weight of (I) the modified block copolymer of any one of items 1 to 6 above, and
   20 to 400 parts by weight of (VIII) a tackifier.

21. An adhesive composition comprising:
   100 parts by weight of (I-1) a semimodified block copolymer comprising:
      a base block copolymer comprising at least one polymer block (A) comprised mainly of vinyl aromatic hydrocarbon monomer units and at least one polymer block (B) comprised mainly of conjugated diene monomer units, the amounts of the vinyl aromatic hydrocarbon monomer units and the conjugated diene monomer units in the base block copolymer being, respectively, 5 to 95% by weight and 95 to 5% by weight, based on the total weight of the vinyl aromatic hydrocarbon monomer units and the conjugated diene monomer units, and
      a functional group-containing first-order modifier group bonded to the base block copolymer,
      the base block copolymer being unhydrogenated or at least partially hydrogenated,
      wherein the semimodified block copolymer (I-1) is represented by a formula selected from the group consisting of the below-mentioned formulae (6) to (10),
   20 to 400 parts by weight of (VIII) a tackifier, and
   0.01 to 20 parts by weight of (III) a second-order modifier having a functional group which is reactive to the functional group of the first-order modifier group of the semimodified block copolymer (I-1),

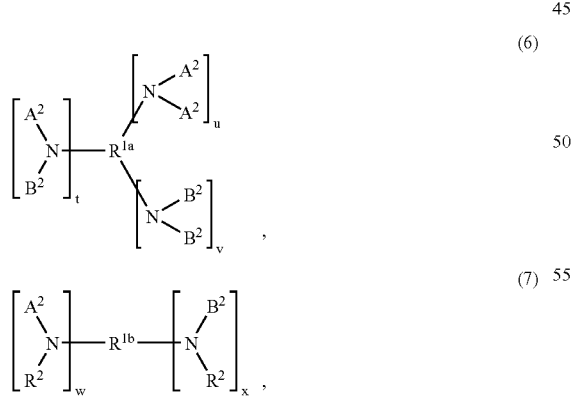
(6)

(7)

$C^2$—$NR^3$-$D^2$, (8)

$C^2$-$D^2$, and (9)

$E^2$-$F^2$ (10)

wherein:
$A^2$ represents a unit which is represented by any one of the following formulae (a-1) and (b-1):

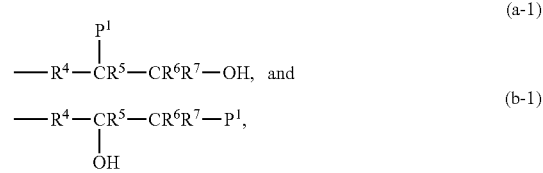
(a-1)
(b-1)

$B^2$ represents a unit which is represented by the following formula (c-1):

(c-1)

$C^2$ represents a unit which is represented by any one of the following formulae (d-1) and (e-1):

(d-1)
(e-1)

$D^2$ represents a unit which is represented by the following formula (f-1):

—$R^8$—$NHR^3$, (f-1)

$E^2$ represents a unit which is represented by the following formula (g-1):

—$R^9$—$P^1$, and (g-1)

$F^2$ represents a unit which is represented by any one of the following formulae (h-1) to (j-1):

—NH—$R^{10}$—Si(OR$^{11}$)$_3$, (h-1)

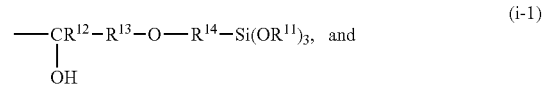
(i-1)

(j-1)

wherein, in the formulae (6) to (8) and (a-1) to (j-1):
   N represents a nitrogen atom, Si represents a silicon atom, O represents an oxygen atom, C represents a carbon atom, and H represents a hydrogen atom,
   $P^1$ represents the base block copolymer,
   $R^{1a}$ represents a trivalent aliphatic $C_1$-$C_{48}$ hydrocarbon group,
   each of $R^{1b}$, $R^4$, $R^8$ to $R^{10}$ and $R^{13}$ to $R^{20}$ independently represents a $C_1$-$C_{48}$ alkylene group, each of $R^2$, $R^3$ and $R^{11}$ independently represents a $C_1$-$C_{48}$ alkyl group, a $C_6$-$C_{48}$ aryl group, an alkylaryl group comprised of $C_1$-$C_{48}$ alkyl and $C_6$-$C_{48}$ aryl, an aralkyl group comprised of $C_1$-$C_{48}$ alkyl and $C_6$-$C_{48}$ aryl, or a $C_3$-$C_{48}$ cycloalkyl group, wherein each of $R^{1a}$, $R^{1b}$, $R^3$, $R^4$, $R^8$ to $R^{10}$ and $R^{13}$ to $R^{15}$ optionally independently has at least one functional group selected from the group consisting of a hydroxyl group, an epoxy group, an amino group, a silanol group and a $C_1$-$C_{24}$ alkoxysilane group, each of $R^5$ to $R^7$ and $R^{12}$ independently represents a hydrogen atom, a $C_1$-$C_{48}$ alkyl group, a $C_6$-$C_{48}$ aryl group, an alkylaryl group comprised of $C_1$-$C_{48}$ alkyl and $C_6$-$C_{48}$ aryl, an aralkyl group comprised of $C_1$-$C_{48}$ alkyl and $C_6$-$C_{48}$ aryl, or a $C_3$-$C_{48}$ cycloalkyl group, wherein each of $R^{1a}$, $R^{1b}$, $R^2$ to $R^4$ and $R^8$ to $R^{15}$ optionally independently has bonded thereto at least one atom selected from the group consisting of an oxygen atom, a nitrogen atom, a sulfur atom and a silicon atom, the at least one atom being bonded in a form other than a hydroxyl group, an epoxy group, an amino group, a silanol group and an alkoxysilane group, and each of t, u, v and x is independently an integer of 0 or more, provided that both t and u are not simultaneously 0, and w is an integer of 1 or more.

22. The adhesive composition according to item 21 above, wherein the functional group of the second-order modifier (III) comprises at least one member selected from the group consisting of a carboxyl group, an acid anhydride group, an isocyanate group, an epoxy group and an alkoxysilane group.

23. An adhesive film for protecting a surface, which is obtained by forming an adhesive layer on a resin film, the adhesive layer comprising an adhesive composition comprising:

100 parts by weight of (I) the modified block copolymer of any one of items 1 to 6 above, and 3 to 200 parts by weight of (VIII) a tackifier.

24. An adhesive film for protecting a surface, which is obtained by forming an adhesive layer on a resin film, the adhesive layer comprising an adhesive composition comprising:

100 parts by weight of (I-1) a semimodified block copolymer comprising:

a base block copolymer comprising at least one polymer block (A) comprised mainly of vinyl aromatic hydrocarbon monomer units and at least one polymer block (B) comprised mainly of conjugated diene monomer units, the amounts of the vinyl aromatic hydrocarbon monomer units and the conjugated diene monomer units in the base block copolymer being, respectively, 5 to 95% by weight and 95 to 5% by weight, based on the total weight of the vinyl aromatic hydrocarbon monomer units and the conjugated diene monomer units, and a functional group-containing first-order modifier group bonded to the base block copolymer, the base block copolymer being unhydrogenated or at least partially hydrogenated, wherein the semimodified block copolymer (I-1) is represented by a formula selected from the group consisting of the below-mentioned formulae (6) to (10), 3 to 200 parts by weight of (VIII) a tackifier, and 0.01 to 20 parts by weight of (III) a second-order modifier having a functional group which is reactive to the functional group of the first-order modifier group of the semimodified block copolymer (I-1),

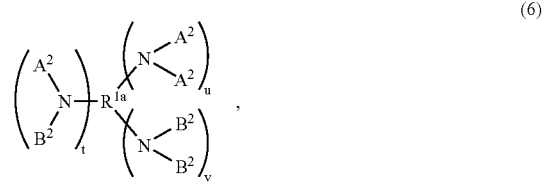
(6)

(7)

$C^2$—$NR^3$-$D^2$,  (8)

$C^2$-$D^2$, and  (9)

$E^2$-$F^2$  (10)

wherein:

$A^2$ represents a unit which is represented by any one of the following formulae (a-1) and (b-1):

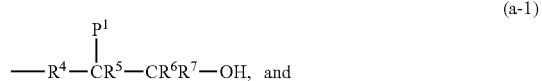
(a-1)
(b-1)

$B^2$ represents a unit which is represented by the following formula (c-1):

(c-1)

$C^2$ represents a unit which is represented by any one of the following formulae (d-1) and (e-1):

(d-1)

(e-1)

$D^2$ represents a unit which is represented by the following formula (f-1):

—$R^8$—$NHR^3$,  (f-1)

$E^2$ represents a unit which is represented by the following formula (g-1):

$$—R^9—P^1, \text{ and} \tag{g-1}$$

$F^2$ represents a unit which is represented by any one of the following formulae (h-1) to (j-1):

$$—NH—R^{10}—Si(OR^{11})_3 \tag{h-1}$$

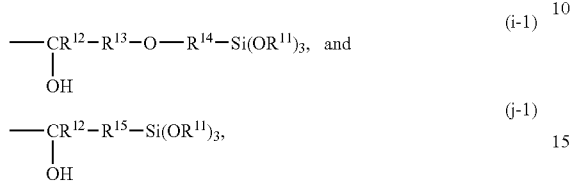

wherein, in the formulae (6) to (8) and (a-1) to (j-1):
N represents a nitrogen atom, Si represents a silicon atom, O represents an oxygen atom, C represents a carbon atom, and H represents a hydrogen atom,
$P^1$ represents the base block copolymer,
$R^{1a}$ represents a trivalent aliphatic $C_1$-$C_{48}$ hydrocarbon group,
each of $R^{1b}$, $R^4$, $R^8$ to $R^{10}$ and $R^{13}$ to $R^{20}$ independently represents a $C_1$-$C_{48}$ alkylene group,
each of $R^2$, $R^3$ and $R^{11}$ independently represents a $C_1$-$C_{48}$ alkyl group, a $C_6$-$C_{48}$ aryl group, an alkylaryl group comprised of $C_1$-$C_{48}$ alkyl and $C_6$-$C_{48}$ aryl, an aralkyl group comprised of $C_1$-$C_{48}$ alkyl and $C_6$-$C_{48}$ aryl, or a $C_3$-$C_{48}$ cycloalkyl group,
wherein each of $R^{1a}$, $R^{1b}$, $R^3$, $R^4$, $R^8$ to $R^{10}$ and $R^{13}$ to $R^{15}$ optionally independently has at least one functional group selected from the group consisting of a hydroxyl group, an epoxy group, an amino group, a silanol group and a $C_1$-$C_{24}$ alkoxysilane group,
each of $R^5$ to $R^7$ and $R^{12}$ independently represents a hydrogen atom, a $C_1$-$C_{48}$ alkyl group, a $C_6$-$C_{48}$ aryl group, an alkylaryl group comprised of $C_1$-$C_{48}$ alkyl and $C_6$-$C_{48}$ aryl, an aralkyl group comprised of $C_1$-$C_{48}$ alkyl and $C_6$-$C_{48}$ aryl, or a $C_3$-$C_{48}$ cycloalkyl group,
wherein each of $R^{1a}$, $R^{1b}$, $R^2$ to $R^4$ and $R^8$ to $R^{15}$ optionally independently has bonded thereto at least one atom selected from the group consisting of an oxygen atom, a nitrogen atom, a sulfur atom and a silicon atom, the at least one atom being bonded in a form other than a hydroxyl group, an epoxy group, an amino group, a silanol group and an alkoxysilane group, and
each of t, u, v and x is independently an integer of 0 or more, provided that both t and u are not simultaneously 0, and w is an integer of 1 or more.

25. An asphalt composition comprising:
0.5 to 50 parts by weight of (I) the modified block copolymer of any one of items 1 to 6 above, and
100 parts by weight of (IX) an asphalt.

26. An asphalt composition comprising:
0.5 to 50 parts by weight of (I-1) a semimodified block copolymer comprising:
a base block copolymer comprising at least one polymer block (A) comprised mainly of vinyl aromatic hydrocarbon monomer units and at least one polymer block (B) comprised mainly of conjugated diene monomer units, the amounts of the vinyl aromatic hydrocarbon monomer units and the conjugated diene monomer units in the base block copolymer being, respectively, 5 to 95% by weight and 95 to 5% by weight, based on the total weight of the vinyl aromatic hydrocarbon monomer units and the conjugated diene monomer units, and
a functional group-containing first-order modifier group bonded to the base block copolymer,
the base block copolymer being unhydrogenated or at least partially hydrogenated,
wherein the semimodified block copolymer (I-1) is represented by a formula selected from the group consisting of the below-mentioned formulae (6) to (10),
100 parts by weight of (IX) an asphalt, and
0.01 to 5 parts by weight of (III) a second-order modifier having a functional group which is reactive to the functional group of the first-order modifier group of the semimodified block copolymer (I-1),

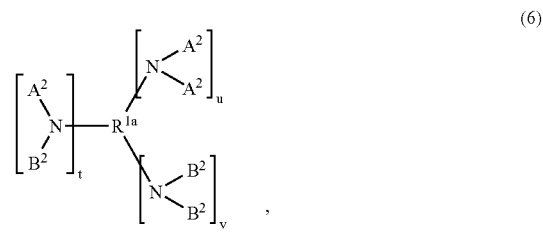

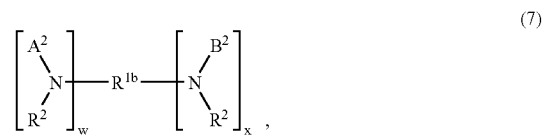

$$C^2—NR^3-D^2, \tag{8}$$

$$C^2-D^2, \text{ and} \tag{9}$$

$$E^2-F^2 \tag{10}$$

wherein:
$A^2$ represents a unit which is represented by any one of the following formulae (a-1) and (b-1):

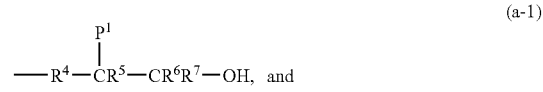

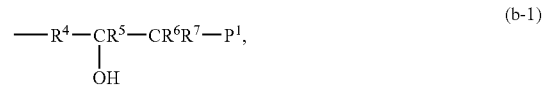

$B^2$ represents a unit which is represented by the following formula (c-1):

$C^2$ represents a unit which is represented by any one of the following formulae (d-1) and (e-1):

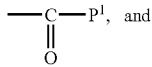

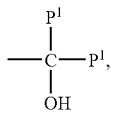

$D^2$ represents a unit which is represented by the following formula (f-1):

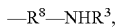

$E^2$ represents a unit which is represented by the following formula (g-1):

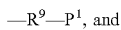

$F^2$ represents a unit which is represented by any one of the following formulae (h-1) to (j-1):

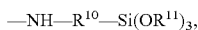

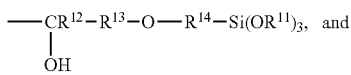

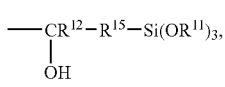

wherein, in the formulae (6) to (8) and (a-1) to (j-1):
  N represents a nitrogen atom, Si represents a silicon atom, O represents an oxygen atom, C represents a carbon atom, and H represents a hydrogen atom,
  $P^1$ represents the base block copolymer,
  $R^{1a}$ represents a trivalent aliphatic $C_1$-$C_{48}$ hydrocarbon group,
  each of $R^{1b}$, $R^4$, $R^8$ to $R^{10}$ and $R^{13}$ to $R^{20}$ independently represents a $C_1$-$C_{48}$ alkylene group,
  each of $R^2$, $R^3$ and $R^{11}$ independently represents a $C_1$-$C_{48}$ alkyl group, a $C_6$-$C_{48}$ aryl group, an alkylaryl group comprised of $C_1$-$C_{48}$ alkyl and $C_6$-$C_{48}$ aryl, an aralkyl group comprised of $C_1$-$C_{48}$ alkyl and $C_6$-$C_{48}$ aryl, or a $C_3$-$C_{48}$ cycloalkyl group,
  wherein each of $R^{1a}$, $R^{1b}$, $R^3$, $R^4$, $R^8$ to $R^{10}$ and $R^{13}$ to $R^{15}$ optionally independently has at least one functional group selected from the group consisting of a hydroxyl group, an epoxy group, an amino group, a silanol group and a $C_1$-$C_{24}$ alkoxysilane group,
  each of $R^5$ to $R^7$ and $R^{12}$ independently represents a hydrogen atom, a $C_1$-$C_{48}$ alkyl group, a $C_6$-$C_{48}$ aryl group, an alkylaryl group comprised of $C_1$-$C_{48}$ alkyl and $C_6$-$C_{48}$ aryl, an aralkyl group comprised of $C_1$-$C_{48}$ alkyl and $C_6$-$C_{48}$ aryl, or a $C_3$-$C_{48}$ cycloalkyl group,
  wherein each of $R^{1a}$, $R^{1b}$, $R^2$ to $R^4$ and $R^8$ to $R^{15}$ optionally independently has bonded thereto at least one atom selected from the group consisting of an oxygen atom, a nitrogen atom, a sulfur atom and a silicon atom, the at least one atom being bonded in a form other than a hydroxyl group, an epoxy group, an amino group, a silanol group and an alkoxysilane group, and
  each of t, u, v and x is independently an integer of 0 or more, provided that both t and u are not simultaneously 0, and w is an integer of 1 or more.

27. A drainage pavement comprising a road and, formed thereon, a drainage pavement layer having a plurality of voids for drainage,
  the drainage pavement layer comprising a plurality of aggregates and a binder,
  the binder comprising the asphalt composition of item 25 above.

28. The drainage pavement according to item 27 above, wherein the drainage pavement layer has a void ratio of 5 to 35%.

29. A drainage pavement comprising a road and, formed thereon, a drainage pavement layer having a plurality of voids for drainage,
  the drainage pavement layer comprising a plurality of aggregates and a binder,
  the binder comprising the asphalt composition of item 26 above.

30. The drainage pavement according to item 29 above, wherein the drainage pavement layer has a void ratio of 5 to 35%.

31. A method for producing the modified block copolymer of item 1 above, comprising:
  (1) providing a first-order modified block copolymer comprising:
    a base block copolymer comprising at least one polymer block (A) comprised mainly of vinyl aromatic hydrocarbon monomer units and at least one polymer block (B) comprised mainly of conjugated diene monomer units, the amounts of the vinyl aromatic hydrocarbon monomer units and the conjugated diene monomer units in the base block copolymer being, respectively, 5 to 95% by weight and 95 to 5% by weight, based on the total weight of the vinyl aromatic hydrocarbon monomer units and the conjugated diene monomer units, and
    a functional group-containing first-order modifier group bonded to the base block copolymer,
    the base block copolymer being unhydrogenated or at least partially hydrogenated,
    wherein the first-order modified block copolymer is produced by a process in which a base block copolymer having a living terminal is produced by a living anionic polymerization, and a functional group-containing first-order modifier is addition-bonded to the living terminal of the base block copolymer to obtain a first-order modified block copolymer, optionally followed by partial or complete hydrogenation of the obtained first-order modified block copolymer, wherein the first-order modified block copolymer is represented by a formula selected from the group consisting of the below-mentioned formulae (6) to (10), and
  (2) reacting the first-order modified block copolymer with a second-order modifier, wherein the second-order modifier has a functional group which is reactive to the functional group of the first-order modifier group of the first-order modified block copolymer, and wherein the second-order modifier is used in an amount of 0.3 to 10 moles, relative to one equivalent of the functional group of the first-order modifier group of the first-order modified block copolymer,
    thereby obtaining a second-order modified block copolymer,

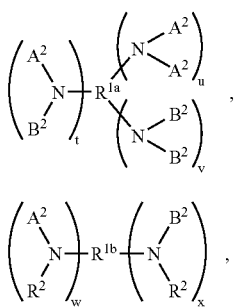 (6)

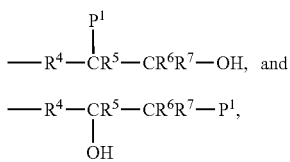 (7)

$C^2-NR^3-D^2$, (8)

$C^2-D^2$, and (9)

$E^2-F^2$ (10)

wherein:

$A^2$ represents a unit which is represented by any one of the following formulae (a-1) and (b-1):

 (a-1)

 (b-1)

$B^2$ represents a unit which is represented by the following formula (c-1):

 (c-1)

$C^2$ represents a unit which is represented by any one of the following formulae (d-1) and (e-1):

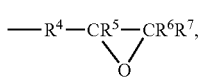 (d-1)

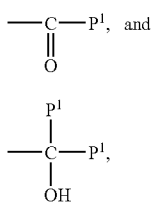 (e-1)

$D^2$ represents a unit which is represented by the following formula (f-1):

$-R^8-NHR^3$, (f-1)

$E^2$ represents a unit which is represented by the following formula (g-1):

$-R^9-P^1$, and (g-1)

$F^2$ represents a unit which is represented by any one of the following formulae (h-1) to (j-1):

$-NH-R^{10}-Si(OR^{11})_3$, (h-1)

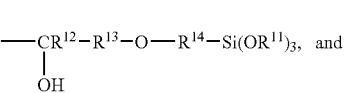 (i-1)

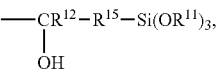 (j-1)

wherein, in the formulae (6) to (8) and (a-1) to (j-1):
N represents a nitrogen atom, Si represents a silicon atom, O represents an oxygen atom, C represents a carbon atom, and H represents a hydrogen atom,
$P^1$ represents the base block copolymer,
$R^{1a}$ represents a trivalent aliphatic $C_1$-$C_{48}$ hydrocarbon group,
each of $R^{1b}$, $R^4$, $R^8$ to $R^{10}$ and $R^{13}$ to $R^{20}$ independently represents a $C_1$-$C_{48}$ alkylene group,
each of $R^2$, $R^3$ and $R^{11}$ independently represents a $C_1$-$C_{48}$ alkyl group, a $C_6$-$C_{48}$ aryl group, an alkylaryl group comprised of $C_1$-$C_{48}$ alkyl and $C_6$-$C_{48}$ aryl, an aralkyl group comprised of $C_1$-$C_{48}$ alkyl and $C_6$-$C_{48}$ aryl, or a $C_3$-$C_{48}$ cycloalkyl group,
wherein each of $R^{1a}$, $R^{1b}$, $R^3$, $R^4$, $R^8$ to $R^{10}$ and $R^{13}$ to $R^{15}$ optionally independently has at least one functional group selected from the group consisting of a hydroxyl group, an epoxy group, an amino group, a silanol group and a $C_1$-$C_{24}$ alkoxysilane group,
each of $R^5$ to $R^7$ and $R^{12}$ independently represents a hydrogen atom, a $C_1$-$C_{48}$ alkyl group, a $C_6$-$C_{48}$ aryl group, an alkylaryl group comprised of $C_1$-$C_{48}$ alkyl and $C_6$-$C_{48}$ aryl, an aralkyl group comprised of $C_1$-$C_{48}$ alkyl and $C_6$-$C_{48}$ aryl, or a $C_3$-$C_{48}$ cycloalkyl group,
wherein each of $R^{1a}$, $R^{1b}$, $R^2$ to $R^4$ and $R^8$ to $R^{15}$ optionally independently has bonded thereto at least one atom selected from the group consisting of an oxygen atom, a nitrogen atom, a sulfur atom and a silicon atom, the at least one atom being bonded in a form other than a hydroxyl group, an epoxy group, an amino group, a silanol group and an alkoxysilane group, and
each of t, u, v and x is independently an integer of 0 or more, provided that both t and u are not simultaneously 0, and w is an integer of 1 or more.

32. The method according to item 31 above, wherein, in step (1), after the addition-bonding of the functional group-containing first-order modifier to the living terminal of the base block copolymer, the resultant first-order modified block copolymer is reacted with an active hydrogen-containing compound,
wherein, when the optional hydrogenation of the first-order modified block copolymer is performed, the reaction with an active hydrogen-containing compound is performed prior to or simultaneously with the hydrogenation.

Hereinbelow, the present invention is described in detail.

The first-order modified block copolymer in the present invention is a semimodified block copolymer which comprises a base block copolymer comprising at least one polymer block (A) comprised mainly of vinyl aromatic hydrocarbon monomer units and at least one polymer block (B) comprised mainly of conjugated diene monomer units, and a functional group-containing first order-modifier group bonded to the base block copolymer, wherein the base block copolymer is unhydrogenated or at least partially hydrogenated, and wherein the first-order modified block copolymer is represented by a formula selected from the group consisting of the above-mentioned formulae (6) to (10). On the other hand, the second-order modified block copolymer of the present invention is a modified block copolymer which can be obtained, for example, by reacting the first-order modified block copolymer with a second-order modifier having a functional group which is reactive to the functional group of the first-order modifier group of the first-order modified block copolymer, wherein the second-order modified block copolymer is represented by a formula selected from the group consisting of the above-mentioned formulae (1) to (5).

In the present invention, from the viewpoint of the improvement of stiffness of the modified block copolymer, the amount of the vinyl aromatic hydrocarbon monomer units in the base block copolymer is 5% by weight or more, based on the total weight of the vinyl aromatic hydrocarbon monomer units and the conjugated diene monomer units. Further, from the viewpoint of the improvement of impact resistance of the modified block copolymer, the amount of the vinyl aromatic hydrocarbon monomer units in the base block copolymer is 95% by weight or less, based on the total weight of the vinyl aromatic hydrocarbon monomer units and the conjugated diene monomer units. The amount of the vinyl aromatic hydrocarbon monomer units in the base block copolymer is preferably from 10 to 90% by weight, more preferably from 15 to 85% by weight. When the amount of the vinyl aromatic hydrocarbon monomer units is 60% by weight or more, preferably 65% by weight or more, the modified block copolymer exhibits resinous properties. When the amount of the vinyl aromatic hydrocarbon monomer units is less than 60% by weight, preferably 55% by weight or less, the modified block copolymer exhibits elastic properties. On the other hand, the amount of the conjugated diene monomer units in the base block copolymer is from 95 to 5% by weight, based on the total weight of the vinyl aromatic hydrocarbon monomer units and the conjugated diene monomer units.

In the present invention, the base block copolymer is produced by a living anionic polymerization in a solvent in the presence of an organolithium compound as a catalyst.

As examples of methods for producing a base block copolymer, there can be mentioned the methods described in Examined Japanese Patent Application Publication Nos. Sho 36-19286 (corresponding to U.S. Pat. No. 2,975,160), Sho 43-17979, Sho 46-32415, Sho 49-36957 (corresponding to U.S. Pat. No. 3,281,383), Sho 48-2423, Sho 48-4106 (corresponding to U.S. Pat. No. 3,639,517), Sho 51-49567, and Unexamined Japanese Patent Application Laid-Open Specification No. Sho 59-166518 (corresponding to U.S. Pat. No. 4,603,155). By addition-bonding the below-described functional group-containing first-order modifier to the living terminal of the base block copolymer produced by, for example, a method described in any of the above-mentioned documents, a first-order modified block copolymer having a functional group-containing first-order modifier group can be obtained, wherein the first-order modified block copolymer has, for example, a structure represented by a formula selected from the group consisting of the following formulae:

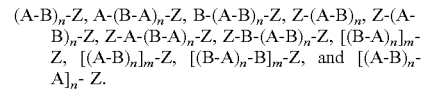

$(A-B)_n$-Z, A-$(B-A)_n$-Z, B-$(A-B)_n$-Z, Z-$(A-B)_n$, Z-$(A-B)_n$-Z, Z-A-$(B-A)_n$-Z, Z-B-$(A-B)_n$-Z, $[(B-A)_n]_m$-Z, $[(A-B)_n]_m$-Z, $[(B-A)_n$-B$]_m$-Z, and $[(A-B)_n$-A$]_n$-Z.

In the above-mentioned formulae, A represents a polymer block comprised mainly of vinyl aromatic hydrocarbon monomer units, and B represents a polymer block comprised mainly of conjugated diene monomer units. It is not necessary that the boundary between the polymer blocks A and B be distinct. In the above-mentioned formulae, n is an integer of 1 or more, preferably an integer of from 1 to 5, and m is an integer of 2 or more, preferably an integer of from 2 to 11. Z represents a residue of the first-order modifier (described below) which has a functional group bonded thereto. When Z is addition-bonded to the block copolymer by a metalation reaction (described below), Z is bonded to a side chain of polymer block A and/or B. When the block copolymer comprises a plurality of polymer blocks A and a plurality of polymer blocks B, the structures of polymer blocks A are the same or different, and the structures of polymer blocks B are the same or different. Further, the structures of the polymer chains each having Z bonded thereto are the same or different.

In the present invention, polymer block A (which is comprised mainly of vinyl aromatic hydrocarbon monomer units) is a copolymer block comprising vinyl aromatic hydrocarbon monomer units and conjugated diene monomer units or a homopolymer block comprising vinyl aromatic hydrocarbon monomer units, wherein, in the copolymer block A, the amount of vinyl aromatic hydrocarbon monomer units is preferably 50% by weight or more, more preferably 70% by weight or more, based on the weight of copolymer block A. Polymer block B (which is comprised mainly of conjugated diene monomer units) is a copolymer block comprising conjugated diene monomer units and vinyl aromatic hydrocarbon monomer units or a homopolymer block comprising conjugated diene monomer units, wherein, in the copolymer block B, the amount of conjugated diene monomer units is preferably more than 50% by weight, more preferably 60% by weight or more, base on the weight of copolymer block B. The vinyl aromatic hydrocarbon monomer units may be uniformly distributed or may be distributed in a tapered configuration in the copolymer block. The copolymer block may have a plurality of segments of at least one type selected from the group consisting of segments in which the vinyl aromatic hydrocarbon monomer units are uniformly distributed, and segments in which the vinyl aromatic hydrocarbon monomer units are distributed in a tapered configuration. Further, the copolymer block may have a plurality of segments having different vinyl aromatic hydrocarbon monomer unit contents. The base block copolymer used in the present invention may be a mixture of a plurality of different base block copolymers which can be appropriately selected.

In the present invention, the microstructure (including the amounts of a cis bond, a trans bond, and a vinyl bond) of the conjugated diene monomer units in the block copolymer can be appropriately controlled by using the below-described polar compound and the like. When 1,3-butadiene (which is addition-polymerized through a cis-1,4 bond, a trans-1,4 bond or a 1,2-vinyl bond) is used as the conjugated diene monomer, it is preferred that the 1,2-vinyl bond content is in the range of from 5 to 90 mol %, more advantageously from 10 to 80 mol %, based on the total molar amount of the cis-1,4 bond, trans-1,4 bond and 1,2-vinyl bond. When isoprene or a combination of 1,3-butadiene and isoprene is used as the conjugated diene monomer, it is preferred that the total content of the 1,2-vinyl bond and 3,4-vinyl bond is in the range of from 3 to 80 mol %, more advantageously from 5 to 70%, based on the total molar amount of the cis-1,4 bond, trans-1,4 bond, 1,2-vinyl bond and 3,4-vinyl bond. However, in the case where a hydrogenated block copolymer is used as the base block copolymer, with respect to the microstructure of the conjugated diene monomer units in the block copolymer, when 1,3-butadiene is used as the conjugated diene monomer, it is recommended that the 1,2-vinyl bond content is preferably in the range of from 10 to 80 mol %, more preferably from 25 to 75 mol %, based on the total molar amount of the cis-1,4 bond, trans-1,4 bond and 1,2-vinyl bond, and when isoprene or a combination of 1,3-butadiene and isoprene is used as the conjugated diene monomer, it is recommended that the total content of the 1,2-vinyl bond and 3,4-vinyl bond is preferably in the range of from 5 to 70 mol %, based on the total molar amount of the cis-1,4 bond, trans-1,4 bond, 1,2-vinyl bond and 3,4-vinyl bond. In the present invention, the total content of the 1,2-vinyl bond and 3,4-vinyl bond (or the content of the 1,2-vinyl bond in the case where 1,3-butadiene is used as the conjugated diene monomer) is defined as the vinyl bond content.

In the present invention, the conjugated diene monomer is a diolefin having a pair of conjugated double bonds. Examples of conjugated diene monomers include 1,3-butadiene, 2-methyl-1,3-butadiene (isoprene), 2,3-dimethyl-1,3-butadiene, 1,3-pentadiene and 1,3-hexadiene. Of these, especially preferred are 1,3-butadiene and isoprene. These conjugated diene monomers can be used individually or in combination.

Examples of vinyl aromatic hydrocarbon monomers include styrene, o-methylstyrene, p-methylstyrene, p-tert-butylstyrene, 1,3-dimethylstyrene, α-methylstyrene, vinylnaphthalene and vinylanthracene. Of these, especially preferred is styrene. These vinyl aromatic hydrocarbon monomers can be used individually or in combination.

In the present invention, when a combination of isoprene and 1,3-butadiene is used as the conjugated diene monomer for producing the base block copolymer, the weight ratio of isoprene to 1,3-butadiene is preferably in the range of from 95/5 to 5/95, more preferably from 90/10 to 10/90, still more preferably from 85/15 to 15/85. Especially from the viewpoint of obtaining a polymer composition having excellent impact resistance at low temperatures, it is recommended that the weight ratio of isoprene to 1,3-butadiene is preferably in the range of from 49/51 to 5/95, more preferably from 45/55 to 10/90, still more preferably from 40/60 to 15/85. When isoprene and 1,3-butadiene are used in combination as the conjugated diene monomer for producing the base block copolymer, an advantage can be obtained in that the polymer composition can be formed into shaped articles exhibiting a good balance of appearance and mechanical properties, even when the shaping is performed at high temperatures.

In the present invention, in any of the following two cases, namely the first case where a polymer composition having excellent flexibility is produced from the above-mentioned second-order modified block copolymer and a rubbery polymer and the second case where a polymer composition having excellent impact resistance is produced from the second-order modified block copolymer and a thermoplastic resin, from the viewpoint of maintaining the stiffness of the shaped article, it is recommended that the amount of vinyl aromatic hydrocarbon polymer block in the base block copolymer (hereinafter referred to as "vinyl aromatic hydrocarbon block ratio") is controlled preferably in the range of from 50% by weight or more, more preferably from 50 to 97% by weight, still more preferably from 60 to 95% by weight, most preferably from 70 to 92% by weight. The vinyl aromatic hydrocarbon block ratio in the base block copolymer can be measured by the following method. The weight of the vinyl aromatic hydrocarbon polymer block is obtained by a method in which the base block copolymer is subjected to oxidative degradation using tert-butyl hydroperoxide in the presence of osmium tetraoxide as a catalyst (i.e., method described in I. M. KOLTHOFF, et al., J. Polym. Sci. 1, 429 (1946)). Using the obtained weight of the vinyl aromatic hydrocarbon polymer block, the vinyl aromatic hydrocarbon block ratio in the base block copolymer is calculated by the following formula, with the proviso that, among the polymer chains (formed by the oxidative degradation) corresponding to the vinyl aromatic hydrocarbon polymer blocks, the polymer chains having an average polymerization degree of about 30 or less are not taken into consideration in the measurement of the vinyl aromatic hydrocarbon block ratio.

Vinyl aromatic hydrocarbon block ratio (% by weight)=(weight of the vinyl aromatic hydrocarbon polymer block in the base block copolymer/weight of the vinyl aromatic hydrocarbon monomer units in the base block copolymer)×100.

As mentioned above, the base block copolymer used in the present invention is produced by a living anionic polymerization in a solvent in the presence of an organolithium compound as a catalyst. Examples of solvents used for producing the base block copolymer in the present invention include hydrocarbon solvents, such as, aliphatic hydrocarbons, e.g., butane, pentane, hexane, isopentane, heptane, octane and isooctane; alicyclic hydrocarbons, e.g., cyclopentane, methylcyclopentane, cyclohexane, methylcyclohexane and ethylcyclohexane; and aromatic hydrocarbons, e.g., benzene, toluene, ethylbenzene and xylene. These solvents can be used individually or in combination.

The organolithium compound which is used in the production of the base block copolymer is an organic compound having at least one lithium atom in a molecule thereof. Examples of organolithium compounds include ethyllithium, n-propyllithium, isopropyllithium, n-butyllithium, sec-butyllithium, tert-butyllithium, hexamethylenedilithium, butadienyldilithium and isoprenyldilithium. These organolithium compounds can be used individually or in combination. Further, in the production of the base block copolymer, all amount of the organolithium compound may be added at a single time, or the organolithium compound may be added portionwise at two or more times.

In the present invention, for controlling the rate of the polymerization reaction for producing the base block copolymer, for changing the microstructure of the conjugated diene segments in the base block copolymer produced, and for adjusting the reactivity ratio of the conjugated diene monomer to the vinyl aromatic hydrocarbon monomer, a polar compound or a randomizing agent may be used. Examples of polar compounds and randomizing agents include ethers, amines, thioethers, phosphoramides, a potassium salt or sodium salt of an alkylbenzene sulfonic acid and an alkoxide of potassium or sodium. Preferred examples of ethers include dimethylether, diethylether, diphenylether, tetrahydrofuran, diethyleneglycol dimethylether and diethyleneglycol dibutylether. Examples of amines include tertiary amines, trimethylamine, triethylamine, tetramethylethylenediamine and cyclic tertiary amines. Examples of phosphoramides include hexamethylphosphoramide.

In the present invention, the reaction temperature for the copolymerization of a conjugated diene and a vinyl aromatic hydrocarbon in order to produce a base block copolymer is preferably in the range of from −10 to 150° C., more preferably from 30 to 120° C. The reaction time for the copolymerization varies depending on other conditions, but is preferably within 48 hours, more preferably from 0.5 to 10 hours. It is preferred that the atmosphere of the copolymerization reaction system is an atmosphere of an inert gas, such as nitrogen gas. With respect to the copolymerization reaction pressure, there is no particular limitation so long as the pressure is sufficient for the monomers and the solvent to maintain a liquid state. Further, it is preferred to prevent the intrusion of impurities (such as water, oxygen and carbon dioxide), which deactivate the catalyst and/or the living polymer, into the copolymerization reaction system.

The first-order modified block copolymer used in the present invention can be produced, for example, by a process in which a base block copolymer having a living terminal is produced by a living anionic polymerization, and a functional group-containing first-order modifier is addition-bonded to the living terminal of the base block copolymer to obtain a first-order modified block copolymer, optionally followed by partial or complete hydrogenation of the obtained first-order modified block copolymer.

The first-order modified block copolymer used in the present invention (hereinafter frequently referred to under reference numeral (I-1)) is a modified block copolymer comprising the above-mentioned base block copolymer and a functional group-containing first-order modifier group bonded to the base block copolymer, and has a structure represented by a formula selected from the group consisting of the above-mentioned formulae (6) to (10).

The first-order modified block copolymer which has a functional group-containing first-order modifier group can be obtained by a method in which the below-described functional group-containing first-order modifier is addition-bonded to the living terminal of the base block copolymer. The functional group of the first-order modifier may be protected by a conventional method. As another method for producing the first-order modified block copolymer, there can be mentioned a method in which an organic alkali metal compound, such as an organolithium compound, is addition-bonded to a base block copolymer which does not have a living terminal (this addition reaction is called "metalation reaction"), followed by the addition-bonding of a first-order modifier to the base block copolymer. In this method, the base block copolymer may be hydrogenated before the metalation reaction and the subsequent addition-bonding of the first-order modifier.

When the base block copolymer is reacted with a first-order modifier, it is possible that a hydroxyl group, an amino group and the like, which are contained in the resultant first-order modifier group of the first-order modified block copolymer, are converted to alkali metal salts thereof, depending on the type of first-order modifier. In such case, the alkali metal salts can be reconverted back to functional groups (i.e., a hydroxyl group, an amino group and the like) by reacting the alkali metal salts with an active hydrogen-containing compound, such as water, an alcohol, an inorganic acid and the like. When the first-order modified block copolymer is subjected to an optional hydrogenation, the above-mentioned reaction with an active hydrogen-containing compound is performed prior to or simultaneously with the hydrogenation.

In the present invention, a first-order modified block copolymer obtained by addition-bonding of the first-order modifier to the living terminal of the base block copolymer, may contain an unmodified block copolymer fraction. It is recommended that the amount of such unmodified block copolymer fraction in the first-order modified block copolymer is preferably not more than 70% by weight, more preferably not more than 60% by weight, still more preferably not more than 50% by weight, based on the weight of the first-order modified block copolymer.

Examples of first-order modifiers used for producing the first-order modified block copolymer used in the present invention are as follows.

Examples of first-order modifiers used for producing a first-order modified block copolymer represented by the above-mentioned formula (6) or (7) (which is a first-order modified block copolymer corresponding to a second-order modified block copolymer represented by the above-mentioned formula (1) or (2)) include polyepoxy compounds, such as tetraglycidyl-m-xylenediamine, tetraglycidyl-1,3-bisaminomethylcyclohexane, tetraglycidyl-p-phenylenediamine, tetraglycidyldiaminodiphenylmethane, diglycidylaniline, diglycidyl-o-toluidine, 4,4'-diglycidyldiphenylmethylamine, 4,4'-diglycidyldibenzylmethylamine, and diglycidylaminomethylcyclohexane.

Examples of first-order modifiers used for producing a first-order modified block copolymer represented by the above-mentioned formula (10) (which is a first-order modified block copolymer corresponding to a second-order modified block copolymer represented by the above-mentioned formula (5)) include γ-glycidoxyethyltrimethoxysilane, γ-glycidoxypropyltrimethoxysilane, γ-glycidoxybutyltrimethoxysilane, γ-glycidoxypropyltriethoxysilane, γ-glycidoxypropyltripropoxysilane, γ-glycidoxypropyltributoxysilane, γ-glycidoxypropyltriphenoxysilane, γ-glycidoxypropylmethyldimethoxysilane, γ-glycidoxypropylethyldimethoxysilane, γ-glycidoxypropylethyldiethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropyldimethylmethoxysilane, γ-glycidoxypropyldiethylethoxysilane, γ-glycidoxypropyldimethylethoxysilane, γ-glycidoxypropyldimethylphenoxysilane, γ-glycidoxypropyldiethylmethoxysilane, γ-glycidoxypropylmethyldiisopropeneoxysilane, bis(γ-glycidoxypropyl)dimethoxysilane and bis(γ-glycidoxypropyl)diethoxysilane.

Further examples of such first-order modifiers include bis(γ-glycidoxypropyl)dipropoxysilane, bis(γ-glycidoxypropyl)dibutoxysilane, bis(γ-glycidoxypropyl)diphenoxysilane, bis(γ-glycidoxypropyl)methylmethoxysilane, bis(γ-glycidoxypropyl)methylethoxysilane, bis(γ-glycidoxypropyl)methylpropoxysilane, bis(γ-glycidoxypropyl)methylbutoxysilane, bis(γ-glycidoxypropyl)methylphenoxysilane, tris(γ-glycidoxypropyl)methoxysilane, γ-methacryloxypropyltrimethoxysilane, γ-methacryloxypropyltriethoxysilane, γ-methacryloxymethyltrimethoxysilane, γ-methacryloxyethyltriethoxysilane, bis(γ-methacryloxypropyl)dimethoxysilane, and tris (γ-methacryloxypropyl) methoxysilane.

Still further examples of such first-order modifiers include β-(3,4-epoxycyclohexyl)ethyl-trimethoxysilane, β-(3,4-epoxycyclohexyl)ethyl-triethoxysilane, β-(3,4-epoxycyclohexyl)ethyl-tripropoxysilane, β-(3,4-epoxycyclohexyl)ethyl-tributoxysilane, and β-(3,4-epoxycyclohexyl)ethyl-triphenoxysilane.

Still further examples of such first-order modifiers include β-(3,4-epoxycyclohexyl)propyl-trimethoxysilane, β-(3,4-epoxycyclohexyl)ethyl-methyldimethoxysilane, β-(3,4-epoxycyclohexyl)ethyl-ethyldimethoxysilane, β-(3,4-epoxycyclohexyl)ethyl-ethyldiethoxysilane, β-(3,4-epoxycyclohexyl)ethyl-methyldiethoxysilane, β-(3,4-epoxycyclohexyl)ethyl-methyldipropoxysilane, β-(3,4-epoxycyclohexyl)ethyl-methyldibutoxysilane, β-(3,4-epoxycyclohexyl)ethyl-methyldiphenoxysilane, β-(3,4-epoxycyclohexyl)ethyl-dimethylmethoxysilane, β-(3,4-epoxycyclohexyl)ethyl-diethylethoxysilane, β-(3,4-epoxycyclohexyl)ethyl-dimethyethoxysilane, β-(3,4-epoxycyclohexyl)ethyl-dimethylpropoxysilane, β-(3,4-epoxycyclohexyl)ethyl-dimethylbutoxysilane, and β-(3,4-epoxycyclohexyl)ethyl-dimethylphenoxysilane.

Still further examples of such first-order modifiers include β-(3,4-epoxycyclohexyl)ethyl-diethylmethoxysilane, β-(3,4-epoxycyclohexyl)ethyl-methyldiisopropeneoxysilane and N-(1,3-dimethylbutylidene)-3-(triethoxysilyl)-1-propaneamine.

Examples of first-order modifiers used for producing a first-order modified block copolymer represented by the above-mentioned formula (8) (which is a first-order modified block copolymer corresponding to a second-order modified block copolymer represented by the above-mentioned formula (3)) include 1,3-dimethyl-2-imidazolidinone, 1,3-diethyl-2-imidazolidinone, N,N'-dimethylpropyleneurea, 1,3-dipropyl-2-imidazolidinone, 1-methyl-3-ethyl-2-imidazolidinone, 1-methyl-3-propyl-2-imidazolidinone, 1-methyl-3-butyl-2-imidazolidinone, 1-methyl-3-(2-methoxyethyl)-2-imidazolidinone, 1-methyl-3-(2-ethoxyethyl)-2-imidazolidinone, 1,3-di-(2-ethoxyethyl)-2-imidazolidinone, 1,3-dimethylethylenethiourea, N,N'-diethylpropyleneurea, and N-methyl-N'-ethylpropyleneurea.

Examples of first-order modifiers used for producing a first-order modified block copolymer represented by the above-mentioned formula (9) (which can be used for producing a second-order modified block copolymer represented by the above-mentioned formula (4)) include 1-methyl-2-pyrrolidone, 1-cyclohexyl-2-pyrrolidone, 1-ethyl-2-pyrrolidone, 1-propyl-2-pyrrolidone, 1-butyl-2-pyrrolidone, 1-isopropyl-2-pyrrolidone, 1,5-dimethyl-2-pyrrolidone, 1-methoxymethyl-2-pyrrolidone, 1-methyl-2-piperidone, 1,4-dimethyl-2-piperidone, 1-ethyl-2-piperidone, 1-isopropyl-2-piperidone, and 1-isopropyl-5,5-dimethyl-2-piperidone.

By reacting the base block copolymer with any of the above-mentioned first-order modifiers, a first-order modified block copolymer having a residue of the functional group-containing first-order modifier can be obtained. When the functional group-containing first-order modifier is addition-bonded to the living terminal of the base block copolymer, the living terminal may be of any of polymer block A and polymer block B. However, from the viewpoint of producing a polymer composition exhibiting an excellent balance of stiffness and impact resistance, it is preferred that the living terminal (to which the functional group-containing first-order modifier is addition-bonded) is of polymer block A.

With respect to the functional group-containing first-order modifier, it is recommended that the amount of functional group-containing first-order modifier used for producing the first-order modified block copolymer is from more than 0.5 equivalent to not more than 10 equivalents, preferably from more than 0.7 equivalent to not more than 5 equivalents, more preferably from more than 1 equivalent to not more than 4 equivalents, relative to one equivalent of the living terminal of the base block copolymer. In the present invention, the amount of the living terminal of the base block copolymer can be calculated from the amount of the organolithium compound used in the copolymerization reaction for producing the base block copolymer.

In the present invention, if desired, a hydrogenation product of the first-order modified block copolymer can be obtained by partial or complete hydrogenation of the first-order modified block copolymer. The hydrogenation is performed after the first-order modification and prior to the second-order modification. With respect to the hydrogenation catalyst, there is no particular limitation, and any of the conventional hydrogenation catalysts can be used. Examples of hydrogenation catalysts include:

(1) a carried, heterogeneous hydrogenation catalyst comprising a carrier (such as carbon, silica, alumina or diatomaceous earth) having carried thereon a metal, such as Ni, Pt, Pd or Ru;

(2) the so-called Ziegler type hydrogenation catalyst which uses a transition metal salt (such as an organic acid salt or acetylacetone salt of a metal, such as Ni, Co, Fe or Cr) in combination with a reducing agent, such as an organoaluminum; and (3) a homogeneous hydrogenation catalyst, such as the so-called organometal complex, e.g., an organometal compound containing a metal, such as Ti, Ru, Rh or Zr. Specific examples of hydrogenation catalysts include those which are described in Examined Japanese Patent Application Publication Nos. Sho 42-8704 (corresponding to U.S. Pat. No. 3,706,814), Sho 43-6636 (corresponding to U.S. Pat. No. 3,333,024), Sho 63-4841 (corresponding to U.S. Pat. No. 4,501,857), Hei 1-37970 (corresponding to U.S. Pat. No. 4,673,714), Hei 1-53851, and Hei 2-9041. As preferred examples of hydrogenation catalysts, there can be mentioned a titanocene compound and a mixture of a titanocene compound and a reductive organometal compound.

Examples of titanocene compounds include those which are described in Unexamined Japanese Patent Application Laid-Open Specification No. Hei 8-109219. As specific examples of titanocene compounds, there can be mentioned compounds, each independently having at least one ligand (e.g., biscyclopentadienyltitanium dichloride and monopentamethylcyclopentadienyltitanium trichloride) having a (substituted) cyclopentadienyl skeleton, an indenyl skeleton or a fluorenyl skeleton. Examples of reductive organometal compounds include organic alkali metal compounds, such as an organolithium compound; an organomagnesium compound; an organoaluminum compound; an organoboron compound; and an organozinc compound.

It is preferred that the hydrogenation reaction for producing the hydrogenation product is performed at 0 to 200° C., more advantageously 30 to 150° C. It is recommended that the hydrogen pressure in the hydrogenation reaction is preferably in the range of from 0.1 to 15 MPa, more preferably from 0.2 to 10 MPa, still more preferably from 0.3 to 5 MPa. The hydrogenation reaction time is preferably in the range of from 3 minutes to 10 hours, more preferably from 10 minutes to 5 hours. The hydrogenation reaction may be performed either in a batchwise manner or in a continuous manner. Further, the hydrogenation reaction may be performed in a manner wherein a batchwise operation and a continuous operation are used in combination.

When the first-order modified block copolymer is subjected to hydrogenation, there is no particular limitation with respect to the hydrogenation ratio as measured with respect to the unsaturated double bonds in the conjugated diene monomer units, and the hydrogenation ratio can be appropriately controlled to a desired level.

In the present invention, with respect to the hydrogenation product of the first-order modified block copolymer, from the viewpoint of obtaining a polymer composition having excellent heat stability, it is recommended that the hydrogenation ratio as measured with respect to the vinyl bonds in the conjugated diene monomer units is preferably 85% or more, more preferably 90% or more, still more preferably 95% or more. Herein, the hydrogenation ratio with respect to the vinyl bonds is the ratio of hydrogenated vinyl bonds, based on the vinyl bonds in the conjugated diene monomer units of the base block copolymer (prior to hydrogenation).

There is no particular limitation with respect to the hydrogenation ratio as measured with respect to the aromatic double bonds in the vinyl aromatic hydrocarbon monomer units of the first-order modified block copolymer. However, it is recommended that the hydrogenation ratio is preferably not more than 50%, more preferably not more than 30%, still more preferably not more than 20%.

The hydrogenation ratio can be measured by a method using a nuclear magnetic resonance (NMR) apparatus.

In the present invention, the second-order modified block copolymer is a modified block copolymer which can be obtained, for example, by reacting the above-mentioned first-order modified block copolymer (I-1) (i.e., semimodified block copolymer) with a second-order modifier having a functional group which is reactive to the functional group of the first-order modifier group of the first-order modified block copolymer (hereinafter, the second-order modifier is frequently referred to under reference numeral (III)), thereby obtaining the second-order modified block copolymer (hereinafter frequently referred to under reference numeral (I)), wherein the second-order modified block copolymer is represented by a formula selected from the group consisting of the above-mentioned formulae (1) to (5).

As described hereinabove, the second-order modified block copolymer used in the present invention can be produced, for example, by a method in which a base block copolymer having a living terminal is produced by a living anionic polymerization in the presence of an organolithium compound as a catalyst, and then, the produced base block copolymer is reacted with a first-order modifier to obtain the first-order modified block copolymer, whereupon, the obtained first-order modified block copolymer is reacted with a second-order modifier, thereby obtaining the second-order modified block copolymer. Examples of the above-mentioned "base block copolymer having a living terminal", "first-order modified block copolymer" and "second-order modified block copolymer" can be, respectively, diagrammatically shown by the following diagrams (i), (ii) and (iii):

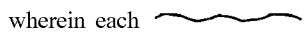

wherein each ⁓⁓⁓ represents the base block copolymer; Li represents a lithium ion; M represents the first-order modifier group; and D represents the second-order modifier group.

In another aspect of the present invention, there is provided a method for producing the second-order modified block copolymer of the present invention, comprising:

(1) providing a first-order modified block copolymer comprising:
　a base block copolymer comprising at least one polymer block (A) comprised mainly of vinyl aromatic hydrocarbon monomer units and at least one polymer block (B) comprised mainly of conjugated diene monomer units, the amounts of the vinyl aromatic hydrocarbon monomer units and the conjugated diene monomer units in the base block copolymer being, respectively, 5 to 95% by weight and 95 to 5% by weight, based on the total weight of the vinyl aromatic hydrocarbon monomer units and the conjugated diene monomer units, and
　a functional group-containing first-order modifier group bonded to the base block copolymer,
　　the base block copolymer being unhydrogenated or at least partially hydrogenated,
　　　wherein the first-order modified block copolymer is produced by a process in which a base block copolymer having a living terminal is produced by a living anionic polymerization, and a functional group-containing first-order modifier is addition-bonded to the living terminal of the base block copolymer to obtain a first-order modified block copolymer, optionally followed by partial or complete hydrogenation of the obtained first-order modified block copolymer, wherein the first-order modified block copolymer is represented by a formula selected from the group consisting of the above-mentioned formulae (6) to (10), and (2) reacting the first-order modified block copolymer with a second-order modifier, wherein the second-order modifier has a functional group which is reactive to the functional group of the first-order modifier group of the first-order modified block copolymer, and wherein the second-order modifier is used in an amount of 0.3 to 10 moles, relative to one equivalent of the functional group of the first-order modifier group of the first-order modified block copolymer,
　thereby obtaining a second-order modified block copolymer.

In the second-order modified block copolymer of the present invention, the functional group of the functional group-containing group $X^1$ (which is the second-order modifier group) is reactive to a functional group-containing thermoplastic resin and/or functional group-containing rubbery polymer, an inorganic filler or the like. In addition, in the second-order modified block copolymer, both the first-order modifier group and the second-order modifier group contain a nitrogen atom, an oxygen atom or a carbonyl group. Between these atoms and group and the polar groups of the thermoplastic resin and/or rubbery polymer, inorganic filler or the like, interactions due to a physical affinity, such as a hydrogen bond or the like, are effectively caused to occur, thereby exerting the effects aimed at by the present invention.

The second-order modifier used in the present invention is a second-order modifier having a functional group which is reactive to the functional group of the first-order modifier group of the first-order modified block copolymer (i.e., semimodified block copolymer (I-1)). Preferred examples of second-order modifiers are as follows. A preferred example of a second-order modifier which can be used for obtaining a second-order modified block copolymer having a functional group represented by the above-mentioned formula (n) is a second-order modifier having a carboxyl group or an acid anhydride group; a preferred example of a second-order modifier which can be used for obtaining a second-order modified block copolymer having a functional group represented by the above-mentioned formula (o) is a second-order modifier having an isocyanate group; a preferred example of a second-order modifier which can be used for obtaining a second-order modified block copolymer having a functional group represented by the above-mentioned formula (p) is a second-order modifier having an epoxy group; and a preferred example of a second-order modifier which can be used for obtaining a second-order modified block copolymer having a functional group represented by the above-mentioned formula (q) is a second-order modifier having a silanol group or an alkoxysilane group. The second-order modifier (III) has at least two such functional groups. However, in the case where the functional group of the second-order modifier (III) is an acid anhydride group, the second-order modifier (III) can be a second-order modifier having only one acid anhydride group. When the first-order modified block copolymer (i.e., semimodified block copolymer (I-1)) is reacted with the second-order modifier (III), it is recommended that the amount of the second-order modifier (III) is from 0.3 to 10 moles, preferably from 0.4 to 5 moles, more preferably from 0.5 to 4 moles, relative to one equivalent of the functional group of the first-order modifier group of the first-order modified block copolymer (I-1). There is no particular limitation with respect to the method for reacting the first-order modified block copolymer (I-1) with the second-order modifier (III), and a conventional method can be employed. Examples of conventional methods include a method using melt-kneading (described below) and a method (described below) in which the components are reacted with each other in a state in which they are dissolved or dispersed together in a solvent. In the latter, there is no particular limitation with respect to the solvent as long as it is capable of dissolving or dispersing each of the components. Examples of solvents include hydrocarbon solvents, such as an aliphatic hydrocarbon, an alicyclic hydrocarbon and an aromatic hydrocarbon; halogen-containing solvents; ester solvents; and ether solvents. In the method in which the components are dissolved or dispersed together in a solvent, the temperature at which the components are reacted with each other is generally −10 to 150° C., preferably 30 to 120° C. The reaction time for this method varies depending on other conditions, but it is generally within 3 hours, preferably from several seconds to 1 hour. As an especially preferred method for producing the second-order modified block copolymer (I), it is recommended that the second-order modifier (III) is added to a reaction mixture containing the produced first-order modified block copolymer (I-1) in situ, to thereby effect a reaction, thus obtaining a second-order modified block copolymer. Further, from the viewpoint of obtaining a second-order modified block copolymer having excellent colorlessness, it is recommended that, after the addition-bonding of the functional group-containing first-order modifier to the living terminal of the base block copolymer, the resultant first-order modified block copolymer is treated with an active hydrogen-containing compound. Examples of active hydrogen-containing compounds include water; alcohols, such as methanol, ethanol, propanol and isopropanol; and inorganic acids, such as hydrochloric acid, sulfuric acid, phosphoric acid and carbonic acid. Further, with respect to the above-mentioned treatment using an active hydrogen-containing compound, from the viewpoint of improving the stability of the second-order modifier group of the second-order modified block copolymer, it is recommended that, after the above-mentioned treatment, the solution of the first-order modified block copolymer (I-1) is neutralized to a pH value of not more than 10, preferably not more than 9, more preferably not more than 8.

Specific examples of second-order modifiers (III) are as follows. Examples of second-order modifiers having a carboxyl group include aliphatic carboxylic acids, such as maleic acid, oxalic acid, succinic acid, adipic acid, azelaic acid, sebacic acid, dodecanedicarboxylic acid, carbalic acid, cyclohexanedicarboxylic acid and cyclopentanedicarboxylic acid; and aromatic carboxylic acids, such as terephthalic acid, isophthalic acid, o-phthalic acid, naphthalenedicarboxylic acid, biphenyldicarboxylic acid, trimesic acid, trimellitic acid and pyromellitic acid.

Examples of second-order modifiers having an acid anhydride group include maleic anhydride, itaconic anhydride, pyromellitic anhydride, cis-4-cyclohexane-1,2-dicarboxylic acid anhydride, 1,2,4,5-benzenetetracarboxylic acid dianhydride, and 5-(2,5-dioxytetrahydroxyfuryl)-3-methyl-3-cyclohexene-1,2-dicarboxylic acid anhydride.

Examples of second-order modifiers having an isocyanate group include tolylene diisocyanate, diphenylmethane diisocyanate and multifunctional aromatic isocyanates.

Examples of second-order modifiers having an epoxy group include tetraglycidyl-1,3-bisaminomethylcyclohexane, tetraglycidyl-m-xylenediamine, diglycidylaniline, ethylene glycol diglycidyl, propylene glycol diglycidyl, terephthalic acid diglycidyl ester acrylate, and the above-mentioned epoxy compounds which are exemplified as first-order modifiers used for obtaining the first-order modified block copolymer (I-1).

Examples of second-order modifiers having a silanol group include hydrolysis products of the above-mentioned alkoxysilane compounds which are exemplified as first-order modifiers used for obtaining the first-order modified block copolymer (I-1). Examples of second-order modifiers having an alkoxysilane group include bis-(3-triethoxysilylpropyl)-tetrasulfane, bis-(3-triethoxysilylpropyl)-disulfane, ethoxysiloxane oligomers, and the above-mentioned silane compounds which are exemplified as first-order modifiers used for obtaining the first-order modified block copolymer (I-1).

In the present invention, especially preferred examples of second-order modifiers include a carboxylic acid having 2 or more carboxyl groups or an anhydride thereof; and second-order modifiers having 2 or more of a group selected from the group consisting of an acid anhydride group, an isocyanate group, an epoxy group, a silanol group or an alkoxysilane group. Specific examples of the especially preferred second-order modifiers include maleic anhydride, pyromellitic anhydride, 1,2,4,5-benzenetetra carboxylic acid dianhydride, toluylenediisocyanate, tetraglycidyl-1,3-bisaminomethylcyclohexane, and bis-(3-triethoxysilylpropyl)-tetrasulfane.

In the present invention, from the viewpoint of improving the mechanical strength and impact resistance of the polymer composition, it is preferred that the first-order modified block copolymer and the second-order modified block copolymer (which can be obtained, for example, by reacting the first-order modified block copolymer with a second-order modifier) have a weight average molecular weight of 30,000 or more. Further, from the viewpoint of improving the processability of the polymer composition and from the viewpoint of improving the compatibility of the second-order modified block copolymer with a thermoplastic resin and/or rubbery polymer, it is preferred that the first-order modified block copolymer and the second-order modified block copolymer have a weight average molecular weight of 1,000,000 or less, more advantageously from 40,000 to 800,000, still more advantageously from 50,000 to 600,000.

In the present invention, the amount of vinyl bonds in the conjugated diene monomer units in the block copolymer can be measured by means of a nuclear magnetic resonance (NMR) apparatus. The hydrogenation ratio also can be measured by means of an NMR apparatus. The weight average molecular weights of the first-order modified block copolymer and second-order modified block copolymer can be measured by gel permeation chromatography (GPC), using a calibration curve obtained with respect to commercially available standard polystyrene samples.

Thus, each of the first-order modified block copolymer and the second-order modified block copolymer can be obtained in the form of a solution. If desired, from the obtained solution, the copolymer may be separated. If desired, before the separation of the copolymer, a catalyst residue may be separated from the solution. Examples of methods for separating the copolymer from the solution include a method in which a polar solvent (which is a poor solvent for the copolymer), such as acetone or alcohol, is added to the solution containing the copolymer, thereby precipitating the copolymer, followed by recovery of the copolymer; a method in which the solution containing the copolymer is added to hot water, while stirring, followed by removal of the solvent by steam stripping; and a method in which the solution containing the copolymer is directly heated to evaporate the solvent. In the present invention, the first-order modified block copolymer and the second-order modified block copolymer may contain, added thereto, any of the conventional stabilizers, such as phenol type stabilizers, phosphorus type stabilizers, sulfur type stabilizers and amine type stabilizers.

In the present invention, the second-order modified block copolymer (component (I)) can be mixed with at least one polymer selected from the group consisting of a thermoplastic resin and a rubbery polymer (hereinafter, the at least one polymer is frequently referred to as "component (II)"), thereby obtaining a polymer composition which can be advantageously used as a material for producing various shaped articles. The ratio of component (I) to component (II) can be appropriately controlled so that each of the components exhibits a maximum effect thereof. The weight ratio of component (I) to component (II) (component (I)/component (II) weight ratio) is generally in the range of from 1/99 to 99/1, preferably from 2/98 to 90/10, more preferably from 5/95 to 70/30. When component (II) is a thermoplastic resin, it is recommended that the component (I)/component (II) weight ratio is in the range of from 2/98 to 90/10, preferably from 5/95 to 60/40, more preferably from 10/90 to 40/60. With respect to the polymer composition comprising components (I) and (II), the second-order modifier component (III) may be further added thereto in an amount of from 0.01 to 20 parts by weight, preferably from 0.02 to 10 parts by weight, more preferably from 0.05 to 7 parts by weight, relative to 100 parts by weight of the total of components (I) and (II).

When the second-order modified block copolymer of the present invention is blended with a thermoplastic resin, the resultant polymer composition exhibits excellent impact resistance and excellent molding processability.

Examples of thermoplastic resins usable as component (II) include a block copolymer of a conjugated diene monomer and a vinyl aromatic monomer (which are described above in connection with the production of the base block copolymer); a polymer of the above-mentioned vinyl aromatic monomer; a copolymer of the above-mentioned vinyl aromatic monomer with at least one vinyl monomer (other than the vinyl aromatic monomer), such as ethylene, propylene, butylene, vinyl chloride and vinylidene chloride; a rubber-modified styrene resin (HIPS); an acrylonitrile/butadiene/styrene copolymer resin (ABS); a methacrylic ester/butadiene/styrene copolymer resin (MBS); an olefin polymer; a cyclic olefin polymer, such as an ethylene/norbornene resin; a polybutene resin; a polyvinyl chloride resin; a polyvinyl acetate resin; a polymer of acrylic acid, or an ester or amide thereof; a polyacrylate resin; a polymer of acrylonitrile and/or methacrylonitrile; a nitrile resin which is a copolymer of (meth)acrylonitrile with a comonomer copolymerizable with (meth)acrylonitrile and which has a (meth)acrylonitrile monomer unit content of 50% by weight or more; a polyamide resin; a polyester resin; a thermoplastic polyurethane resin; a polycarbonate resin; a thermoplastic polysulfone, such as a polyether sulfone and a polyallylsulfone; a polyoxymethylene resin; a polyphenylene ether resin; a polyphenylene sulfide resin, such as polyphenylene sulfide and poly-4,4'-diphenylene sulfide; a polyallylate resin; an ether ketone homopolymer or copolymer; a polyketone resin; a fluororesin; a polyoxybenzoyl polymer; a polyimide resin; a polymer having a structure in which a chain hydrocarbon polymer is partially or completely substituted with fluorine, e.g., a fluororesin, such as polytetrafluoroethylene and a tetrafluoroethylene/perfluoroalkylvinylether copolymer; and a polybutadiene resin, such as 1,2-polybutadiene or trans-polybutadiene. Each of these thermoplastic resins may be modified using the second-order modifier (III). The number average molecular weight of the thermoplastic resin used in the present invention is generally 1,000 or more, preferably in the range of from 5,000 to 5,000,000, more preferably in the range of from 10,000 to 1,000,000.

Among the above-mentioned thermoplastic resins, preferred are a polyester resin, a polyamide resin, a polycarbonate resin, a polyurethane resin, a polyphenylene ether resin, and a polyoxymethylene resin. Each of these thermoplastic resins has a functional group. These thermoplastic resins can be used individually or in combination. The functional group-containing thermoplastic resins are advantageous in that they can react with any of the second-order modified block copolymer (component (I)), the first-order modified block copolymer (component (I-1)) and the second-order modifier (component (III)), thereby obtaining a polymer composition exhibiting a remarkably improved compatibility between the thermoplastic resin and the other component.

Further, when the second-order modified block copolymer of the present invention is blended with a rubbery polymer, the resultant polymer composition exhibits excellent properties with respect to tensile strength, tensile elongation, and molding processability.

Examples of rubbery polymers usable as component (II) include a butadiene rubber and a hydrogenation product thereof; a styrene/butadiene rubber and a hydrogenation product thereof (other than the modified block copolymer (i.e., second-order modified block copolymer) of the present invention); an isoprene rubber; an acrylonitrile/butadiene rubber and a hydrogenation product thereof; an olefin type elastomer, such as a chloroprene rubber, an ethylene/propylene rubber, an ethylene/propylene/diene rubber, an ethylene/butene/diene rubber, an ethylene/butene rubber, an ethylene/hexene rubber or an ethylene/octene rubber; a butyl rubber; an acrylic rubber; a fluororubber; a silicone rubber; a chlorinated polyethylene rubber; an epichlorohydrin rubber; an α,β-unsaturated nitrile/acrylic ester-conjugated diene copolymer rubber; a urethane rubber; a polysulfide rubber; a styrene type elastomer, such as a styrene/butadiene block copolymer and a hydrogenation product thereof, and a styrene/isoprene block copolymer and a hydrogenation product thereof; and a natural rubber. Each of these rubbery polymers may be modified by introducing thereto a functional group, for example, by the second-order modifier (III). Preferred examples of such modified rubbery polymers include olefin type elastomers, such as an ethylene-propylene rubber and an ethylene/propylene/diene rubber, each of which has introduced thereto a functional group which is selected from the group consisting of a hydroxyl group, a carboxyl group, an acid anhydride group, an isocyanate group, an epoxy group, an amino group and an alkoxysilane group; a styrene type elastomer, such as a styrene/butadiene copolymer rubber and a hydrogenation product thereof (other than the modified block copolymer which is a second-order modified block copolymer of the present invention) and a styrene/isoprene copolymer rubber and a hydrogenation product thereof; a butadiene rubber; and an isoprene rubber. The number average molecular weight of the rubbery polymer used in the present invention is preferably 10,000 or more, more preferably in the range of from 20,000 to 1,000,000, still more preferably from 30,000 to 800,000.

The above-exemplified thermoplastic resins and rubbery polymers may be used individually or in any combination. With respect to the combination of different polymers as component (II), there is no particular limitation. For example, as component (II), it is possible to use a plurality of different thermoplastic resins or a plurality of different rubbery polymers. Further, it is also possible to use a thermoplastic resin and a rubbery polymer in combination.

In the present invention, there is also provided a polymer composition comprising:

1 to 99% by weight, preferably from 2 to 90% by weight, more preferably from 5 to 70% by weight, based on the total weight of components (I-1) and (II), of (I-1) the semimodified (i.e., first-order modified) block copolymer, and 99 to 1% by weight, preferably from 98 to 10% by weight, more preferably from 95 to 30% by weight, based on the total weight of components (I-1) and (II), of (II) at least one polymer selected from the group consisting of a thermoplastic resin and a rubbery polymer, and 0.01 to 20 parts by weight, preferably from 0.02 to 10 parts by weight, more preferably from 0.05 to 7 parts by weight, relative to 100 parts by weight of the total of components (I-1) and (II), of (III) the second-order modifier having a functional group which is reactive to the functional group of the first-order modifier group of the semimodified block copolymer (I-1).

When a thermoplastic resin is used as component (II), it is recommended that the component (I-1)/component (II) weight ratio is in the range of from 2/98 to 90/10, preferably from 5/95 to 60/40, more preferably from 10/90 to 40/60.

In the polymer composition, it is preferred that the thermoplastic resin as component (II) is a functional group-containing thermoplastic resin and the rubbery polymer as component (II) is a functional group-containing rubbery polymer. Further, when component (II) contains a functional group, it is recommended to use either a second-order modifier (III) having a functional group which is reactive to both the functional group of component (I) and the functional group of component (II), or a second-order modifier (III) having a functional group which is reactive to both the functional group of the first-order modifier group of component (I-1) and the functional group of component (II).

Specific examples of functional group-containing thermoplastic resins include a polyester resin; a polyamide resin; a polycarbonate resin; a polyurethane resin; a polymer containing in the main chain thereof an imide linkage, such as polyimide, polyaminobismaleimide (polybismaleimide), a bismaleimide triazine resin or a polyimide resin (e.g., polyamide-imide or polyether imide); a polyoxymethylene resin, such as a homopolymer of formaldehyde or trioxane, or a copolymer of formaldehyde or trioxane and at least one member selected from the group consisting of an aldehyde other than formaldehyde or trioxane, a cyclic ether, an epoxide, an isocyanate and a vinyl compound; a polysulfone resin, such as polyether sulfone or polyallylsulfone; a polyphenylene ether resin, such as poly(2,6-dimethyl-1,4-phenylene) ether; a polyphenylene sulfide resin, such as polyphenylene sulfide or poly-4,4'-diphenylene sulfide; a polyallylate resin which is a condensation polymer produced from bisphenol A and phthalic acid; and a polyketone resin.

Further examples of functional group-containing thermoplastic resins include a copolymer of a vinyl aromatic compound with at least one vinyl monomer (other than the vinyl aromatic compound), such as vinyl acetate, acrylic acid and an ester thereof (e.g., methyl acrylate), acrylonitrile and methacrylonitrile; an acrylonitrile/butadiene/styrene copolymer resin (ABS); a methacrylate/butadiene/styrene copolymer resin (MBS); a copolymer of ethylene with a comonomer copolymerizable with ethylene, which has an ethylene monomer unit content of 50% by weight or more (e.g., an ethylene/vinyl acetate copolymer or a hydrolysis product thereof); a polyethylene resin (e.g., an ethylene/acrylic acid ionomer); a copolymer of propylene with a comonomer copolymerizable with propylene, which has a propylene monomer unit content of 50% by weight or more, such as a polypropylene resin (e.g., a propylene/ethyl acrylate copolymer); and a polyvinyl acetate resin which is a copolymer of vinyl acetate with a comonomer copolymerizable with vinyl acetate, which has a vinyl acetate monomer unit content of 50% by weight or more, or a hydrolysis product thereof.

Still further examples of functional group-containing thermoplastic resins include a polymer of acrylic acid or an ester or amide thereof; a polymer of methacrylic acid or an ester or amide thereof; a polyacrylate resin which is a copolymer of such a (meth)acrylic monomer with a comonomer copolymerizable therewith and which has an acrylic monomer unit content of 50% by weight or more; a polymer of acrylonitrile and/or methacrylonitrile; a nitrile resin which is a copolymer of (meth)acrylonitrile with a comonomer copolymerizable with (meth)acrylonitrile and which has a (meth)acrylonitrile monomer unit content of 50% by weight or more; a polyoxybenzoyl type polymer, such as a homopolymer or copolymer obtained by polycondensation of parahydroxybenzoic acid, terephthalic acid, isophthalic acid, 4,4'-dihydroxydiphenyl or derivatives thereof.

The polyester resin used in the present invention contains in the molecule thereof an ester linkage. A representative example of such polyester resin is a polyester which has a structure obtained by a polycondensation of a dicarboxylic acid with a glycol, specifically a structure obtained by subjecting at least one member selected from a group consisting of a dicarboxylic acid, a lower ester thereof, an acid halide thereof and an anhydride thereof, to a polycondensation with a glycol. Examples of aromatic dicarboxylic acids or aliphatic dicarboxylic acids used as a raw material for the polyester resin include oxalic acid, malonic acid, succinic acid, glutaric acid, pimelic acid, suberic acid, adipic acid, sebacic acid, azelaic acid, 1,9-nonanedicarboxylic acid, 1,10-decanedicarboxylic acid, 1,16-hexadecanedicarboxylic acid, terephthalic acid, isophthalic acid, p,p'-dicarboxydiphenyl, p-carboxyphenoxyacetic acid and 2,6-naphthalene dicarboxylic acid. These dicarboxylic acids can be used individually or in combination. Of these, preferred are terephthalic acid and isophthalic acid, which can be used in combination. With respect to the glycol (also called "diol") used as the other raw material for the polyester resin, there are two types of glycols, namely aliphatic glycols and aromatic glycols, such as ethylene glycol, 1,3-propanediol, 1,2-propanediol, 1,4-butanediol, 1,6-hexanediol, 1,4-cyclohexanediol, 1,10-decanediol, neopentyl glycol and p-xylene glycol. These glycols (diols) can be used individually or in combination. Of these, preferred are ethylene glycol, 1,3-propanediol and 1,4-butanediol.

As examples of polyester resins other than those mentioned above, there can be mentioned polylactones obtained by a ring-opening polymerization of a lactone, such as pivalolactone, β-propiolactone, ε-caprolactone or the like. These polyester resins can be used individually or in combination.

With respect to examples of polyamide resins used in the present invention, there can be mentioned a polycondensate of a dicarboxylic acid and a diamine, a polycondensate of an α-aminocarboxylic acid, and a ring-opening polymerization product of a lactam. Specific examples of such polyamide resins include nylon-4,6, nylon-6, nylon-6,6, nylon-6,10, nylon-11, nylon-12 and copolymers thereof (e.g., a nylon-6/nylon-6,6 copolymer and a nylon-6/nylon-12 copolymer). It is preferred that these polyamide resins have a melting temperature in the range of from 150 to 270° C. When an improved processability of the polymer composition is desired, it is more preferred that the melting temperature is 260° C. or lower. The above-mentioned polyamide resins can be used individually or in combination.

The polycarbonate resin used in the present invention is a polymer which can be obtained by the reaction between a divalent or polyvalent phenolic compound and a carbonate precursor. There are a variety of divalent phenolic compounds; for example, 2,2-bis(4-hydroxyphenyl)propane (so-called "bisphenol A"), bis(4-hydroxyphenyl)methane, 2,2-bis(4-hydroxy-3,5-dimethylphenyl)propane, 2,2-bis(4-hydroxy-3-methylphenyl)propane, bis(4-hydroxyphenyl) sulfone, 1,1-bis(4-hydroxyphenyl)ethane, 1,1-bis(4-hydroxyphenyl)cyclohexane and 1,1-bis(4-hydroxyphenyl)-3,3,5-trimethylcyclohexane.

Preferred examples of divalent phenolic compounds include bis(4-hydroxyphenyl)alkanes, especially bisphenol A. These divalent phenolic compounds can be used individually or in combination. With respect to the carbonate precursor, for example, there can be mentioned a carbonyl halide, a carbonyl ester and a haloformate. More specifically, the carbonate precursor is at least one member selected from the group consisting of phosgene, diphenyl carbonate and a dihaloformate of a divalent phenolic compound.

The viscosity average molecular weight of the polycarbonate resin used in the present invention is preferably 10,000 or more, from the viewpoint of improving the strength and heat resistance of the polymer composition. From the viewpoint of improving the processability of the polymer composition, it is preferred that the viscosity average molecular weight of the polycarbonate resin is 60,000 or less, more advantageously from 12,000 to 45,000, still more advantageously from 13,000 to 35,000. In the present invention, the viscosity average molecular weight (M) is calculated from the specific viscosity value, as measured with respect to a solution obtained by dissolving 0.7 g of the polycarbonate resin in 100 ml of a methylene chloride at 20° C.

The polyurethane resin used in the present invention is obtained by a polyaddition reaction between a diisocyanate and a diol and contains, for example, a polymer block (as a soft segment) comprising a polyol (i.e., polyester or polyether) and a polymer block (as a hard segment) comprising a diisocyanate and a glycol. Examples of polyester diols used as a raw material for the polyurethane resin include poly(1,4-butylene adipate), poly(1,6-hexane adipate) and polycaprolactone. On the other hand, examples of polyether diols used as a raw material for the polyurethane resin include polyethylene glycol, polypropylene glycol and polyoxytetramethylene glycol.

Examples of glycols used as a raw material for the polyurethane resin include ethylene glycol, 1,3-propanediol, 1,4-butanediol and 1,6-hexanediol. Examples of diisocyanates used as a raw material for the polyurethane resin include aromatic diisocyanates, alicyclic diisocyanates and aliphatic diisocyanates, such as tolylene diisocyanate, 4,4'-diphenylmethane diisocyanate, hexamethylene diisocyanate and isophorone diisocyanate.

The weight average molecular weight of the polyurethane resin used in the present invention is preferably in the range of from 5,000 to 500,000, more preferably from 10,000 to 300,000, from the viewpoint of obtaining a polymer composition which exhibits excellent mechanical properties.

With respect to the polyphenylene ether resin used in the present invention, there is no particular limitation, and any conventional polyphenylene ether resin can be used. Specific examples of polyphenylene ether resins include poly(2,6-dimethyl-1,4-phenylene ether), poly(2-methyl-6-ethyl-1,4-phenylene ether), poly(2,6-diphenyl-1,4-phenylene ether), poly(2-methyl-6-phenyl-1,4-phenylene ether), poly(2,6-dichloro-1,4-phenylene ether), and modification products thereof (e.g., products obtained by modification with maleic anhydride). Also preferred is a copolymer of 2,6-dimethylphenol and a phenolic compound other than 2,6-dimethylphenol (e.g., 2,3,6-trimethylphenol or 2-methyl-6-butylphenol). Of these, especially preferred are poly(2,6-dimethyl-1,4-phenylene ether), a copolymer of 2,6-dimethylphenol and 2,3,6-trimethylphenol, and modification products thereof. It is recommended that the polyphenylene ether resin has a reduced viscosity preferably in the range of from 0.05 to 0.70, more preferably from 0.10 to 0.60, still more preferably from 0.15 to 0.60 (as measured at 30° C. with respect to a 0.5 g/dl solution of the polyphenylene ether in chloroform). From the viewpoint of obtaining a polymer composition which exhibits especially excellent mechanical strength, it is recommended to use a polyphenylene ether having a reduced viscosity in the range of from 0.30 to 0.60.

With respect to the polyoxymethylene resin used in the present invention, for example, there can be mentioned a homopolymer obtained by polymerization of formaldehyde or trioxane, and a copolymer comprised mainly of formaldehyde or trioxane. The homopolymer as the polyoxymethylene resin is generally used in a modified form in which a terminal group of the homopolymer is converted to an ester group or an ether group, to thereby impart improved heat and chemical resistances to the homopolymer. As an example of the above-mentioned copolymer as the polyoxymethylene resin, there can be mentioned a copolymer of formaldehyde or trioxane and at least one member selected from the group consisting of an aldehyde other than formaldehyde or trioxane, a cyclic ether, a cyclic carbonate, an epoxide, an isocyanate, and a vinyl compound.

If desired, the polymer composition of the present invention may further contain any of the conventional additives. There is no particular limitation with respect to the type of the additive so long as it is an additive which is generally used in combination with a thermoplastic resin or a rubbery polymer.

Examples of conventional additives include an inorganic filler, such as a metal hydroxide, a silica type inorganic filler and a metal oxide; and an organic filler. The amount of the inorganic filler or organic filler is generally in the range of from 0.5 to 2,000 parts by weight, preferably from 1 to 1,000 parts by weight, more preferably from 3 to 500 parts by weight, relative to 100 parts by weight of component (I) or component (I-1), from the viewpoint of obtaining a good balance of the effect of the added filler and the processability of the polymer composition.

The metal hydroxides used as the inorganic filler are hydrate type inorganic fillers, such as aluminum hydroxide, magnesium hydroxide, zirconium hydroxide, hydrated aluminum silicate, hydrated magnesium silicate, basic magnesium carbonate, hydrotalcite, calcium hydroxide, barium hydroxide, hydrated tin oxide and hydrated inorganic metal compounds, such as borax. Further examples of metal hydroxides include a mixture of two or more different metal hydroxides, and a mixture of a metal hydroxide and an inorganic filler other than a metal hydroxide.

The silica type inorganic filler used as the additive is a solid particle comprised mainly of $SiO_2$ or $Si_3Al$. Examples of silica type inorganic fillers include silica, clay, talc, kaolin clay, mica, wollastonite, bentonite, montmorillonite, zeolite, diatomaceous earth, synthetic silica, a glass bead, a glass balloon, a glass flake and a fibrous inorganic substance, such as a glass fiber. Further examples of silica type inorganic fillers include a silica type inorganic filler having its surface rendered hydrophobic, a mixture of two or more different silica type inorganic fillers, and a mixture of a silica type inorganic filler and a non-silica type inorganic filler. Specific examples of silicas include a white carbon produced by the dry process, a white carbon produced by the wet process, a synthetic silicate type white carbon and the so-called colloidal silica.

The metal oxide used as the additive is a solid particle comprised mainly of $M_xO_y$ (wherein M represents a metal atom, and each of x and y independently represents an integer of from 1 to 6). Examples of metal oxides include alumina, titanium oxide, magnesium oxide, zinc oxide and iron oxide. Further, the metal oxide may be a mixture of two or more different metal oxides or may be used in the form of a mixture of a metal oxide and an inorganic filler other than a metal oxide.

These inorganic fillers may be used individually or in combination. Further examples of inorganic fillers include calcium carbonate, magnesium carbonate, barium carbonate, calcium silicate, calcium sulfate, calcium sulfite, titanium oxide, potassium titanate, barium sulfate, barium titanate, zinc oxide, asbestos and a slag wool.

Examples of organic fillers include a carbon black, an acetylene black and a furnace black. Examples of carbon blacks include carbon blacks of various grades, such as FT, SRF, FEF, HAF, ISAF and SAF. It is preferred that the carbon black used has a specific surface area (as measured by the nitrogen adsorption method) of 50 mg/g or more.

The inorganic filler used in the present invention may be subjected to surface treatment prior to use, by using as a surface treating agent. Examples of surface treating agents include an aliphatic acid, such as stearic acid, oleic acid or palmitic acid, or a metal salt thereof; a paraffin, a wax, a polyethylene wax or modification products thereof; an organometal compound, such as an organoborane or an organotitanate; and a silane coupling agent.

With respect to the silane coupling agent, those silane coupling agents generally used for treating an inorganic filler, such as silica, can be used. Examples of silane coupling agents include 3-mercaptopropyltrimethoxysilane, 3-mercaptopropylmethyldimethoxysilane, vinyltrimethoxysilane and vinyltriethoxysilane. In the present invention, as an especially preferred example of a silane coupling agent, there can be mentioned a compound containing a silanol group or an alkoxysilane as well as at least one member selected from the group consisting of a mercapto group and a polysulfide linkage containing two or more sulfur atoms. Specific preferred examples of silane coupling agents include 3-mercaptopropyltrimethoxysilane, 3-aminopropyltriethoxysilane, bis[3-(triethoxysilyl)propyl]tetrasulfide, bis[3-(triethoxysilyl)propyl]disulfide, bis[3-(triethoxysilyl)propyl]trisulfide, bis[2-(triethoxysilyl)ethyl]tetrasulfide, 3-triethoxysilylpropyl-N,N-dimethylthiocarbamoyltetrasulfide, 3-trimethoxysilylpropyl-N,N-dimethylthiocarbamoyltetrasulfide, 3-triethoxysilylpropylbenzothiazoletetrasulfide, and 3-trimethoxysilylpropylbenzothiazoletetrasulfide.

From the viewpoint of obtaining a satisfactory reinforcing effect of the added inorganic filler on the polymer composition, the amount of the silane coupling agent is generally in the range of from 0.1 to 20% by weight, preferably from 0.5 to 18% by weight, more preferably from 1 to 15% by weight, based on the weight of the filler. The silane coupling agent may be used in combination with sulfur or an inorganic peroxide.

In the present invention, for improving the processability of the polymer composition, a rubber-softening agent (VII) (hereinafter frequently referred to as "component (VII)") may be added. As the rubber-softening agent (VII), it is suitable to use a mineral oil, or a liquid or low molecular weight synthetic softening agent. It is preferred to use, for example, the following softening agents: a mineral oil type rubber-softening agent called "process oil" or "extender oil", which is generally used for softening a rubber, for increasing the volume of a rubber or for improving the processability of a rubber; a polybutene; a low molecular weight polybutadiene; a liquid paraffin; a mineral oil; an organic polysiloxane; a castor oil; and a linseed oil. The softening agent may be added to the modified block copolymer of the present invention just after the production thereof. With respect to the type of rubber-softening agent, from the viewpoint of obtaining a polymer composition exhibiting a less discoloration, it is preferred to use a naphthene type softening agent and/or a paraffin type softening agent. The amount of the rubber-softening agent used in the polymer composition is generally in the range of from 0 to 200 parts by weight, preferably from 0 to 100 parts by weight, relative to 100 parts by weight of component (I) or component (I-1).

In the polymer composition of the present invention, there may also be used conventional additives other than those mentioned above. Examples of other conventional additives include those as described in "Gomu Purasuchikku Haigou Yakuhin (Additives for Rubber and Plastic)" (published by Rubber Digest Co., Ltd., Japan (1968)), such as an antioxidant; an ultraviolet absorber; a light stabilizer; a lubricant, such as stearic acid, behenic acid, zinc stearate, calcium stearate, magnesium stearate or etylenebisstearoamide; a mold release agent; a paraffin; a plasticizer; a flame retardant; an antistatic agent; a reinforcing filler, such as an organic fiber, a carbon fiber and a metal whisker; and a pigment or a coloring agent.

With respect to the method for producing the polymer composition of the present invention, there is no particular limitation, and any of the conventional methods can be employed. For example, the polymer composition of the present invention can be produced by a melt-kneading method using a conventional mixing machine, such as a Banbury mixer, a single-screw extruder, a twin-screw extruder, a co-kneader, or a multi-screw extruder, or a method in which the components for the composition are added to a solvent, to thereby obtain a solution or dispersion of a mixture of the components in the solvent, followed by heating to remove the solvent. From the viewpoint of productivity of the composition and uniform mixing of the components of the composition, it is preferred to use the melt-kneading method using an extruder. With respect to the form of the polymer composition, there is no particular limitation, and the composition may be in the form of a pellet, a sheet, a strand or a chip. Further, immediately after the melt-kneading, the resultant molten composition can be directly formed into a shaped article.

In the production of the polymer composition of the present invention, there is no particular limitation with respect to the order of the mixing of the components. For example, the mixing of the components may be performed by a method in which all components are mixed together at a time, or in a method in which some of the components are first mixed together to thereby obtain a preliminary mixture, followed by mixing of the remainder of the components into the preliminary mixture. It is especially preferred to employ a method in which components (I) and (II) are mixed together by a melt-kneading method, or a method in which components (I-1), (II) and (III) are mixed together by a melt-kneading method.

In the present invention, the melt-kneading temperature for producing the polymer composition can be chosen in accordance with the softening temperature or melting temperature of the thermoplastic resin or rubbery polymer used. However, from the viewpoint of obtaining the desired melt viscosity of the thermoplastic resin and of preventing a heat deterioration of the rubbery polymer, component (I) (i.e., the second-order modified block copolymer) and component (I-1) (i.e., the first-order modified block copolymer) or a hydrogenation product thereof, it is generally preferred that the melt-kneading temperature is in the range of from 50 to 350° C., more advantageously from 100 to 330° C., still more advantageously from 130 to 300° C. Further, from the viewpoint of improving the degree of mixing (i.e., dispersibility) of the components, of improving the productivity of the polymer composition and of preventing a deterioration of the components, the melt-kneading time (or the average residence time of the components in the mixing machine used for performing the melt-kneading) is preferably in the range of from 0.2 to 60 minutes, more preferably from 0.5 to 30 minutes, still more preferably from 1 to 20 minutes.

Each of the second-order modified block copolymer and polymer composition of the present invention, as such or in combination with various additives, can be formed into a practically useful shaped article by using a conventional molding method. Examples of conventional molding methods include extrusion molding method, injection molding method, two-color injection molding method, sandwich molding method, blow molding method, compression molding method, vacuum molding method, rotational molding method, powder slush molding method, foam molding method, laminate molding method and calender molding method. If desired, the thus obtained shaped article may be subjected to processing, such as foaming, pulverization, stretching, adhesion, printing, painting and plating. By employing such molding methods, the second-order modified block copolymer and polymer composition of the present invention can be individually formed into various shaped articles, such as a sheet, a film, injection molded articles having various morphologies, a blow molded article, an article made by air-pressure forming, a vacuum molded article, an extrusion molded article, a foam-molded article, a nonwoven fabric, a fibrous shaped article and a synthetic leather. The obtained shaped articles can be advantageously used in various fields, such as the fields of a raw material for food packaging; a material for medical equipment; a material for household electrical appliances and parts thereof, electric devices and parts thereof, automobile parts, industrial parts, household goods, toys, footwears and adhesives; and an asphalt modifier.

Hereinbelow, explanations are made in detail with respect to various compositions containing the first-order modified block copolymer or the second-order modified block copolymer as well as an additive, and various uses of the compositions.

<Flame Retardant Polymer Composition>

The flame retardant polymer composition of the present invention can be obtained by using any one of the following methods (i) to (iii):

(i) a method in which the modified block copolymer (I) (i.e., the second-order modified block copolymer) of the present invention is blended with an inorganic filler (VI) and an olefin polymer;

(ii) a method in which the polymer composition of the present invention comprising components (I) and (II) is blended with an inorganic filler (VI); and (iii) a method in which the polymer composition of the present invention comprising components (I-1), (II) and (III) is blended with an inorganic filler (VI).

In the flame retardant polymer composition of the present invention, the functional group of the functional group-containing group $X^1$ of the modified block copolymer (i.e., the second-order modified block copolymer) used as a component, is reactive to the functional group-containing thermoplastic resin and/or functional group-containing rubbery polymer as well as the inorganic filler (VI). In addition, the modified block copolymer contains a nitrogen atom, an oxygen atom or a carbonyl group. Between these atoms and group and the polar groups of the thermoplastic resin and/or rubbery polymer, and inorganic filler (VI), interactions due to a physical affinity, such as a hydrogen bond or the like, are effectively caused to occur, thereby obtaining the effects that the flame retardant polymer composition exhibits excellent flame retardancy and high toughness.

In the present invention, from the viewpoint of obtaining a flame retardant polymer composition having excellent balance of the flame retardancy, tensile strength at break and tensile elongation at break, the inorganic filler (VI) is used generally in an amount of from 10 to 2,000 parts by weight, preferably from 20 to 1,000 parts by weight, more preferably from 25 to 500 parts by weight, relative to 100 parts by weight of component (I) (i.e., the modified block copolymer of the present invention), 100 parts by weight of the polymer composition of the present invention comprising components (I) and (II), or 100 parts by weight of the polymer composition of the present invention comprising components (I-1), (II) and (III).

As the inorganic filler (VI), those inorganic fillers as mentioned above in connection with the polymer composition can be used.

From the viewpoint of improving the flame retardancy of the flame retardant polymer composition of the present invention, it is preferred to use, as the inorganic filler (VI), hydrate type inorganic fillers, such as aluminum hydroxide, magnesium hydroxide, zirconium hydroxide, hydrated aluminum silicate, hydrated magnesium silicate, basic magnesium carbonate, hydrotalcite, calcium hydroxide, barium hydroxide, hydrated tin oxide and hydrated inorganic metal compounds, such as borax. Among these, especially preferred are magnesium hydroxide and aluminum hydroxide. These inorganic fillers can be used individually or in combination.

For improving the flame retardancy, if desired, the flame retardant polymer composition of the present invention may further contain a phosphorus-containing flame retardant (e.g., an ammonium polyphosphate flame retardant or a phosphate flame retardant), a silicone compound, a quartz glass, a flame retardant auxiliary (e.g., a liquid glass or a frit), and a silicon nitride short fiber or the like for improving the anti-dripping properties.

Examples of olefin polymers used in the flame retardant polymer composition of the present invention include a homopolymer or copolymer of linear α-olefins (e.g., ethylene, propylene, butene-1, pentene-1, hexene-1, heptene-1 and octene-1); and branched α-olefins (e.g., 4-methylpentene-1, 2-methylpropene-1, 3-methylpentene-1, 5-methylhexene-1, 4-methylhexene-1 and 4,4-dimethylpentene-1). With respect to the molecular configuration of the copolymer produced from the above-mentioned olefins, there is no particular limitation, and the copolymer may be, for example, any type selected from the group consisting of a random copolymer, a block copolymer, a graft copolymer and a combination thereof. Specific examples of olefin polymers include polyethylene; a copolymer of ethylene with a comonomer copolymerizable with ethylene, which has an ethylene monomer unit content of 50% by weight or more (e.g., an ethylene/propylene copolymer, an ethylene/butylene copolymer, an ethylene/hexene copolymer or an ethylene/octene copolymer); a polyethylene resin, such as chlorinated polyethylene; polypropylene; a copolymer of propylene with a comonomer copolymerizable with propylene, which has a propylene monomer unit content of 50% by weight or more (e.g., a propylene/ethylene copolymer or a propylene/ethyl acrylate copolymer); a polypropylene resin, such as chlorinated polypropylene; and polybutene-1.

Especially preferred examples of olefin polymers include polyethylene, polypropylene, polybutene-1, a propylene/ethylene copolymer, a propylene/butene-1 copolymer, a butene-1/ethylene copolymer and a propylene/ethylene/butene-1 copolymer.

These olefin copolymers can be used individually or in combination.

In the present invention, from the viewpoint of obtaining a flame retardant polymer composition having excellent balance of the tensile strength and tensile elongation, the olefin polymer is used generally in an amount of from 0 to 1,000 parts by weight, preferably from 2 to 1,000 parts by weight, more preferably from 5 to 800 parts by weight, still more preferably from 10 to 500 parts by weight, relative to 100 parts by weight of the modified block copolymer (I) (i.e., the second-order modified block copolymer) of the present invention.

The flame retardant polymer composition of the present invention not only exhibits an excellent flame retardancy, but also has advantages in that the polymer composition generates no toxic gas (e.g., halogen gas) even when it is on fire, and that the polymer composition exhibits well-balanced mechanical properties. Therefore, the flame retardant polymer composition of the present invention can be advantageously used as a coating material for electric wires (e.g., an internal wiring for use in an electrical equipment, and a wiring harness for use in an automobile) or as a material for an industrial article (e.g., an insulating tape).

<Crosslinked Product>

The crosslinked product of the present invention can be obtained by subjecting the below-mentioned crosslinkable material (i) to melt-kneading in the presence of a vulcanizing agent:

(i) a crosslinkable material comprising component (I) (i.e., the second-order modified block copolymer of the present invention) and component (II) (i.e., at least one polymer selected from the group consisting of a thermoplastic resin and a rubbery polymer).

Further, the crosslinked product of the present invention can also be obtained by subjecting the below-mentioned the polymer composition (ii) to melt-kneading in the presence of a vulcanizing agent:

(ii) the polymer composition of the present invention comprising components (I-1), (II) and (III).

In the crosslinked product of the present invention, the functional group of the functional-group containing group $X^1$ of the modified block copolymer (i.e., the second-order modified block copolymer) used as a component, is reactive to the functional group-containing thermoplastic resin and/or functional group-containing rubbery polymer or the like. In addition, the modified block copolymer contains a nitrogen atom, an oxygen atom or a carbonyl group. Between these atoms and group and the polar groups of the thermoplastic resin and/or rubbery polymer or the like, interactions due to a physical affinity, such as a hydrogen bond or the like, are effectively caused to occur, thereby obtaining a polymer composition which exhibits excellent properties with respect to mechanical strength, oil resistance and the like.

In the above-mentioned crosslinkable material, the component (I)/component (II) weight ratio is generally in the range of from 10/90 to 100/0, preferably from 20/80 to 90/10, more preferably from 30/70 to 80/20. The crosslinkable material may further comprise component (III) in an amount of from 0.01 to 20 parts by weight, relative to 100 parts by weight of component (I).

Also, when the polymer composition of the present invention comprising components (I-1), (II) and (III) is used to produce the crosslinked product of the present invention, the component (I-1)/component (II) weight ratio in the polymer composition is generally in the range of from 10/90 to 100/0, preferably from 20/80 to 90/10, more preferably from 30/70 to 80/20. The component (III) is generally used in an amount of from 0.01 to 20 parts by weight, preferably from 0.02 to 10 parts by weight, more preferably from 0.05 to 7 parts by weight, relative to 100 parts by weight of the total of components (I-1) and (II).

In the present invention, the melt-kneading of the above-mentioned crosslinkable material (i) or polymer composition (ii) in the presence of a vulcanizing agent is performed at a temperature at which the vulcanizing agent causes a crosslinking reaction, so as to effect the mixing of components and the crosslinking reaction simultaneously. The details of the method for effecting such melt-kneading in the presence of a vulcanizing agent are described in A. Y. Coran et al., Rub. Chem. and Technol. vol. 53., 141 (1980). The melt-kneading in the presence of a vulcanizing agent is performed by using an enclosed kneader, such as a Banbury mixer or a pressurizing kneader, or a single-screw or twin-screw extruder. The melt-kneading is generally conducted at 130 to 300° C., preferably 150 to 250° C., for 1 to 30 minutes. In the melt-kneading, an organic peroxide or a phenol resin type crosslinking agent is generally used as the vulcanizing agent.

With respect to the organic peroxide used as a vulcanizing agent, there can be mentioned conventional organic peroxides as described in "Gomu Purasuchikku Haigou Yakuhin (Additives for Rubber and Plastic)" (published by Rubber Digest Co., Ltd., Japan (1968)). Among those, preferred are dicumyl peroxide, di-tert-butyl peroxide, 2,5-dimethyl-2,5-di(tert-butylperoxy)hexane, 2,5-dimethyl-2,5-di(tert-butylperoxy)hexyne-3, 1,3-bis(tert-butylperoxyisopropyl)benzene, 1,1-bis(tert-butylperoxy)-3,3,5-trimethylcyclohexane, n-butyl-4,4-bis(tert-butylperoxy)valerate, and di-tert-butyl peroxide.

Further, when the above-mentioned organic peroxide is used for the crosslinking (vulcanization) to obtain the desired crosslinked product, it is preferred to use, in combination with the organic peroxide, auxiliary vulcanizing agents. Examples of auxiliary vulcanizing agents include auxiliaries for use in peroxide crosslinking, such as sulfur, p-quinone dioxime, p,p'-dibenzoylquinonedioxime, N-methyl-N-4-dinitrosoaniline, nitrosobenzene, diphenylguanidine and trimethylolpropane-N,N'-m-phenylene dimaleimide; divinyl benzene; triallyl cyanurate; multifunctional methacrylate monomers, such as ethyleneglycol dimethacrylate, diethyleneglycol dimethacrylate, polyethyleneglycol dimethacrylate, trimethylol propane trimethacrylate and allyl methacrylate; and multifunctional vinyl monomers, such as vinyl butylate and vinyl stearate.

When performing the melt-kneading of the components for the crosslinked product in the presence of a vulcanizing agent, the vulcanizing agent is generally used in an amount of from 0.01 to 15 parts by weight, preferably from 0.04 to 10 parts by weight, relative to 100 parts by weight of component (I) in the case where component (II) is not used, or relative to 100 parts by weight of the polymer composition in the case where component (II) is used.

If desired, the crosslinked product of the present invention may contain an additive so long as the properties of the crosslinked product are not adversely affected. Examples of additives include a softening agent, a thermal stabilizer, an antistatic agent, a weathering stabilizer, an antioxidant, a filler, a coloring agent and a lubricant. When the additive is used, the additive is incorporated into the components for the crosslinked product before the crosslinking reaction is effected.

The above-mentioned component (VII) (i.e., the rubber-softening agent) may be used as a softening agent for controlling the hardness and fluidity of the crosslinked product. The amount of the softening agent is generally in the range of from 0 to 200 parts by weight, preferably 10 to 150 parts by weight, more preferably 20 to 100 parts by weight, relative to 100 parts by weight of component (I) or (I-1).

Examples of fillers include calcium carbonate, talc, clay, calcium silicate, magnesium carbonate and magnesium hydroxide. The amount of the filler is generally in the range of from 0 to 200 parts by weight, preferably 10 to 150 parts by weight, more preferably 20 to 100 parts by weight, relative to 100 parts by weight of component (I) or (I-1).

In the present invention, it is preferred that the crosslinking is performed so that the content of gel (exclusive of inherently insoluble components, such as the inorganic filler) is 5 to 80% by weight, more advantageously 10 to 70% by weight, still more advantageously 20 to 60% by weight, based on the weight of the crosslinked product. The gel content is determined by the following method. A sample (1 g) of a crosslinked product is refluxed in a Soxhlet's extractor for 10 hours using boiled xylene. The resultant residue is filtered through an 80-mesh wire mesh. The dry weight (g) of the insoluble matters remaining on the filter is measured, and the ratio (% by weight) of the obtained dry weight to the weight of the sample is calculated. The obtained ratio is defined as the gel content of the crosslinked product.

The crosslinked product of the present invention is a composition which exhibits excellent properties with respect to, for example, mechanical strength and oil resistance, and which can be advantageously used in the above-mentioned various application fields.

<Adhesive Composition>

By adding a tackifier (hereinafter frequently referred to as "component (VIII)") to component (I) (i.e., the second-order modified block copolymer) or, alternatively, to a mixture of component (I-1) (i.e., the first-order modified block copolymer) or a hydrogenation product thereof and component (III) (i.e., the second-order modifier), an adhesive composition can be prepared.

In the adhesive composition of the present invention, the functional group of the functional group-containing group $X^1$ of the modified block copolymer (i.e., the second-order modified block copolymer) used as a component, or the second-order modifier (III) used as a component, is reactive to the functional group-containing tackifier used as a component. In addition, either the modified block copolymer or the reaction product between the semimodified block copolymer (i.e., component (I-1)) and the second-order modifier (i.e., component (III)) contains a nitrogen atom, an oxygen atom or a carbonyl group. Between these atoms and group and the polar groups of the tackifier (VIII), interactions due to a physical affinity, such as a hydrogen bond or the like, are effectively caused to occur, thereby obtaining a polymer composition which exhibits an excellent balance of adhesive properties (e.g., the softening point, adhesion strength and shear adhesion).

In the production of the adhesive composition of the present invention, the above-mentioned component (I) or (I-1) is used. It is especially preferred that the base block copolymer of the component (I) or (I-1) comprises:

(a) 20 to 90% by weight, more advantageously 25 to 80% by weight of a block copolymer which comprises as a skeleton thereof a polymer block (A) comprised mainly of vinyl aromatic hydrocarbon monomer units and a polymer block (B) comprised mainly of conjugated diene monomer units, and (b) 80 to 10% by weight, more advantageously 75 to 20% by weight of a block copolymer which comprises as a skeleton thereof at least two polymer blocks (A) comprised mainly of vinyl aromatic hydrocarbon monomer units and at least one polymer block (B) comprised mainly of conjugated diene monomer units.

When the base block copolymer comprises the above-mentioned base block copolymer components (a) and (b), the adhesive composition exhibits an excellent balance of shear adhesion, adhesion strength and melt viscosity. It is preferred that the molecular weight of the base block copolymer component (a) (as measured by gel permeation chromatography (GPC) using a calibration curve obtained with respect to commercially available standard polystyrene samples) is from 30,000 to 150,000, more advantageously from 40,000 to 140,000, still more advantageously from 50,000 to 130,000; and that the molecular weight of the base block copolymer component (b) (as measured by gel permeation chromatography (GPC) in the same manner as mentioned above) is from 100,000 to 300,000, more advantageously from 120,000 to 280,000, still more advantageously from 140,000 to 260,000. Both these preferences are taken from the viewpoint of obtaining an adhesive composition which exhibits an excellent balance of shear adhesion, adhesion strength and melt viscosity.

With respect to component (VIII) (i.e., the tackifier) used to produce the adhesive composition of the present invention, there is no particular limitation, and it is possible to use any conventional tackifying resins, such as a rosin type terpene resin, a hydrogenated rosin type terpene resin, a coumarone resin, a phenolic resin, a terpene/phenol resin, an aromatic hydrocarbon resin and an aliphatic hydrocarbon resin. These tackifiers can be used individually or in combination. Specific examples of tackifiers include those which are described in the above-mentioned "Gomu Purasuchikku Haigou Yakuhin (Additives for Rubber and Plastic)" (published by Rubber Digest Co., Ltd., Japan (1968)). The amount of the tackifier is generally from 20 to 400 parts by weight, preferably from 50 to 350 parts by weight, relative to 100 parts by weight of component (I) or (I-1), from the viewpoint of obtaining an adhesive composition exhibiting an excellent balance of adhesion strength and shear adhesion.

The adhesive composition of the present invention may contain the above-mentioned component (VII) (i.e., the rubber-softening agent) as a softening agent. The addition of a softening agent to the adhesive composition is advantageous in that the viscosity of the adhesive composition is reduced, so that the processability and tackiness of the adhesive composition are improved. The amount of the softening agent is preferably from 0 to 200 parts by weight, more preferably from 0 to 100 parts by weight, relative to 100 parts by weight of component (I) or (I-1), from the viewpoint of obtaining an adhesive composition which exhibits an excellent balance of adhesion strength and shear adhesion.

Further, if desired, the adhesive composition may contain a stabilizer, such as an antioxidant, a light stabilizer or an ultraviolet light absorbent, each of which is described in the above-mentioned "Gomu Purasuchikku Haigou Yakuhin (Additives for Rubber and Plastic)" (published by Rubber Digest Co., Ltd., Japan (1968)). Also, if desired, the adhesive composition may contain at least one member selected from the group consisting of waxes (such as a paraffin wax, a microcrystalline wax, and a low molecular weight polyethylene wax); thermoplastic resins (such as polyolefin thermoplastic resins (e.g., amorphous polyolefin and an ethylene/ethylacrylate copolymer) and low molecular weight vinyl aromatic thermoplastic resins); natural rubbers; synthetic rubbers, such as a polyisoprene rubber, a polybutadiene rubber, a styrene/butadiene rubber, an ethylene/propylene rubber, a chloroprene rubber, an acrylic rubber, an isoprene/isobutylene rubber, a polypentenamer rubber, a styrene/butadiene or styrene/isoprene block copolymer other than the semimodified block copolymer used in the present invention or the modified block copolymer of the present invention.

With respect to the method for producing the adhesive composition, the adhesive composition can be produced by a method in which the above-mentioned components for the adhesive composition are uniformly mixed using a conventional mixer or kneader while heating, generally at a temperature of from 150 to 210° C.

The adhesive composition of the present invention has an improved softening temperature and exhibits an excellent balance of adhesion properties (e.g., adhesion strength and shear adhesion). By virtue of these excellent properties, the adhesive composition can be advantageously used as a material for an adhesive tape and label, a pressure-sensitive lamina, a pressure-sensitive sheet; a back adhesive for fixing a lightweight plastic shaped article, a back adhesive for fixing a carpet or tile and the like. Especially, the adhesive composition can be advantageously used as a material for an adhesive tape and label.

<Adhesive Film for Protecting a Surface (Hereinafter Referred to as "Surface Protection Adhesive Film")>

The surface protection adhesive film of the present invention can be obtained by forming an adhesive layer on a resin film, wherein the adhesive layer comprises one member selected from the group consisting of an adhesive composition comprising components (I) and (VIII) and an adhesive composition comprising components (I-1), (III) and (VIII). In the adhesive layer of the surface protection adhesive film of the present invention, the functional group of the functional group-containing group $X^1$ of the modified block copolymer (i.e., the second-order modified block copolymer) used as a component, is reactive to the functional group-containing tackifier (i.e., component (VIII)). In addition, the modified block copolymer contains a nitrogen atom, an oxygen atom or a carbonyl group. Between these atoms and group and the polar groups of the tackifier, interacttions due to a physical affinity, such as a hydrogen bond or the like, are effectively caused to occur, thereby obtaining a surface protection adhesive film which exhibits excellent properties with respect to anchoring strength and the like.

In the present invention, the adhesive layer of the surface protection adhesive film generally has a thickness of 200 µm or less, preferably from 5 to 50 µm. On the other hand, the resin film of the surface protection adhesive film generally has a thickness of 300 µm or less, preferably from 10 to 100 µm.

In the surface protection adhesive film of the present invention, component (VIII) (i.e., the tackifier) as a component of the adhesive layer, is generally used in an amount of from 3 to 200 parts by weight, preferably from 5 to 150 parts by weight, more preferably from 10 to 120 parts by weight, relative to 100 parts by weight of component (I) or (I-1), from the viewpoint of obtaining a surface protection adhesive film exhibiting a good balance of adhesion properties (e.g., the adhesion strength, the adhesion strength after the film adhered on a surface is allowed to stand for a long period of time, and less occurrence of left-over glue on a surface after peeling off the adhered film therefrom). On the other hand, component (III) is used in an amount of from 0.01 to 20 parts by weight, relative to 100 parts by weight of component (I-1).

With respect to the material of the resin film used for producing the surface protection adhesive film of the present invention, there can be used a nonpolar resin or a polar resin. Examples of nonpolar resins include a polystyrene resin and a polyolefin resin. As examples of polystyrene resins, there can be mentioned polystyrene, a block copolymer of styrene and a conjugated diene compound, a homopolymer of the above-mentioned vinyl aromatic compounds, a copolymer of the above-mentioned vinyl aromatic compounds and at least one vinyl monomer other than the vinyl aromatic compounds (e.g., ethylene, propylene, butylene, vinyl chloride or vinylidene chloride); a rubber-modified styrene resin (HIPS); an acrylonitrile/butadiene/styrene copolymer resin (ABS); and a methacrylate/butadiene/styrene copolymer resin (MBS). With respect to the polyolefin resin used as a nonpolar resin for the resin film, the polyolefin resin may contain a thermoplastic olefin elastomer, such as a copolymer rubber produced from two or more α-olefin monomers, or a copolymer rubber produced from an α-olefin monomer and a monomer other than the α-olefin monomer. Examples of such copolymer rubbers include an ethylene/propylene copolymer rubber (EPR), an ethylene/butene copolymer rubber (EBR), an ethylene/octene copolymer rubber, and an ethylene/propylene/diene copolymer rubber (EPDM).

On the other hand, as an example of a polar resin which is used for the resin film of the surface protection adhesive film of the present invention, there can be mentioned the above-mentioned functional group-containing thermoplastic resins.

Among these nonpolar and polar resins used as a resin film for producing the surface protection adhesive film of the present invention, preferred is a resin which can be used to produce a resin film by employing a melt-extrusion molding method. Preferred examples of such resins include polyethylene, a homopolymer or block copolymer of propylene; a polyester resin, such as polyethylene terephthalate or polybutylene terephthalate; a polyamide resin; and an ethylene/vinyl acetate copolymer or hydrolysates thereof, from the viewpoint of, for example, obtaining high performance at low cost.

With respect to the method for producing the surface protection adhesive film of the present invention, for example, the following method can be employed.

By using a melt-coextrusion equipment, the adhesive composition (for producing the adhesive layer) and the thermoplastic resin (for producing the resin film) are simultaneously and individually melt-kneaded to form two separate fluids, namely an adhesive layer-forming fluid and a resin film-forming fluid, and the obtained two fluids are caused to attach to each other in the die so as to form a single fluid comprising two layers in the die. Then, the single fluid is extruded through the die, to thereby obtain a laminate composite film comprising an adhesive layer and a thermoplastic resin film layer. Thus, a surface protection adhesive film has been obtained. Alternatively, the surface protection adhesive film of the present invention can also be produced simply by, for example, a method in which an adhesive composition is applied to the surface of a resin film, to thereby form an adhesive film.

The surface protection adhesive film of the present invention exhibits an excellent anchoring strength (i.e., the adhesion strength between the adhesive layer and the resin film). Therefore, the surface protection adhesive film of the present invention is advantageous, for example, in that, even when the surface protection adhesive film is adhered onto the surface of a metal plate and the like, and the metal plate carrying the film is worked or is allowed to stand for a long period of time, followed by peeling off of the film from the metal plate, there is no marked occurrence of a left-over glue on the metal plate.

<Asphalt Composition>

By adding an asphalt (hereinafter frequently referred to as "component (IX)") to component (I) (i.e., the second-order modified block copolymer), or alternatively, by blending components (I-1), (III) and (IX) together, the asphalt composition of the present invention can be prepared. In the asphalt composition of the present invention, the functional group of the functional group-containing group $X^1$ of the modified block copolymer (i.e., the second-order modified block copolymer) used as a component, or the second-order modifier (III) used as a component, is reactive to the functional group of the asphalt (i.e., component (IX)). In addition, either the modified block copolymer or the reaction product between the semimodified block copolymer (i.e., component (I-1)) and the second-order modifier (i.e., component (III)) contains a nitrogen atom, an oxygen atom or a carbonyl group. Between these atoms and group and the polar groups of the asphalt, interactions due to a physical affinity, such as a hydrogen bond or the like, are effectively caused to occur, thereby obtaining an asphalt composition which exhibits excellent properties with respect to, e.g., softening temperature, ductility, flexural properties, aggregate-gripping properties and storage stability at high temperatures.

In the production of the asphalt composition of the present invention, component (I) or component (I-1) is used. It is especially preferred that the base block copolymer of the component (I) or (I-1) comprises:

(a) 20 to 90% by weight, more advantageously 25 to 80% by weight of a block copolymer which comprises as a skeleton thereof a polymer block (A) comprised mainly of vinyl aromatic hydrocarbon monomer units and a polymer block (B) comprised mainly of conjugated diene monomer units, and (b) 80 to 10% by weight, more advantageously 75 to 20% by weight of a block copolymer which comprises as a skeleton thereof at least two polymer blocks (A) comprised mainly of vinyl aromatic hydrocarbon monomer units and at least one polymer block (B) comprised mainly of conjugated diene monomer units.

When the base block copolymer comprises the above-mentioned base block copolymer components (a) and (b), the asphalt composition exhibits an excellent balance of the softening temperature and the anti-phase separation property. It is preferred that the molecular weight of the base block copolymer component (a) (as measured by gel permeation chromatography (GPC) using a calibration curve obtained with respect to commercially available standard polystyrene samples) is from 30,000 to 150,000, more advantageously from 40,000 to 140,000, still more advantageously from 50,000 to 130,000; and that the molecular weight of the base block copolymer component (b) (as measured by gel permeation chromatography (GPC) in the same manner as mentioned above) is from 100,000 to 300,000, more advantageously from 120,000 to 280,000, still more advantageously from 140,000 to 260,000, both from the viewpoint of obtaining an asphalt composition which exhibits an excellent balance of the softening temperature and the anti-phase separation property.

Examples of asphalts (i.e., component (IX)) for use in the asphalt composition of the present invention include a petroleum asphalt (i.e., asphalt by-produced by oil refining), natural asphalt, and mixtures thereof with petroleum. Each of the above-mentioned asphalts contains bitumen as the main component thereof. Specific examples of asphalts include a straight asphalt, a semi-blown asphalt, a blown asphalt, tar, pitch, a cutback asphalt (i.e., a mixture of asphalt with oil), and an asphalt emulsion. These asphalts can be used individually or in combination. In the present invention, as a preferred asphalt, there can be mentioned a straight asphalt having a penetration ratio of from 30 to 300, preferably from 40 to 200, more preferably from 45 to 150, wherein the penetration ratio of the asphalt is measured in accordance with JIS-K 2207. The amount of component (I) or (I-1) contained in the asphalt composition of the present invention is generally from 0.5 to 50 parts by weight, preferably from 1 to 30 parts by weight, more preferably from 3 to 20 parts by weight, relative to 100 parts by weight of component (IX) (i.e., the asphalt) contained in the asphalt composition.

When the asphalt composition of the present invention comprises components (I-1), (IX) and (III), component (III) is generally used in an amount of from 0.01 to 5 parts by weight, preferably from 0.05 to 5 parts by weight, more preferably from 0.1 to 5 parts by weight, still more preferably from 0.2 to 3 parts by weight, still more preferably from 0.5 to 2 parts by weight, relative to 100 parts by weight of component (IX) (i.e., the asphalt). On the other hand, the asphalt composition of the present invention comprising components (I) and (IX), may further comprise 0.1 to 5 parts by weight of component (III), relative to 100 parts by weight of component (IX).

If desired, the asphalt composition of the present invention may contain a sulfur-containing component (hereinafter frequently referred to as "component (X)"). As component (X), there can be used, for example, a powdery sulfur, a precipitated sulfur, a colloidal sulfur, a surface-treated sulfur, an insoluble sulfur and an inert sulfur. Further examples of component (X) include a sulfur-containing compound, such as sulfur chloride, sulfur dioxide, morpholine disulfide, an alkylphenol disulfide and a high-molecular weight polysulfide. Also, component (X) can be used in combination with an appropriate amount of a crosslinking accelerator. As a crosslinking accelerator, there can be used a sulfenamide type accelerator, a guanidine type accelerator, a thiuram type accelerator, an aldehyde-amine type accelerator, an aldehyde-ammonia type accelerator, a thiazole type accelerator, a thiourea type accelerator, a dithiocarbamate type accelerator and a xanthate type accelerator. Specific examples of such crosslinking accelerators include a diphenylguanidine, n-butyl aldehyde-anil condensate, a hexamethylenetetramine, 2-mercaptobenzothiazole, N-cyclohexyl-2-benzothiazyl sulfenamide, thiocarbanilide, tetramethylthiuram monosulfide, sodium dimethyl dithiocarbamate and zinc isopropyl xanthogenate. The sulfur content of component (X) is generally in the range of from 0.01 to 10 parts by weight, preferably from 0.05 to 5 parts by weight, more preferably from 0.1 to 2 parts by weight, relative to 100 parts by weight of component (IX). When the crosslinking accelerator is used, the amount of crosslinking accelerator is generally in the range of from 0.01 to 10 parts by weight, preferably from 0.05 to 5 parts by weight, more preferably from 0.1 to 2 parts by weight, relative to 100 parts by weight of component (IX) (i.e., an asphalt).

The asphalt composition of the present invention may contain a silane coupling agent. As a silane coupling agent, the silane coupling agents mentioned above in connection with the polymer composition can be used. The silane coupling agent is used generally in an amount of from 0.01 to 20 parts by weight, preferably from 0.05 to 10 parts by weight, more preferably from 0.1 to 5 parts by weight, relative to 100 parts by weight of component (IX).

From the viewpoint of obtaining an asphalt composition which exhibits excellent aggregate-gripping properties, the asphalt composition of the present invention may contain a surfactant, such as an anionic surfactant, a cationic surfactant and a nonionic surfactant. Specific examples of surfactants include a higher fatty acid and a metal salt thereof, a monoamine compound, a diamine compound, a polyamine compound and a co-oligomer of polyethylene oxide and polypropylene oxide. Further examples of surfactants include an acidic, organic phosphate compound; a mixture of an acidic, organic phosphate compound and an inorganic phosphate compound; a polyvalent carboxylic acid or an anhydride thereof; an aliphatic phosphate; a phosphoric acid ester with a higher alcohol (e.g., stearyl phosphate); a mixture of a higher alcohol and a phosphorylated alcohol; gallic acid or derivatives thereof; fatty acids derived from a tall oil, or derivatives thereof; a condensate of polyalkylenepolyamine and a fatty acid; a liquid epoxy; a graft-modified polyethylene obtained by grafting maleic anhydride onto polyethylene; a graft-modified polypropylene obtained by grafting maleic anhydride onto polypropylene; a graft-modified SBS (styrene/butadiene block copolymer) obtained by grafting maleic anhydride onto SBS; a graft-modified SEBS (styrene/ethylene/butylene block copolymer) obtained by grafting maleic anhydride onto SEBS; and a graft-modified SEPS (styrene/ethylene/propylene block copolymer) obtained by grafting maleic anhydride onto SEPS.

If desired, the asphalt composition of the present invention may contain any of the conventional additives. There is no limitation with respect to the type of the additive so long as it is an additive which is generally used in combination with a thermoplastic resin or a rubbery copolymer. Examples of conventional additives include component (VI) (i.e., the inorganic filler), an inorganic filler other than component (VI), an organic filler, a silane coupling agent, component (VII) (i.e., the rubber-softening agent), component (VIII) (i.e., the tackifier), a stabilizer (e.g., antioxidant), a vulcanizing agent (e.g., an organic peroxide or a phenol resin crosslinking agent), an auxiliary for use in peroxide crosslinking, a polyfunctional vinyl monomer, and other various additives as mentioned above. If desired, component (II) may be used as an additive.

The asphalt composition of the present invention exhibits excellent properties with respect to, e.g., softening temperature, ductility, flexural properties, aggregate-gripping properties and storage stability at high temperatures. Hence, the asphalt composition can be advantageously used in a wide variety of fields, such as the fields of a material for use in road paving, a material for a waterproof sheet, a material for a sound insulating sheet and a roofing material.

By virtue of its excellent properties with respect to storage stability at high temperatures, ductility, flexural properties at low temperatures and aggregate-gripping properties, the asphalt composition of the present invention can be advantageously used as a binder for a drainage pavement for various roads, for example, a road having a large traffic, an expressway, and a road segment at which the load of traffic tends to concentrate (e.g., an intersection or a curving road).

The drainage pavement of the present invention comprises a road and, formed thereon, a drainage pavement layer having a plurality of voids for drainage, wherein the drainage pavement layer is comprised of a plurality of aggregates and a binder, wherein the binder comprises the asphalt composition of the present invention.

When the asphalt composition of the present invention is used as a binder for a drainage pavement, the obtained drainage pavement exhibits excellent properties with respect to, e.g., rutting resistance, water permeability, traffic noise reduction properties and low-temperature properties (e.g., crack resistance at low temperatures).

Generally, an asphalt pavement is formed by the following method. To a mixture of a coarse aggregate (e.g., crushed stone), a fine aggregate (e.g., sand, crushed sand or stone dust) and the like (wherein the mixture has an appropriate range of particle size distribution), is added a binder which is heated (generally at a temperature of from 150 to 210° C.), to thereby obtain an asphalt mixture (wherein the amount of the binder is from 5.3 to 6.5%, preferably from 5.5 to 6%). The obtained asphalt mixture is spread over a road, and the resultant asphalt mixture layer on the road is rolled flat by using a roller or the like, to thereby obtain an asphalt pavement.

The drainage pavement of the present invention is formed by the following method. To a mixture of a coarse aggregate (e.g., crushed stone), a fine aggregate (e.g., sand, crushed sand or stone dust) and the like (wherein the mixture has an appropriate range of particle size distribution), is added the asphalt composition of the present invention as a binder, wherein the binder is heated (generally at a temperature of from 150 to 210° C.), to thereby obtain an asphalt mixture (wherein the amount of the binder is from 4.5 to 5.5%, preferably from 4.7 to 5.3%). The obtained asphalt mixture (containing the asphalt composition of the present invention) is spread over a road, and the resultant asphalt mixture layer on the road is rolled flat by using a roller or the like, to thereby obtain the drainage pavement of the present invention. The drainage pavement layer of the drainage pavement of the present invention has an extremely large number of intercommunicating voids for drainage, as compared to the number of voids in the pavement layer of the conventional pavement produced using a conventional asphalt mixture. By virtue of such property, the drainage pavement of the present invention exhibits excellent functions, e.g., the drainability for preventing the occurrence of rain pools, the ability to ensure safe driving by preventing a continuous water thin layer from being formed by rain on the road, and the ability to reduce traffic noise (e.g., an exhaust noise or a noise caused by the contact between rotating tires and the road surface). With respect to the void ratio of drainage pavement layer of the drainage pavement of the present invention, a desired void ratio can be obtained by controlling the size (i.e., particle diameter) of the aggregates and the mixing ratio of the aggregates and the asphalt. It is preferred that the drainage pavement layer of the drainage pavement of the present invention formed using the asphalt composition of the present invention has a void ratio of from 5 to 35%, more advantageously from 10 to 30%, still more advantageously from 12 to 28%.

The void ratio of the drainage pavement layer is defined by the following formula:

$$\text{Void ratio } (\%) = \frac{V_V}{V} \times 100 = \left[1 - \frac{\rho_m}{D}\right] \times 100$$

wherein:

$\rho_m$ represents the density (g/cm$^3$) of the asphalt mixture,

V represents the volume (cm$^3$) of the asphalt mixture, $V_v$ represents the void volume (cm$^3$) of the asphalt mixture, and D represents the theoretical maximum density (g/cm$^3$) of the asphalt mixture.

BEST MODE FOR CARRYING OUT THE INVENTION

Hereinbelow, the present invention will be described in more detail with reference to the following Examples and Comparative Examples, which should not be construed as limiting the scope of the present invention.

1. Characteristics of a Block Copolymer or Hydrogenated Block Copolymer (1) Styrene Content:

The absorption intensity of a block copolymer at 262 nm was measured using an ultraviolet spectrophotometer (trade name: UV200; manufactured and sold by Hitachi, Ltd., Japan), and the styrene content was calculated therefrom.

(2) Styrene Block Ratio:

A predetermined amount (from 30 to 50 mg) of a block copolymer was precisely weighed and added to about 10 ml of chloroform. To the resultant were added osmium tetroxide (as a catalyst) and tertiary butyl hydroxyperoxide (as an oxidant) to obtain a mixture. The obtained mixture was boiled at 100° C. for 20 minutes to effect an oxidative degradation of the block copolymer, thereby obtaining a reaction mixture. To the obtained reaction mixture was added methanol in an amount of 200 ml to precipitate a polystyrene, thereby obtaining a precipitate. The obtained precipitate was filtered using 11G4 (manufactured and sold by SHIBATA SCIENTIFIC TECHNOLOGY LTD., Japan) to obtain a filtration residue comprised of a polystyrene. The polystyrene obtained as the filtration residue was weighed, and a styrene block ratio was calculated from the following formula:

Styrene block ratio (wt %)=(weight of the filtration residue/weight of styrene monomer units in the above-mentioned predetermined amount of the block copolymer)×100.

(3) Vinyl Bond Content and Hydrogenation Ratio:

The vinyl bond content and hydrogenation ratio were measured by means of a nuclear magnetic resonance (NMR) apparatus (trade name: DPX-400; manufactured and sold by BRUKER, Germany).

(4) Weight Average Molecular Weight:

The weight average molecular weight was measured by gel permeation chromatography (GPC) (GPC apparatus: LC10 column: Shimpac GPC805+GPC804+GPC804+GPC803; both of the apparatus and column are manufactured and sold by Shimadzu Corporation, Japan) under conditions wherein tetrahydrofuran was used as a solvent and the column temperature was 35° C. The weight average molecular weight was determined from a GPC chromatogram showing the peak molecular weight, using a calibration curve obtained with respect to commercially available monodisperse standard polystyrene samples.

(5) Ratio of Unmodified Block Copolymer Fractions in a Modified Block Copolymer:

A sample solution was prepared by mixing together 20 ml of tetrahydrofuran, 10 mg of a modified block copolymer and 10 mg of a low molecular weight internal standard polystyrene having a weight average molecular weight of 8,000. The sample solution was subjected to gel permeation chromatography (GPC) in the same manner as in item (4) above, to thereby obtain a chromatogram. From the chromatogram, the ratio (a) of the peak area of the modified block copolymer to the peak area of the internal standard polystyrene was determined. On the other hand, the same sample solution as mentioned above was subjected to gel permeation chromatography (GPC) in the same manner as in item (4) above, except that there were used the GPC apparatus Zorbax (manufactured and sold by DuPont, U.S.A) and a column packed with a silica gel. The silica gel adsorbs the modified block copolymer fractions but does not adsorb the unmodified block copolymer fractions. From the resultant chromatogram, the ratio (b) of the peak area of the block copolymer (i.e., unmodified block copolymer fractions) to the peak area of the internal standard polystyrene was determined. Thus, the ratio (a) reflects the total peak area ascribed to both the unmodified block copolymer fractions and the modified block copolymer fractions, and the ratio (b) reflects the peak area ascribed to only the unmodified block copolymer fractions. Therefore, from the ratio (a) and the ratio (b), the ratio of the unmodified block copolymer fractions in the modified block copolymer was obtained.

2. Preparation of a Hydrogenation Catalyst

A hydrogenation catalyst used in a hydrogenation reaction was prepared by the following method.

(1) Hydrogenation Catalyst I:

A reaction vessel was purged with nitrogen. To the reaction vessel was added one liter of dried, purified cyclohexane, followed by addition of 100 mmol of bis($\eta^5$-cyclopentadienyl)titanium dichloride. While thoroughly stirring the resultant mixture in the reaction vessel, an n-hexane solution of 200 mmol of trimethylaluminum was added to the reaction vessel, and a reaction was effected at room temperature for about 3 days to thereby obtain hydrogenation catalyst I.

(2) Hydrogenation Catalyst II:

A reaction vessel was purged with nitrogen. To the reaction vessel were added two liters of dried, purified cyclohexane. Then, 40 mmol of bis($\eta^5$-cyclopentadienyl) titaniumdi-(p-tolyl) and 150 g of 1,2-polybutadiene having a molecular weight of about 1,000 (wherein the 1,2-polybutadiene had a 1,2-vinyl bond content of about 85%) were added to and dissolved in the cyclohexane, thereby obtaining a solution. A cyclohexane solution of 60 mmol of n-butyllithium was added to the solution in the reaction vessel, and a reaction was effected at room temperature for 5 minutes, and then 40 mmol of n-butanol was immediately added to the reaction vessel while stirring, thereby obtaining hydrogenation catalyst II. The obtained hydrogenation catalyst II was preserved at room temperature.

3. Preparation of a Living Block Copolymer

Preparation of Polymer 1 (Hereinafter, Frequently Referred to as "P-1"):

An autoclave equipped with a stirrer and a jacket was washed, dried and purged with nitrogen. To the autoclave was added a cyclohexane solution of 10 parts by weight of purified styrene (styrene concentration: 20 wt %). Then, n-butyllithium (vinylation agent) and tetramethylethylenediamine (randomization agent) were added to the autoclave in accordance with the formulations indicated in Table 1, to obtain a mixture. The obtained mixture was subjected to a polymerization reaction at 70° C. for 1 hour. Then, a cyclohexane solution of 80 parts by weight of purified butadiene (butadiene concentration: 20 wt %) was added to the autoclave, and the contents of the autoclave were subjected to a polymerization reaction at 70° C. for 1 hour. Subsequently, a cyclohexane solution of 10 parts by weight of purified styrene was added to the autoclave, and the contents of the autoclave were further subjected to a polymerization reaction at 70° C. for 1 hour, thereby obtaining a reaction mixture containing polymer 1 (P-1) which was a living block copolymer. The characteristics of polymer 1 (P-1) are shown in Table 1.

Preparation of Polymers 2 to 23 (Hereinafter, Frequently Referred to as "P-2" to "P-23", Respectively):

Polymers 2 to 23 (i.e., P-2 to P-23) (each of polymers 2 to 23 was a living block copolymer) were obtained in substantially the same manner as in the preparation of polymer 1 (P-1), except that the amounts of monomers added to the autoclave were changed as indicated in Table 1. The characteristics of polymers 2 to 23 are shown in Table 1.

TABLE 1

| | Living polymer produced | | | | |
|---|---|---|---|---|---|
| Polymer No. | Structure of polymer | Amount of n-BuLi used (g/100 g of monomers) | Styrene content (wt %) | Styrene block ratio (%) | Vinyl bond content (%) |
| P-1 | A-B-A-Li | 0.114 | 20 | 97 | 42 |
| P-2 | A-B-A-Li | 0.105 | 19 | 94 | 36 |
| P-3 | A-B-A-Li | 0.152 | 30 | 93 | 26 |
| P-4 | A-B-A-Li | 0.183 | 20 | 95 | 65 |
| P-5 | A-B-A-Li | 0.305 | 67 | 90 | 41 |
| P-6 | A-B-A-Li | 0.040 | 18 | 96 | 45 |
| P-7 | A-B-A-Li | 0.147 | 29 | 92 | 42 |
| P-8 | A-B-A-Li | 0.147 | 19 | 97 | 36 |
| P-9 | A-B-A-Li | 0.229 | 40 | 97 | 28 |
| P-10 | B-A-B-A-Li | 0.229 | 29 | 92 | 42 |
| P-11 | A-B-Li | 0.095 | 30 | 97 | 15 |
| P-12 | A-B-Li | 0.229 | 30 | 97 | 36 |
| P-13 | A-B-A-Li | 0.152 | 20 | 92 | 42 |
| P-14 | A-B-Li | 0.183 | 30 | 96 | 15 |
| P-15 | A-B-Li | 0.183 | 29 | 96 | 15 |
| P-16 | A-B-A-Li | 0.057 | 35 | 96 | 15 |
| P-17 | B-Li | 0.051 | 0 | — | 15 |
| P-18 | A-B-A-Li | 0.076 | 30 | 96 | 17 |
| P-19 | A-B-A-Li | 0.070 | 25 | 98 | 13 |
| P-20 | A-B-A-Li | 0.083 | 30 | 95 | 15 |
| P-21 | A-B-A-Li | 0.203 | 30 | 97 | 40 |

TABLE 1-continued

Living polymer produced

| Polymer No. | Structure of polymer | Amount of n-BuLi used (g/100 g of monomers) | Styrene content (wt %) | Styrene block ratio (%) | Vinyl bond content (%) |
|---|---|---|---|---|---|
| P-22 | A-B-A-Li | 0.199 | 32 | 97 | 38 |
| P-23 | A-B-A-Li | 0.223 | 33 | 97 | 37 |

Notice:
"A" represents a polymer block comprised mainly of styrene monomer units.
"B" represents a polymer block comprised mainly of butadiene monomer units, and
"Li" represents a lithium ion.

4. Preparation of a First-order Modified Block Copolymer and a Hydrogenation Product Thereof A first-order modified block copolymer was obtained as follows. To the reaction mixtures respectively containing polymers 1 to 23 were individually added predetermined amounts of first-order modifiers as indicated in Tables 2, 5, 8, 13, 15, 21 and 23 below, and a reaction was performed at 70° C. for 20 minutes, thereby obtaining reaction mixtures respectively containing first-order modified block copolymers.

A hydrogenated first-order modified block copolymer was obtained as follows. To a reaction mixture containing a first-order modified block copolymer was added hydrogenation catalyst I or hydrogenation catalyst II in an amount of 100 ppm in terms of the amount of titanium, and a hydrogenation reaction was performed for 1 hour under conditions wherein the hydrogen pressure was 0.7 MPa and the reaction temperature was 65° C., thereby obtaining a reaction mixture containing a hydrogenated first-order modified block copolymer.

To the reaction mixtures respectively containing the first-order modified block copolymers and hydrogenated first-order modified block copolymers was individually added methanol in a molar amount which is 10 times the molar amount of n-butyllithium used in the polymerization reaction. Then, carbonated water was added to the resultant, so as to adjust the pH value of the resultant to pH 8 or less.

The characteristics of the thus obtained first-order modified block copolymers and hydrogenated first-order modified block copolymers are shown in Tables 2, 5, 8, 13, 15, 21 and 23.

5. Preparation of a Second-Order Modified Block Copolymer

A second-order modified block copolymer was obtained as follows. The above-obtained first-order modified block copolymers and hydrogenated first-order modified block copolymers were individually reacted with a second-order modifier by a melt-kneading method or a solution method, thereby obtaining second-order modified block copolymers.

Preparation of a second-order modified block copolymer by a melt-kneading method was performed as follows. To the reaction mixtures respectively containing the first-order modified block copolymers and hydrogenated first-order modified block copolymers was individually added, as a stabilizer, octadecyl-3-(3,5-di-t-butyl-4-hydroxyphenyl)propionate in an amount of 0.3 part by weight, relative to 100 parts by weight of the block copolymer, followed by heating to distill off the solvent in the reaction mixture. To the thus recovered first-order modified block copolymers and hydrogenated first-order modified block copolymers were individually added predetermined amounts of second-order modifiers as indicated in Tables 2, 5, 8, 13, 15, 21 and 23.

The resultant mixtures were individually melt-kneaded and extruded by means of a 30 mm φ twin-screw extruder under conditions wherein the cylinder temperature was 220° C. and the screw revolution rate was 100 rpm, to effect a reaction, thereby obtaining second-order modified block copolymers.

Preparation of a second-order modified block copolymer by a solution method was performed as follows. To the reaction mixtures respectively containing the first-order modified block copolymers and hydrogenated first-order modified block copolymers was individually added methanol in a molar amount which is 10 times the molar amount of n-butyllithium used in the polymerization reaction. Then, carbonated water was added to the resultant, so as to adjust the pH value of the resultant to pH 8 or less. To the resultant mixtures were individually added predetermined amounts of second-order modifiers as indicated in Tables 2, 5, 8, 13, 15, 21 and 23, and a reaction was performed at about 60° C. for 30 minutes. To each of the resultant reaction mixtures was added, as a stabilizer, octadecyl-3-(3,5-di-t-butyl-4-hydroxyphenyl)propionate in an amount of 0.3 part by weight, relative to 100 parts by weight of the block copolymer, followed by heating to distill off the solvent in the reaction mixture, thereby obtaining second-order modified block copolymers.

The characteristics of the obtained second-order modified block copolymers are shown in Tables 2, 5, 8, 13, 15, 21 and 23.

6. Relationships between the first-order modifiers (M1 to M5) and second-order modifiers (D1 and D2) which were used in Examples and Comparative Examples, and the structures of the first-order modified block copolymers and second-order modified block copolymers, are as follows.

Relationships Between the First-order Modifiers (M1 to M5) and the Structures of the First-Order Modified Block Copolymers:

M1: When M1 is used as a first-order modifier, the obtained first-order modified block copolymer has a structure represented by formula (8), wherein $C^2$ represents a unit which is represented by any one of formulae (d-1) and (e-1), and $D^2$ represents a unit which is represented by formula (f-1).

M2: When M2 is used as a first-order modifier, the obtained first-order modified block copolymer has a structure represented by formula (6) or (7), wherein $A^2$ represents a unit which is represented by any one of formulae (a-1) and (b-1), and $B^2$ represents a unit which is represented by formula (c-1).

M3: When M3 is used as a first-order modifier, the obtained first-order modified block copolymer has a structure represented by formula (10), wherein $E^2$ represents a unit which is represented by formula (g-1), and $F^2$ represents a unit which is represented by any one of formulae (h-1), (i-1) and (j-1).

M4: When M4 is used as a first-order modifier, the obtained first-order modified block copolymer has a structure represented by formula (9), wherein $C^2$ represents a unit which is represented by any one of formulae (d-1) and (e-1), and $D^2$ represents a unit which is represented by formula (f-1).

M5: When M5 is used as a first-order modifier, the obtained first-order modified block copolymer has a structure represented by formula (10), wherein $E^2$ represents a unit which is represented formula (g-1), and $F^2$ represents a unit which is represented by formula (h-1).

Relationships Between the Second-order Modifiers (D1 and D2) and the Structures of the Second-Order Modified Block Copolymers:

D1: When a first-order modified block copolymer which is obtained by a first-order modification using any one of the above-mentioned first-order modifiers (M1 to M5), is subjected to a second-order modification using the second-order modifier D1, there is obtained a second-order modified block copolymer having a structure wherein $X^1$ represents a unit which is represented formula (n).

D2: When a first-order modified block copolymer which is obtained by a first-order modification using any one of the above-mentioned first-order modifiers (M1 to M5), is subjected to a second-order modification using the second-order modifier D2, there is obtained a second-order modified block copolymer having a structure wherein $X^1$ represents a unit which is represented formula (p).

EXAMPLES AND COMPARATIVE EXAMPLES CONCERNING THE THERMOPLASTIC RESIN COMPOSITION (1) Modified Block Copolymer The modified block copolymers used are as shown in Table 2.

TABLE 2

| | | First-order modification | | | | | Second-order modification | |
|---|---|---|---|---|---|---|---|---|
| | Block copolymer | First-order modifier (mol/Li) | Ratio of unmodified block copolymer fractions (wt %) | Hydrogenation catalyst | Hydrogenation ratio (%) | Molecular weight (Mw) (×10,000) | Second-order modifier (mol/Li) | Modification method |
| First-order modification | | | | | | | | |
| 1P-1 | P-1 | M1 (1.0) | 20 | I | 98 | 8.0 | — | — |
| 1P-2 | P-2 | None | — | II | 98 | 8.7 | — | — |
| 1P-3 | P-3 | M2 (0.25) | 10 | II | 98 | 14.1 | — | — |
| 1P-4 | P-4 | M3 (1.0) | 20 | I | 98 | 10.3 | — | — |
| 1P-5 | P-5 | M2 (0.25) | 25 | I | 98 | 7.4 | — | — |
| 1P-6 | P-1 | M1 (1.0) | 25 | I | 55 | 8.0 | — | — |
| 1P-7 | P-1 | M1 (1.0) | 20 | — | 0 | 8.0 | — | — |
| 1P-8 | P-6 | M1 (1.0) | 30 | II | 98 | 23.0 | — | — |
| Second-order modification | | | | | | | | |
| 2P-1 | 1P-1 | — | — | — | — | — | D1 (2.1) | Melt-kneading method |
| 2P-2 | 1P-1 | — | — | — | — | — | D2 (3.5) | Melt-kneading method |
| 2P-3 | 1P-1/1P-5 (50/50) | — | — | — | — | — | D2 (0.7) | Melt-kneading method |
| 2P-4 | 1P-4 | — | — | — | — | — | D1 (1.5) | Melt-kneading method |
| 2P-5 | 1P-8 | — | — | — | — | — | D1 (1.5) | Melt-kneading method |

First-order modifier
M1: 1,3-dimethyl-2-imidazolidinone
M2: tetraglycidyl-1,3-bisaminomethylcyclohexane
M3: γ-glycidoxypropyltrimethoxysilane
Second-order modifier
D1: maleic anhydride
D2: tetraglycidyl-1,3-bisaminomethylcyclohexane (2) Thermoplastic Resin PET: Mitsui PET SA135 (manufactured and sold by Mitsui Chemicals, Inc., Japan)

Polyamide: Nylon 6 (Amilan CM1017, manufactured and sold by Toray Industries, Inc., Japan)

(3) Measurement of Properties

Flexural modulus (MPa): The flexural modulus is measured in accordance with ASTM-D790.

Notched Izod impact strength (J/m): The notched Izod impact strength is measured in accordance with JIS K-7110.

Examples 1 to 8 and Comparative Examples 1 to 6

In Examples 1 to 8 and Comparative Examples 1 to 6, resin compositions were produced in accordance with the formulations indicated in Table 3. Predetermined amounts of the thermoplastic resin, first-order modified block copolymer or unmodified block copolymer, and second-order modifier were dry-blended to obtain a blend product. To the obtained blend product was added, as a stabilizer, 2-t-amyl-6-[1-(3,5-di-t-amyl-2-hydroxyphenyl)ethyl]-4-t-aminophenylacrylate in an amount of 0.3 part by weight, relative to 100-parts by weight of the blend product. The resultant mixture was melt-kneaded and extruded by means of a 30 mm φ twin-screw extruder under conditions wherein the screw revolution rate was 250 rpm. In the melt-kneading, the cylinder temperature of the twin screw-extruder was changed as follows depending on the thermoplastic resin used: when the thermoplastic resin was a PET, the cylinder temperature was 250° C., and when the thermoplastic resin was a polyamide, the cylinder temperature was 260° C. In this way, resin compositions were obtained. The properties of the obtained compositions are shown in Table 3.

TABLE 3

| | Formulation (part by weight) | | | Flexural modulus (MPa) | Izod impact strength (J/m) |
|---|---|---|---|---|---|
| | Functional group-containing resin | Block copolymer | Second-order modifier *1 | | |
| Ex. 1 | PET | 1P-1 | — | D1 | 1310 | 745 |
| | 80 | 20 | | 0.06 | | |
| Ex. 2 | PET | 1P-1 | — | D2 | 1400 | 588 |
| | 80 | 20 | | 0.14 | | |
| Ex. 3 | PET | 1P-3 | — | D1 | 1600 | 686 |
| | 80 | 20 | | 0.05 | | |
| Ex. 4 | PET | 1P-1 | 1P-5 | D2 | 1650 | 569 |
| | 80 | 10 | 10 | 0.05 | | |
| Ex. 5 | PET | 1P-5 | — | D1 | 1740 | 480 |
| | 70 | 30 | | 5.0 | | |
| Ex. 6 | PET | 1P-6 | — | D1 | 1300 | 784 |
| | 80 | 20 | | 0.06 | | |
| Ex. 7 | PET | 1P-7 | — | D2 | 1150 | 686 |
| | 80 | 20 | | 0.14 | | |
| Ex. 8 | Polyamide | 1P-8 | — | D1 | 1610 | 360 |
| | 80 | 20 | | 0.3 | | |
| Comp. Ex. 1 | PET | 1P-1 | — | — | 1370 | 78 |
| | 80 | 20 | | | | |
| Comp. Ex. 2 | PET | 1P-3 | — | — | 1600 | 39 |
| | 80 | 20 | | | | |
| Comp. Ex. 3 | PET | 1P-2 | — | — | No test specimen having good homogeneity could be obtained | |
| | 80 | 20 | | | | |
| Comp. Ex. 4 | PET | 1P-2 | — | D2 | No test specimen having good homogeneity could be obtained | |
| | 80 | 20 | | 0.11 | | |
| Comp. Ex. 5 | PET | — | — | — | 2330 | 20 |
| | 100 | | | | | |
| Comp. Ex. 6 | Polyamide | 1P-8 | — | — | 1900 | 70 |
| | 80 | 20 | | | | |

*1: Second-order modifier

D1: maleic anhydride

D2: tetraglycidyl-1,3-bisaminomethylcyclohexane

Examples 9 to 13 and Comparative Examples 7 and 8

In Examples 9 to 13 and Comparative Examples 7 and 8, resin compositions were produced in the same manner as in Examples 1 to 8 except that the formulations indicated in Table 4 were employed. The properties of the resin compositions produced are shown in Table 4 together with the formulations of the resin compositions. In Table 4, "P-2/D2 (1.2 mol/Li)" (appearing in the rows of the data of Comparative Examples 7 and 8) means "a mixture of polymer P-2 and second-order modifier D2, wherein the mixture had a D2 concentration of 1.2 moles per mole of butyllithium added in the production of polymer P-2".

TABLE 4

| | Formulation (part by weight) | | | Flexural modulus (MPa) | Izod impact strength (J/m) |
|---|---|---|---|---|---|
| | Functional group-containing resin | Block copolymer | Second-order modifier *1 | | |
| Ex. 9 | PET 80 | 2P-1 20 | — | 1340 | 510 |
| Ex. 10 | PET 80 | 2P-2 20 | — | 1440 | 450 |
| Ex. 11 | PET 80 | 2P-3 20 | D2 1.0 | 1680 | 400 |
| Ex. 12 | Polyamide 80 | 2P-4 20 | — | 1650 | 510 |
| Ex. 13 | Polyamide 80 | 2P-5 20 | — | 1640 | 540 |
| Comp. Ex. 7 | PET 80 | P-2/D2 (1.2 mol/Li) 20 | — | No test specimen having good homogeneity could be obtained | |
| Comp. Ex. 8 | Polyamide 80 | P-2/D2 (1.2 mol/Li) 20 | — | 1550 | 63 |

*1: Second-order modifier
D2: tetraglycidyl-1,3-bisaminomethylcyclohexane

From the results of Examples 1 to 13 and Comparative Examples 1 to 8, it was found that the functional group-containing block copolymer (i.e., modified block copolymer) of the present invention has the effect of improving the impact strength of a thermoplastic resin.

EXAMPLES AND COMPARATIVE EXAMPLES CONCERNING THE FLAME RETARDANT POLYMER COMPOSITION (1) Modified Block Copolymer The modified block copolymers used are as shown in Table 5.

TABLE 5

| | | First-order modification | | | | | Second-order modification | |
|---|---|---|---|---|---|---|---|---|
| | Block copolymer | First-order modifier (mol/Li) | Ratio of unmodified block copolymer fractions (wt %) | Hydrogenation catalyst | Hydrogenation ratio (%) | Molecular weight (Mw) (×10,000) | Second-order modifier (mol/Li) | Modification method |
| First-order modification | | | | | | | | |
| 1P-9 | P-7 | M1 (1.0) | 20 | I | 98 | 6.2 | — | — |
| 1P-10 | P-7 | None | — | I | 98 | 6.0 | — | — |
| 1P-11 | P-7 | M1 (1.0) | 25 | I | 80 | 6.2 | — | — |
| 1P-12 | P-8 | M2 (0.25) | 30 | II | 98 | 13.2 | — | — |
| 1P-13 | P-9 | M3 (1.0) | 25 | I | 98 | 9.8 | — | — |
| 1P-14 | P-9 | SiCl$_4$ (0.25) | — | I | 98 | 10.5 | — | — |

TABLE 5-continued

| | | First-order modification | | | | | Second-order modification | |
|---|---|---|---|---|---|---|---|---|
| | Block copolymer | First-order modifier (mol/Li) | Ratio of unmodified block co-polymer fractions (wt %) | Hydrogenation catalyst | Hydrogenation ratio (%) | Molecular weight (Mw) (×10,000) | Second-order modifier (mol/Li) | Modification method |
| Second-order modification | | | | | | | | |
| 2P-6 | 1P-9 | — | — | — | — | — | D1 (2.1) | Melt-kneading method |
| 2P-7 | 1P-12 | — | — | — | — | — | D2 (0.9) | Melt-kneading method |
| 2P-8 | 1P-9/1P-12 (50/50) | — | — | — | — | — | D2 (3.5) | Melt-kneading method |

First-order modifier
M1: 1,3-dimethyl-2-imidazolidinone
M2: tetraglycidyl-1,3-bisaminomethylcyclohexane
M3: γ-glycidoxypropyltrimethoxysilane
Second-order modifier
D1: maleic anhydride
D2: tetraglycidyl-1,3-bisaminomethylcyclohexane (2) Inorganic Flame Retardant X-1: Magnesium hydroxide which has been subjected to a surface treatment using a higher fatty acid (trade name of the magnesium hydroxide: KISUMA 5A; manufactured and sold by KYOWA CHEMICAL INDUSTRY Co., Ltd., Japan)

X-2: Untreated magnesium hydroxide (trade name: KISUMA 5; manufactured and sold by KYOWA CHEMICAL INDUSTRY Co., Ltd., Japan)

(3) Olefin Polymer

Polypropylene (trade name: PM801A; manufactured and sold by Montell SDK Sunrise Ltd., Japan)

(4) Measurement of Properties

Tensile properties: The breaking strength (MPa) and breaking elongation (%) are measured in accordance with JIS K7210.

Oxygen index (O. I.): The oxygen index is measured in accordance with JIS K7201. Specifically, the oxygen index is measured as follows. A polymer sample and a gaseous mixture of $N_2$ and $O_2$ are introduced into a cylindrical vessel, and the cylindrical vessel is sealed. The sample is caused to burn in the cylindrical vessel. The oxygen index is defined as a minimum $O_2$ concentration in the $N_2/O_2$ gaseous mixture, at which the burning of the sample continues for three minutes. The higher the oxygen index, the higher the flame retardancy. The oxygen index is evaluated in accordance with the below-mentioned three criteria (with evaluation symbols ⊚, ○ and X):

⊚: 28% or more;

○: from 24% to less than 28%; and

X: less than 24%.

Examples 14 to 21 and Comparative Examples 9 to 11

In Examples 14 to 21 and Comparative Examples 9 to 11, flame retardant polymer compositions were produced in accordance with the formulations indicated in Table 6. The predetermined amounts of the inorganic flame retardant, second-order modifier and polypropylene, as well as 100 parts by weight of the first-order modified block copolymer, were mixed together to obtain a mixture. To the obtained mixture was added, as a stabilizer, 2-t-amyl-6-[1-(3,5-di-t-amyl-2-hydroxyphenyl)ethyl]-4-t-aminophenylacrylate in an amount of 0.3 part by weight. The resultant mixture was melt-kneaded and extruded by means of a 30 mm φ twin-screw extruder under conditions wherein the cylinder temperature of the twin screw-extruder was 220° C., to thereby obtain a flame retardant polymer composition in the form of pellets. The obtained pellets were subjected to an injection molding to thereby prepare a test specimen for use in the evaluation of the properties of the flame retardant polymer composition. The properties of the obtained compositions are shown in Table 6.

TABLE 6

|  | Ex. 14 | Ex. 15 | Ex. 16 | Ex. 17 | Ex. 18 | Ex. 19 | Ex. 20 | Ex. 21 | Comp. Ex. 10 | Comp. Ex. 11 |
|---|---|---|---|---|---|---|---|---|---|---|
| Block copolymer | 1P-9 | 1P-9 | 1P-9 | 1P-9 | 1P-9 | 1P-11 | 1P-12 | 1P-13 | 1P-10 | 1P-14 |
| (part by weight) | 100 | 100 | 100 | 100 | 100 | 100 | 100 | 100 | 100 | 100 |
| Inorganic flame retardant *1 | X-1 | X-1 | X-1 | X-1 | X-1 | X-2 | X-1 | X-2 | X-1 | X-2 |
| (part by weight) | 300 | 100 | 600 | 300 | 100 | 300 | 300 | 300 | 300 | 300 |
| Second-order modifier *2 | D-1 | D-1 | D-1 | — | D-1 | D-2 | D-2 | D-2 | D-1 | D-2 |
| (part by weight) | 0.5 | 0.5 | 0.5 |  | 2.0 | 4.0 | 1.0 | 2.5 | 0.5 | 2.5 |
| Polypropylene | 100 | 100 | 100 | 100 | 100 | 100 | 100 | 50 | 100 | 50 |
| (part by weight) |  |  |  |  |  |  |  |  |  |  |
| Breaking strength (MPa) | 11 | 12 | 9 | 10 | 14 | 10 | 9 | 11 | 8 | 9 |
| Breaking elongation (%) | 350 | 400 | 290 | 320 | 360 | 310 | 420 | 290 | 210 | 200 |
| Oxygen index (%) | ⊚ | ○ | ⊚ | ○ | ○ | ⊚ | ⊚ | ⊚ | ⊚ | ⊚ |

*1: Inorganic flame retardant
X-1: magnesium hydroxide which had been subjected to a surface treatment using a higher fatty acid
X-2: untreated magnesium hydroxide
*2: Second-order modifier
D-1: maleic anhydride
D-2: tetraglycidyl-1,3-bisaminomethylcyclohexane Examples 22 to 24 and Comparative Example 12

In Examples 22 to 24 and Comparative Example 12, flame retardant polymer compositions were produced in the same manner as in Examples 14 to 21 except that the formulations indicated in Table 7 were employed. The properties of the flame retardant polymer compositions produced are shown in Table 7 together with the formulations of the flame retardant polymer compositions. In Table 7, "1P-10/D1 (2.1 mol/Li)" (appearing in the row of the data of Comparative Example 12) means "a mixture of polymer 1P-10 and second-order modifier D1, wherein the mixture had a D1 concentration of 2.1 moles per mole of butyllithium added in the production of polymer 1P-10".

TABLE 7

|  | Ex. 22 | Ex. 23 | Ex. 24 | Comp. Ex. 12 |
|---|---|---|---|---|
| Block copolymer | 2P-6 | 2P-7 | 2P-8 | 1P-10/D1 (2.1 mol/Li) |
| (part by weight) | 100 | 100 | 100 | 100 |
| Inorganic flame retardant *1 | X-1 | X-1 | X-1 | X-1 |
| (part by weight) | 300 | 300 | 300 | 300 |
| Polypropylene | 100 | 100 | 100 | 100 |
| (part by weight) |  |  |  |  |
| Breaking strength (MPa) | 12 | 10 | 12 | 7 |
| Breaking elongation (%) | 360 | 410 | 400 | 220 |
| Oxygen index (%) | ⊚ | ⊚ | ⊚ | ⊚ |

*1 Inorganic flame retardant X-1: magnesium hydroxide which had been subjected to a surface treatment using a higher fatty acid From the results of Examples 14 to 24 and Comparative Examples 9 to 12, it was found that the flame retardant polymer composition of the present invention not only exhibits an excellent flame retardancy, but also has advantages in that the polymer composition generates no toxic gas (e.g., halogen gas) even when it is on fire, and that the polymer composition exhibits well-balanced mechanical properties. Therefore, the flame retardant polymer composition of the present invention can be advantageously used as a coating material for electric wires (e.g., an internal wiring for use in an electrical equipment, and a wiring harness for use in an automobile) or as a material for an industrial article (e.g., an insulating tape).

Examples and Comparative Examples Concerning the Adhesive Film for Protecting a Surface (1) Modified Block Copolymer The modified block copolymers used are as shown in Table 8.

off therefrom under conditions wherein the temperature is 20° C., the relative humidity (RH) is 65%, the peeling rate is 200 mm/min, and the peeling angle is 180°.

Evaluation of whether or not there is an occurrence of a left-over glue on a surface after peeling off the adhered film therefrom: An adhesive film is adhered onto a SUS304

TABLE 8

| | | First-order modification | | | | | Second-order modification | |
|---|---|---|---|---|---|---|---|---|
| | Block copolymer | First-order modifier (mol/Li) | Ratio of unmodified block co-polymer fractions (wt %) | Hydrogenation catalyst | Hydrogenation ratio (%) | Molecular weight (Mw) (×10,000) | Second-order modifier (mol/Li) | Modification method |
| First-order modification | | | | | | | | |
| 1P-15 | P-2 *1 | M1 (1.0) | 20 | I | 98 | 6.5 | — | — |
| 1P-16 | P-2 *1 | None | — | I | 98 | 6.4 | — | — |
| 1P-17 | P-2 *1 | M1 (1.0) | 25 | I | 60 | 6.7 | — | — |
| 1P-18 | P-10 | M2 (0.25) | 25 | II | 98 | 13.2 | — | — |
| 1P-19 | P-10 | M2 (0.25) | 20 | — | 0 | 13.5 | — | — |
| 1P-20 | P-9 | M3 (1.0) | 25 | I | 98 | 9.8 | — | — |
| 1P-21 | P-9 | SiCl$_4$ (0.25) | — | I | 98 | 10.5 | — | — |
| Second-order modification | | | | | | | | |
| 2P-9 | 1P-15 | — | — | — | — | — | D1 (2.1) | Melt-kneading method |
| 2P-10 | 1P-18 | — | — | — | — | — | D2 (0.9) | Melt-kneading method |
| 2P-11 | 1P-15/1P-18 (50/50) | — | — | — | — | — | D2 (3.5) | Melt-kneading method |

*1) The same living polymer as P-2 was used except that the styrene block ratio was 97%.
First-order modifier
M1: 1,3-dimethyl-2-imidazolidinone
M2: tetraglycidyl-1,3-bisaminomethylcyclohexane
M3: γ-glycidoxypropyltrimethoxysilane
Second-order modifier
D1: maleic anhydride
D2: tetraglycidyl-1,3-bisaminomethylcyclohexane (2) Measurement of Properties The properties of an adhesive film for protecting a surface are measured as follows. An adhesive composition obtained by the below-mentioned method is provided in a molten state and coated onto a resin film having a thickness of 100 μm so as to form a coating having a thickness of 15 μm, thereby obtaining an adhesive film. By the below-mentioned methods, the adhesive film is measured with respect to anchoring strength, adhesion strength and whether or not there is an occurrence of a left-over glue on a surface after peeling off the adhered film therefrom.

Anchoring strength (g/20 mm): Two adhesive films each having a width of 20 mm are provided. The adhesive-coated surfaces of the adhesive films are firmly adhered onto each other. Then, a peeling test is performed in which the films are peeled off from each other under conditions wherein the temperature is 20° C., the relative humidity (RH) is 65%, the peeling rate is 200 mm/min, and the peeling angle is 180°.

Adhesion strength (g/25 mm): An adhesive film is adhered onto a SUS304 stainless steel plate, and then peeled stainless steel plate and allowed to stand at 40° C. for 6 months. Then, the adhered film is peeled off from the stainless steel plate under conditions wherein the temperature is 20° C. and the relative humidity (RH) is 65%, and then the stainless steel plate is observed to examine whether or not there is an occurrence of a left-over glue.

Examples 25 to 29 and Comparative Examples 13 and 14

In Examples 25 to 29 and Comparative Examples 13 and 14, adhesive compositions were produced in accordance with the formulations indicated in Table 9. Predetermined amounts of the tackifier and second-order modifier, as well as 100 parts by weight of the first-order modified block copolymer or hydrogenated first-order modified block copolymer, were mixed together to obtain a mixture. To the obtained mixture was added, as a stabilizer, 2-t-amyl-6-[1-(3,5-di-tamyl-2-hydroxyphenyl)ethyl]-4-t-aminophenylacrylate in an amount of 0.3 part by weight. The resultant mixture was melt-kneaded by means of a vessel equipped with a stirrer at 180° C. for 2 hours, thereby obtaining an adhesive composition. Using the obtained adhesive composition and a polyethylene film, an adhesive film was produced, and the properties of the adhesive film produced were measured. The properties of the obtained adhesive films are shown in Table 9 together with the formulations of the adhesive compositions.

TABLE 9

|  | Ex. 25 | Ex. 26 | Ex. 27 | Ex. 28 | Ex. 29 | Comp. Ex. 13 | Comp. Ex. 14 |
|---|---|---|---|---|---|---|---|
| Formulation of adhesive composition (part by weight) |  |  |  |  |  |  |  |
| Block copolymer | 1P-15 (100) | 1P-17 (100) | 1P-18 (100) | 1P-19 (100) | 1P-20 (100) | 1P-16 (100) | 1P-21 (100) |
| Tackifier *1 | N1 (40) | N2 (30) | N1 (40) | N2 (55) | N1 (80) | N1 (40) | N1 (80) |
| Second-order modifier *2 | D1 (0.5) | D2 (0.5) | D1 (1.0) | D2 (5.0) | D1 (0.5) | D1 (0.5) | D1 (0.5) |
| Resin film | Polyethylene (density: 0.96 MI = 1.5) | Polyethylene (density: 0.96 MI = 1.5) | Polyethylene (density: 0.92 MI = 3.9) | Polyethylene (density: 0.92 MI = 3.9) | Polyethylene (density: 0.96 MI = 1.5) | Polyethylene (density: 0.96 MI = 1.5) | Polyethylene (density: 0.96 MI = 1.5) |
| Anchoring strength (g/20 mm) | >2000 | >2000 | >2000 | >2000 | >2000 | 1400 | 1500 |
| Adhesion strength (g/25 mm) | 250 | 290 | 170 | 190 | 150 | 120 | 100 |
| Left-over glue after peeling | None | None | None | None | None | Present | Present |

*1 Tackifier
N1: Clearon P105 (manufactured and sold by YASUHARA CHEMICAL CO., LTD., Japan)
N2: ARKON M100 (manufactured and sold by ARAKAWA CHEMICAL INDUSTRIES, LTD., Japan)
*2 Second-order modifier
D1: maleic anhydride
D2: tetraglycidyl-1,3-bisaminomethylcyclohexane Examples 30 to 34 and Comparative Examples 15 and 16

In Examples 30 to 34 and Comparative Examples 15 and 16, adhesive compositions were produced in the same manner as in Examples 25 to 29 except that the formulations indicated in Table 10 were employed. Using the adhesive compositions produced and PET films, adhesive films were produced, and the properties of the adhesive films were measured. The properties of the adhesive films are shown in Table 10 together with the formulations of the adhesive compositions.

TABLE 10

|  | Ex. 30 | Ex. 31 | Ex. 32 | Ex. 33 | Ex. 34 | Comp. Ex. 15 | Comp. Ex. 16 |
|---|---|---|---|---|---|---|---|
| Formulation of adhesive composition (part by weight) |  |  |  |  |  |  |  |
| Block copolymer | 1P-15 (100) | 1P-17 (100) | 1P-18 (100) | 1P-19 (100) | 1P-20 (100) | 1P-16 (100) | 1P-21 (100) |
| Tackifier *1 | N1 (40) | N2 (30) | N1 (40) | N2 (55) | N1 (80) | N1 (40) | N1 (80) |
| Second-order modifier *2 | D1 (0.5) | D2 (0.5) | D1 (1.0) | D2 (5.0) | D1 (0.5) | D1 (0.5) | D1 (0.5) |
| Resin film | PET (IV 0.82) | PET (IV 0.82) | PET (IV 0.73) | PET (IV 0.73) | PET (IV 0.82) | PET (IV 0.82) | PET (IV 0.82) |
| Anchoring strength (g/20 mm) | >2000 | >2000 | >2000 | >2000 | >2000 | 1500 | 1600 |
| Adhesion strength (g/25 mm) | 260 | 280 | 170 | 190 | 160 | 120 | 120 |
| Left-over glue after peeling | None | None | None | None | None | Present | Present |

*1 Tackifier
N1: Clearon P105 (manufactured and sold by YASUHARA CHEMICAL CO., LTD., Japan)
N2: ARKON M100 (manufactured and sold by ARAKAWA CHEMICAL INDUSTRIES. LTD., Japan)
*2 Second-order modifier
D1: maleic anhydride
D2: tetraglycidyl-1,3-bisaminomethylcyclohexane Examples 35 to 38 and Comparative Example 17

In Examples 35 to 38 and Comparative Example 17, adhesive compositions were produced in the same manner as in Examples 25 to 29 except that the formulations indicated in Table 11 were employed. Using the adhesive compositions produced and polyolefin films, adhesive films were produced, and the properties of the adhesive films were measured. The properties are shown in Table 11 together with the formulations of the adhesive compositions. In Table 11, "1P-16/D1 (2.1 mol/Li)" (appearing in the row of the data of Comparative Example 17) means "a mixture of polymer 1P-16 and second-order modifier D1, wherein the mixture had a D1 concentration of 2.1 moles per mole of butyllithium added in the production of polymer 1P-16".

TABLE 11

| | Ex. 35 | Ex. 36 | Ex. 37 | Ex. 38 | Comp. Ex. 17 |
|---|---|---|---|---|---|
| Formulation of adhesive composition (part by weight) | | | | | |
| Block copolymer | 2P-9 (100) | 2P-10 (100) | 2P-11 (100) | 2P-9 (100) | 1P-16/D1 (2.1 mol/Li) (100) |
| Tackfier | N1 (40) | N1 (40) | N1 (40) | N1 (40) | N1 (40) |
| Resin film | Polyethylene (density: 0.96 MI = 1.5) | Polyethylene (density: 0.92 MI = 3.9) | Polyethylene (density: 0.96 MI = 1.5) | polypropylene (density: 0.90 MI = 7.0) | Polyethylene (density: 0.96 MI = 1.5) |
| Anchoring strength (g/20 mm) | >2000 | >2000 | >2000 | >2000 | 1400 |
| Adhesion strength (g/25 mm) | 270 | 180 | 200 | 260 | 140 |
| Left-over glue after peeling | None | None | None | None | Present |

Examples 39 to 41 and Comparative Example 18

In Examples 39 to 41 and Comparative Example 18, adhesive compositions were produced in the same manner as in Examples 30 to 34 except that the formulations indicated in Table 12 were employed. Using the adhesive compositions produced and PET films, adhesive films were produced, and the properties of the adhesive films were measured. The properties are shown in Table 12 together with the formulations of the adhesive compositions. In Table 12, "1P-16/D1 (2.1 mol/Li)" (appearing in the row of the data of Comparative Example 18) means "a mixture of polymer 1P-16 and second-order modifier D1, wherein the mixture had a D1 concentration of 2.1 moles per mole of butyllithium added in the production of polymer 1P-16".

TABLE 12

| | Ex. 39 | Ex. 40 | Ex. 41 | Comp. Ex. 18 |
|---|---|---|---|---|
| Formulation of adhesive composition (part by weight) | | | | |
| Block copolymer | 2P-9 (100) | 2P-10 (100) | 2P-11 (100) | 1P-16/D1 (2.1 mol/Li) (100) |
| Tackifier | N1 (40) | N1 (40) | N1 (40) | N1 (40) |
| Resin film | PET (IV 0.82) | PET (IV 0.73) | PET (IV 0.82) | PET (IV 0.82) |
| Anchoring strength (g/20 mm) | >2000 | >2000 | >2000 | 1600 |
| Adhesion strength (g/25 mm) | 270 | 190 | 220 | 130 |
| Left-over glue after peeling | None | None | None | Present |

From the results of Examples 25 to 41 and Comparative Examples 13 to 18, it was found that the surface protection adhesive film of the present invention is advantageous not only in that it has excellent properties with respect to anchoring strength and adhesion strength, but also in that, even when the surface protection adhesive film is adhered onto a surface of an object, and the object carrying the film is allowed to stand for a long period of time, followed by peeling off of the film from the object, there is no occurrence of a left-over glue on the object.

EXAMPLES AND COMPARATIVE EXAMPLE CONCERNING THE ADHESIVE COMPOSITION (1) Modified Block Copolymer The modified block copolymers used are as shown in Table 13.

TABLE 13

| | | Block copolymer | First-order modifier (mol/Li) | First-order modification Ratio of unmodified block copolymer fractions (wt %) | Hydrogenation catalyst | Hydrogenation ratio (%) | Molecular weight (Mw) (×10,000) | Second-order modification Second-order modifier (mol/Li) | Modification method |
|---|---|---|---|---|---|---|---|---|---|
| First-order modification | 1P-22 | P-11 | M2 (0.7) | 35 | — | 0 | 6.0 (about 45%) 19.5 (about 55%) | — | — |
| | 1P-23 | P-11 | SiCl₄ (0.25) | — | — | 0 | 6.0 (about 35%) 19.5 (about 65%) | — | — |
| | 1P-24 | P-12 | M2 (2.5) | 20 | I | 46 | 9.0 | — | — |
| | 1P-25 | P-13 | M1 (1.0) | 10 | II | 98 | 6.0 | — | — |
| Second-order modification | 2P-12 | 1P-25 | — | — | — | — | — | D1 (2.1) | Solution method |

First-order modifier M1: 1,3-dimethyl-2-imidazolidinone
M2: tetraglycidyl-1,3-bisaminomethylcyclohexane
Second-order modifier D1: maleic anhydride (2) Measurement of the Properties of Adhesive Composition a. Softening Temperature The softening temperature is measured in accordance with JIS-K2207 (ring-and-ball method).

In addition, an adhesive composition in a molten state just after the production thereof is coated onto a polyester film by means of an applicator so as to have a thickness of 50 μm, thereby preparing an adhesive tape sample. With respect to the adhesive tape sample, the properties are measured by the following methods.

b. Adhesion strength (g/10 mm): An adhesive tape sample having a width of 25 mm is adhered onto a stainless steel plate, and then peeled off therefrom under conditions wherein the temperature is 20° C., the relative humidity (RH) is 65%, the peeling rate is 300 mm/min, and the peeling angle is 180°. The force required for peeling off the sample is measured, and expressed as a value corresponding to the case wherein the sample has a width of 10 mm.

c. Shear adhesion (minute): The shear adhesion is measured in accordance with JIS Z-1524. An adhesive tape sample which has an adhesive composition layer having an area of 25 mm×25 mm is provided, and the adhesive tape sample is adhered onto a stainless steel plate. Then, the adhered tape is pulled, at 60° C. under a load of 1 kg, in a direction parallel to the surface of the stainless steel plate, and the time required for the adhered tape to be slipped off from the stainless steel plate is measured.

d. Peeling strength: An adhesive tape sample having a thickness of about 100 μm is preheated on a substrate plate at 150° C. for 5 minutes, and then pressed onto the substrate plate (load: 1 kg/cm²) at 150° C. for 5 minutes so as to adhere the tape onto the substrate plate. With respect to the resultant structure, the peeling strength is measured in accordance with JISK6854 (peel test) at a peeling rate of 200 mm/min.

Examples 42 to 45 and Comparative Example 19

In Examples 42 to 45 and Comparative Example 19, adhesive compositions were produced in accordance with the formulations indicated in Table 14. Predetermined amounts of the tackfier, Diana process oil PW90 (manufactured and sold by Idemitsu Kosan Co., Ltd., Japan) as a softening agent, and second-order modifier, as well as 100 parts by weight of the first-order modified block copolymer, were mixed together to obtain a mixture. To the obtained mixture was added, as a stabilizer, 2-t-butyl-6-(3-t-butyl-2-hydroxy-5-methylbenzyl)-4-methylphenylacrylate in an amount of 1 part by weight. The resultant mixture was melt-kneaded by means of a vessel equipped with a stirrer at 180° C. for 2 hours, thereby obtaining an adhesive composition. The properties of the obtained adhesive compositions are shown in Table 14 together with the formulations of the adhesive compositions.

Example 46

In Example 46, an adhesive composition was produced in the same manner as in Examples 42 to 45 except that the formulation was changed as indicated in Table 14. The properties of the adhesive composition produced are shown in Table 14 together with the formulation of the adhesive composition.

TABLE 14

| | Block copolymer | | Tackfier (note 1) | | Second-order modifier | | Amount of softening agent (note 3) | Softening temperature (° C.) | Adhesion strength (gf/10 mm) | Shear adhesion (min) |
|---|---|---|---|---|---|---|---|---|---|---|
| | Type | Amount | Type | Amount | Type (note 2) | Amount | | | | |
| Ex. 42 | 1P-22 | 100 | Tackfier 1 | 250 | Second-order modifier 1 | 0.5 | 60 | 98 | 1980 | 15 |

TABLE 14-continued

| | Block copolymer | | Tackfier (note 1) | | Second-order modifier | | Amount of softening agent | Softening temperature (° C.) | Adhesion strength (gf/10 mm) | Shear adhesion (min) |
|---|---|---|---|---|---|---|---|---|---|---|
| | Type | Amount | Type | Amount | Type (note 2) | Amount (note 3) | | | | |
| Comp. Ex. 19 | 1P-23 | 100 | Tackfier 1 | 250 | Second-order modifier 1 | 0.5 | 60 | 78 | 1450 | 7 |
| Ex. 43 | 1P-22 | 100 | Tackfier 1 | 250 | Second-order modifier 2 | 0.5 | 60 | 100 | 2010 | 18 |
| Ex. 44 | 1P-24 | 100 | Tackfier 2 | 250 | Second-order modifier 2 | 2 | 60 | 100 | 2020 | 24 |
| Ex. 45 | 1P-25 | 100 | Tackfier 2 | 250 | Second-order modifier 2 | 2 | 60 | 98 | 1760 | 30 |
| Ex. 46 | 2P-12 | 100 | Tackfier 2 | 300 | (note 4) | (note 4) | 100 | 103 | 1930 | 35 |

(note 1)
Tackfier 1: alicyclic petroleum resin (trade name: ARKON M100; manufactured and sold by ARAKAWA CHEMICAL INDUSTRIES, LTD., Japan)
Tackfier 2: completely hydrogenated terpene petroleum resin (trade name: Clearon P105; manufactured and sold by YASUHARA CHEMICAL CO., LTD., Japan)
(note 2)
Second-order modifier 1: maleic anhydride
Second-order modifier 2: 1,2,4,5-benzenetetracarboxylic acid dianhydride
(note 3)
Amount relative to 100 parts by weight of block copolymer
(note 4)
Polymer 13 is reacted with maleic anhydride as a second-order modifier by a melt-kneading method, wherein maleic anhydride is used in an amount of 2.1 moles, relative to one equivalent of the functional group of polymer 13.

EXAMPLES AND COMPARATIVE EXAMPLES CONCERNING THE ASPHALT COMPOSITION (1) Modified Block Copolymer The modified block copolymers used are as shown in Table 15.

(2) Measurement of the Properties of Asphalt Composition (a) Softening Temperature The softening temperature is measured in accordance with JIS-K2207 (i.e., ring-and-ball method).

(b) Melt Viscosity

TABLE 15

| | | | First-order modification | | | | | Second-order modification | |
|---|---|---|---|---|---|---|---|---|---|
| | | Block copolymer | First-order modifier (mol/Li) | Ratio of unmodified block copolymer fractions (wt %) | Hydrogenation catalyst | Hydrogenation ratio (%) | Molecular weight (Mw) (×10,000) | Second-order modifier (mol/Li) | Modification method |
| First-order modification | 1P-26 | P-14 | M3 (1.0) | 24 | — | 0 | 13.4 | — | — |
| | 1P-27 | P-15 | M2 (1.0) | 23 | — | 0 | 13.6 | — | — |
| | 1P-28 | P-14 | M2 (1.0) | 23 | I | 95 | 14 | — | — |
| | 1P-29 | P-16 | M4 (1.0) | 20 | — | 0 | 16 | — | — |
| | 1P-30 | P-16 | None | — | — | 0 | — | — | — |
| | 1P-31 | P-17 | None | — | — | 0 | 18 | — | — |
| | 1P-32 | P-18 | M1 (1.0) | 15 | — | 0 | 12 | — | — |
| | 1P-33 | P-19 | M1 (1.0) | 25 | — | 0 | 13 | — | — |
| | 1P-34 | P-20 | M1 (1.0) | 32 | — | 0 | 11 | — | — |
| Second-order modification | 2P-13 | 1P-27 | — | — | — | — | — | D1 (2.1) | Melt-kneading method |
| | 2P-14 | 1P-32 | — | — | — | — | — | D1 (3.5) | Solution method |
| | 2P-15 | 1P-33 | — | — | — | — | — | D1 (1.0) | Melt-kneading method |
| | 2P-16 | 1P-34 | — | — | — | — | — | D1 (1.0) | Melt-kneading method |

First-order modifier M1: 1,3-dimethyl-2-imidazolidinone
M2: tetraglycidyl-1,3-bisaminomethylcyclohexane
M3: γ-glycidoxypropyltrimethoxysilane
M4: N-methylpyrrolidone
Second-order modifier D1: maleic anhydride The melt viscosity is measured by means of a Brookfield viscometer at 180° C.

(c) Penetration Ratio

The penetration ratio of an asphalt composition is measured in accordance with JIS-K2207. Specifically, a sample of the asphalt composition is placed in a thermostatic water bath, and the temperature of the sample is maintained at 25° C. Then, a prescribed needle is caused to penetrate into the sample for 5 seconds. The distance over which the needle has penetrated into the sample is measured, and is defined as the penetration ratio.

(d) Elongation

The elongation of an asphalt composition is measured in accordance with JIS-K2207. Specifically, a sample of the asphalt composition is poured into a mold to shape the sample into a prescribed form. Then, the shaped sample is placed in a thermostatic water bath, and the temperature of the sample is maintained at 4° C. Then, the sample is pulled at a rate of 5 cm/min until it is broken, and the elongation of the sample at the time of breakage is measured.

(e) Adhesion Strength

An asphalt composition is dissolved in toluene, and the resultant solution is coated onto a canvas using a coater. The coated canvas is dried, first at room temperature for 1 hour, and then at 70° C. in an oven for 7 hours, thereby completely evaporating the toluene from the coated canvas. Subsequently, the coated canvas is placed in an oven together with a granite (as an adherend) having a smooth surface, and the coated canvas and the granite are heated at 70° C. for 1 hour. Then, the coated canvas and the granite are taken out from the oven and rapidly pressed onto each other twice using a roller under a load of 1 kg, to thereby adhere the coated canvas onto the granite. The resultant structure in which the coated canvas is adhered onto the granite, is placed in a thermostatic chamber at a temperature of 23° C. and a relative humidity (RH) of 65%, and a peeling test (peeling angle: 180°) is performed in which the canvas is peeled off from the granite.

(f) Flexural Properties at Low Temperatures

An asphalt composition is poured into a mold having a size of 20 mm×20 mm×120 mm, and an excess asphalt composition is cut off. The mold containing the asphalt composition is placed in a cryostat, and the asphalt composition in the mold is maintained at −10° C. for 4 hours. Then, the resultant molded product of the asphalt composition is rapidly taken out of the mold, and is measured with respect to the flexural stress and the flexural strain (i.e., displacement of the molded product up to the yielding point thereof) by a method in which the molded product is supported at two points thereof which are at a distance (span) of 80 mm from each other, and a load is applied, at a loading rate of 100 mm/min, to a portion of the molded product which is at a middle of the 80 mm span.

(g) High Temperature Storage Stability

An aluminum can having an inner diameter of 50 mm and a height of 130 mm is filled up with an asphalt composition immediately after the production of the composition. The aluminum can containing the asphalt composition is placed in an oven and heated at 180° C. for 24 hours. The aluminum can is taken out from the oven and allowed to stand so that the asphalt composition in the aluminum can cools to room temperature. As samples, upper and lower portions of the resultant solidified asphalt composition, which are a 4 cm-thick lower layer at a lower end portion and a 4 cm-thick upper layer at an upper end portion, are taken by cutting. The softening temperatures of both the samples are measured. The difference in softening temperature between the samples is used as a yardstick for high temperature storage stability of the asphalt composition.

(3) Measurement of the Properties of a Drainage Pavement Mixture

An aggregate comprising approximately 85% by weight of crushed stone No. 6 (crushed stone S-13) (having a particle size in the range of from 13 to 5 mm), approximately 10% by weight of crushed sand and approximately 5% by weight of stone dust, is produced, wherein the composition of the aggregate is chosen so as to have a void ratio of approximately 20%. The aggregate is heated to 170° C., and 5% by weight of an asphalt composition in a molten form is added thereto as a binder and mixed well at 170° C., thereby obtaining a drainage pavement mixture having a void ratio of approximately 20%. With respect to the obtained mixture, the below-mentioned properties are measured. The void ratio is a value calculated from the volume and weight of the drainage pavement mixture.

(a) Cantabro Test

The Cantabro test is a test for measuring the resistance of the drainage pavement mixture to the scattering of aggregate. The Cantabro test is conducted in accordance with the method described in "Hoso Shikenho Binran Bessatsu (Zantei Shikenhouho) (Handbook of Pavement Test Method: separate volume (interim test method)", published by the Japan Road Association Corporation, Japan. The curing of the drainage pavement mixture is performed at 0° C. and the test is performed at 18° C.

(b) Wheel Tracking Test

The wheel tracking test is a test for measuring the resistance of the drainage pavement mixture to morphological change under dynamic stress, in the indoor environment. The wheel tracking test is conducted in accordance with the method described in "Hoso Shikenho Binran Bessatsu (Zantei Shikenhouho) (Handbook of Pavement Test Method: separate volume (interim test method)", published by the Japan Road Association Corporation, Japan. Specifically, a sample having a predetermined size is prepared, and a small rubber wheel having a predetermined load thereon is repeatedly run on the sample. From the amount of morphological change of the sample under load per unit time, the dynamic stability (DS) of the sample is measured. The test is performed at 60+0.5° C.

Examples 47 to 49 and Comparative Examples 20 and 21

In Examples 47 to 49 and Comparative Examples 20 and 21, asphalt compositions were produced in accordance with the formulations indicated in Table 16. 400 g of straight asphalt 60-80 (manufactured and sold by NIPPON OIL COMPANY, LIMITED, Japan) was added to a metal can having a volume of 750 ml. The metal can containing the straight asphalt was put into an oil bath having a temperature of 180° C. so that the straight asphalt was satisfactorily heated, thereby melting the asphalt. Then, to the resultant molten asphalt were added predetermined amounts of the block copolymer and second-order modifier bit by bit while stirring. After completion of addition of the block copolymer and second-order modifier, the resultant mixture was stirred at a revolution rate of 5,000 rpm for 90 minutes, thereby obtaining an asphalt composition. The formulations and properties of the obtained compositions are shown in Table 16. In Examples 47 to 49, 1,2,4,5-benzenetetracarboxylic acid dianhydride was used as the second-order modifier. Further, in Example 49 and Comparative Example 21, straight asphalt 80-100 (manufactured and sold by NIPPON OIL COMPANY, LIMITED, Japan) was used instead of straight asphalt 60-80.

TABLE 16

|  | Ex. 47 | Ex. 48 | Ex. 49 | Comp. Ex. 20 | Comp. Ex. 21 |
|---|---|---|---|---|---|
| Block copolymer used | 1P-26 | 1P-27 | 1P-28 | 1P-27 | 1P-28 |
| Amount of block copolymer (part by weight) | 8 | 8 | 8 | 8 | 8 |
| Amount of asphalt (part by weight) | 100 | 100 | 100 | 100 | 100 |
| Amount of second-order modifier (part by weight) | 0.5 | 0.5 | 0.5 | 0 | 0 |
| Softening temperature (° C.) | 102 | 103 | 102 | 101 | 99 |
| Melt viscosity (cP) | 270 | 280 | 250 | 280 | 240 |
| Penetration ratio (1/10 mm) | 48 | 47 | 48 | 47 | 49 |
| Elongation (cm) | 47 | 46 | 40 | 50 | 35 |
| Adhesion strength (gf/10 mm) | 570 | 580 | 540 | 260 | 250 |
| Flexural stress at low temperatures (kgf/cm$^2$) | 44 | 46 | 42 | 34 | 32 |
| High temperature storage stability Difference in softening temperature (° C.) | 30 | 29 | 30 | 34 | 33 |

Example 50 and Comparative Examples 22 and 23

In Example 50 and Comparative Examples 22 and 23, asphalt compositions were produced in the same manner as in Example 47 except that the formulations indicated in Table 17 were employed. The formulations and properties of the asphalt compositions produced are shown in Table 17.

TABLE 17

|  | Ex. 50 | Comp. Ex. 22 | Comp. Ex. 23 |
|---|---|---|---|
| Block copolymer used | 1P-29 | 1P-30 | 1P-31 |
| Amount of block copolymer (part by weight) | 8 | 8 | 8 |
| Amount of asphalt (part by weight) | 100 | 100 | 100 |
| Amount of second-order modifier (part by weight) | 0.5 | 0 | 0.5 |
| Softening temperature (° C.) | 75 | 55 | 53 |
| Melt viscosity (cP) | 310 | 280 | 300 |
| Penetration ratio (1/10 mm) | 52 | 58 | 60 |
| Elongation (cm) | 45 | 47 | 50 |
| Adhesion strength (gf/10 mm) | 310 | 180 | 60 |
| Flexural stress at low temperatures (kgf/cm$^2$) | 26 | 18 | 11 |
| High temperature storage stability Difference in softening temperature (° C.) | 27 | 29 | 25 |

Example 51

An asphalt composition was produced in the same manner as in Example 47 except that 2 parts by weight of maleic anhydride was used as the second-order modifier. The properties of the asphalt composition are shown in Table 18.

Example 52

An asphalt composition was produced in the same manner as in Example 47 except that block copolymer 2P-13 was used as the block copolymer. The properties of the asphalt composition are shown in Table 18.

Example 53

An asphalt composition was produced in the same manner as in Example 47 except that block copolymer 1P-31, straight asphalt 80-100 and maleic anhydride were, respectively, used as the block copolymer, asphalt and second-order modifier. The properties of the asphalt composition are shown in Table 18.

Example 54

An asphalt composition was produced in the same manner as in Example 53 except that block copolymer 2P-14 was used as the block copolymer. The properties of the asphalt composition are shown in Table 18.

Example 55

An asphalt composition was produced in the same manner as in Example 47 except that tolylene diisocyanate was used as the second-order modifier. The properties of the asphalt composition are shown in Table 18.

Example 56

An asphalt composition was produced in the same manner as in Example 47 except that the following formulation was used: 100 parts by weight of straight asphalt 60-80 (manufactured and sold by NIPPON OIL COMPANY, LIMITED, Japan), 8 parts by weight of second-order modified block copolymer 2P-15 (which had been modified by the solution method), and 0.1 part by weight of sulfur (trade name: "GOLDEN FLOWER" SULFUR POWDER; manufactured and sold by Tsurumi Chemical Co., Japan). The properties of the asphalt composition are shown in Table 18.

TABLE 18

|  | Ex. 51 | Ex. 52 | Ex. 53 | Ex. 54 | Ex. 55 | Ex. 56 |
|---|---|---|---|---|---|---|
| Softening temperature (° C.) | 104 | 105 | 91 | 92 | 101 | 91 |
| Melt viscosity (cP) | 290 | 350 | 400 | 430 | 360 | 470 |
| Penetration ratio (1/10 mm) | 46 | 45 | 55 | 50 | 45 | 37 |
| Elongation (cm) | 48 | 45 | 65 | 63 | 68 | 81 |
| Adhesion strength (gf/10 mm) | 590 | 630 | 800 | 850 | 600 | 4130 |
| Flexural stress at low temperatures (kgf/cm$^2$) (−10° C.) | 47 | 51 | 55 | 58 | 45 | 11.5 |
| High temperature storage stability  Difference in softening temperature (° C.) | 28 | 26 | 22 | 29 | 26 | 17 |

Example 57

An asphalt composition was produced in the same manner as in Example 47 except that the following formulation was used: 100 parts by weight of straight asphalt 60-80 (manufactured and sold by NIPPON OIL COMPANY, LIMITED, Japan) and 8 parts by weight of second-order modified block copolymer 2P-16 (which had been modified by the solution method). Then, a drainage pavement mixture was produced using the asphalt composition. The properties of the asphalt composition are shown in Table 19 together with the properties of the drainage pavement mixture.

Comparative Example 24

An asphalt composition and a drainage pavement mixture were produced in the same manner as in Example 57 except that unmodified block copolymer P-20 was used instead of second-order modified block copolymer 2P-16. The properties of the asphalt composition and drainage pavement mixture are shown in Table 19.

TABLE 19

| | | Ex. 57 | Comp. Ex. 24 |
|---|---|---|---|
| Formulation of asphalt composition | Amount of block copolymer (part by weight) | 8 | 8 |
| | Amount of asphalt (part by weight) | 100 | 100 |
| Properties of asphalt composition | Softening temperature (° C.) | 88 | 84 |
| | Melt viscosity (cP) | 360 | 390 |
| | Penetration ratio (1/10 mm) | 35 | 38 |
| | Elongation (cm) | 65 | 63 |
| | Properties at low temperatures (−10° C.) Flexural stress (N/mm$^2$) | 9.7 | 6.7 |
| | Flexural strain (×10$^{-3}$) | 71 | 48 |
| | High temperature storage stability Difference in softening temperature (° C.) | 20 | 25 |
| Properties of drainage pavement mixture | Cantabro test Loss ratio (%) | 12 | 33 |
| | Wheel tracking test Dynamic stability (number/mm) | 7600 | 6000 |

From the results of Examples 47 to 57 and Comparative Examples 20 to 24, it was found that the asphalt composition of the present invention is excellent with respect not only to the balance of asphalt properties but also to high temperature storage stability.

EXAMPLE AND COMPARATIVE EXAMPLE CONCERNING THE CROSSLINKED PRODUCT OF THE MODIFIED BLOCK COPOLYMER

COMPOSITION (1) Modified Block Copolymer

The modified block copolymers used are as shown in Table 20.

The second-order modified block copolymer (2P-17) used in Example 58 was produced as follows. Living polymer P-21 was reacted with a modifier which was 1,3-dimethyl-2-imidazolidinone (first-order modifier: M1) (i.e., a first-order modification was performed), wherein the modifier was used in an equimolar amount, relative to n-butyllithium used in the polymerization, thereby obtaining a reaction mixture containing the resultant first-order modified block copolymer. The first-order modified block copolymer in the reaction mixture was then subjected to a hydrogenation reaction. To the resultant hydrogenation reaction mixture was added second-order modifier D1 in an amount of 1 mole, relative to one equivalent of the functional group of the first-order modified block copolymer, followed by a reaction (i.e., a second-order modification was performed), thereby obtaining a second-order modified block copolymer (i.e., 2P-17).

The first-order modified block copolymer (1P-34) used in Comparative Example 25 was produced in the same manner as in the above-described production of the second-order modified block copolymer 2P-17 except that a second-order modification was not performed.

(2) Components Used for Preparing the crosslinked Product

Silica: Finely dispersible silica HDK-N200 (manufactured and sold by WACKER ASAHIKASEI SILICONE CO., Ltd., Japan)

Polypropylene resin: Sun Allomer PC600S (manufactured and sold by Montell SDK Sunrise Ltd., Japan)

Paraffin oil: Diana process oil PW380 (manufactured and sold by Idemitsu Kosan Co., Ltd., Japan)

Organic peroxide: PERHEXA 25B (manufactured and sold by NOF CORPORATION, Japan)

Vulcanizing accelerator: Divinyl benzene (3) Measurement of Properties (Tensile Strength (MPa) and Tensile Elongation (%))

Tensile properties: The tensile properties are measured in accordance with JIS K6251 (in which a dumbbell No. 3 is used and the tensile stress rate is 500 mm/min).

Example 58 and Comparative Example 25

In Example 58 and Comparative Example 25, crosslinked products were produced in accordance with the formulations indicated in Table 20. 20 parts by weight of silica, 48 parts by weight of polypropylene and 72 parts by weight of paraffin oil, as well as 100 parts by weight of the modified block copolymer, were mixed together by means of a Henschel mixer. The resultant mixture was melt-kneaded and extruded by means of a 30 mm φ twin-screw extruder under conditions wherein the cylinder temperature was 220° C., thereby obtaining a composition. The obtained composition was then subjected to a dynamic crosslinking in the following manner. To the obtained composition was added a vulcanizing agent. The resultant mixture was melt-kneaded and extruded by means of a 30 mm φ twin-screw extruder to effect a vulcanization, thereby obtaining a crosslinked product.

The properties of the obtained crosslinked products are shown in Table 20.

TABLE 20

|  |  |  | Ex. 58 | Comp. Ex. 25 |
|---|---|---|---|---|
| Block copolymer | Type of modified block copolymer | | 2P-17 | 1P-34 |
| | Type of living polymer | | P-21 | P-21 |
| | First-order modification | First-order modifier (mol/Li) | M1 (1.0) | M1 (1.0) |
| | | Ratio of unmodified block copolymer fraction (wt %) | 25 | 25 |
| | Hydrogenation | Hydrogenation catalyst | II | II |
| | | Hydrogenation ratio (%) | 85 | 85 |
| | Second-order modification | Second-order modifier (mol/Li) | D1 (1.0) | — |
| | | Modification method | Melt-kneading method | — |
| Formulation of crosslinked product (part by weight) | Block copolymer | | 100 | 100 |
| | Silica | | 20 | 20 |
| | Polypropylene | | 48 | 48 |
| | Oil PW90 | | 72 | 72 |
| | Organic peroxide | | 0.5 | 0.5 |
| | Vulcanizing accelerator | | 4 | 4 |
| Properties of crosslinked product | Tensile strength (MPa) | | 8.5 | 7.0 |
| | Tensile elongation (%) | | 200 | 150 |

First-order modifier M1: 1,3-dimethyl-2-imidazolidinone
Second-order modifier D1: maleic anhydride Examples 59 to 64

In Examples 59 to 64, using the first-order modified block copolymers and second-order modified block copolymers shown in Table 21, resin compositions were produced in the same manner as in Examples 9 to 13 except that the formulations indicated in Table 22 were employed. The properties of the resin compositions produced are shown in Table 22 together with the formulations of the resin compositions.

TABLE 21

| | | | First-order modification | | | | Second-order modification | |
| --- | --- | --- | --- | --- | --- | --- | --- | --- |
| | | | First-order | Hydrogenation | | Molecular | Second-order | |
| | | Block copolymer | Modifier (mol/Li) | Hydrogenation catalyst | Hydrogenation ratio (%) | weight (Mw) (×10,000) | modifier (mol/Li) | Modification method |
| First-order modification | 1P-35 | P-22 | M1 (1.0) | II | 80 | 4.6 | — | — |
| | 1P-36 | P-23 | M1 (1.0) | II | 80 | 4.1 | — | — |

TABLE 21-continued

| | | First-order modification | | | | Second-order modification | |
| --- | --- | --- | --- | --- | --- | --- | --- |
| | | First-order | Hydrogenation | | Molecular | Second-order | |
| | Block copolymer | Modifier (mol/Li) | Hydrogenation catalyst | Hydrogenation ratio (%) | weight (Mw) (×10,000) | modifier (mol/Li) | Modification method |
| Second-order modification | 2P-18 | 1P-35 | — | — | — | — | D1 (2.0) | Melt-kneading method |
| | 2P-19 | 1P-36 | — | — | — | — | D1 (2.0) | Melt-kneading method |

First-order modifier M1: 1,3-dimethyl-2-imidazolidinone
Second-order modifier D1: maleic anhydride

TABLE 22

| | Formulation (part by weight) | | | Flexural modulus (MPa) | Izod impact strength (J/m) |
| --- | --- | --- | --- | --- | --- |
| | Functional group-containing resin | Block copolymer | Second-order modifier *1 | | |
| Ex. 59 | PET 80 | 2P-18 20 | — | 1730 | 340 |
| Ex. 60 | PET 80 | 2P-19 20 | — | 1710 | 370 |
| Ex. 61 | PET 80 | 1P-35 20 | D1 0.06 | 1700 | 370 |
| Ex. 62 | Polyamide 80 | 2P-18 20 | — | 1800 | 620 |
| Ex. 63 | Polyamide 80 | 2P-19 20 | — | 1780 | 500 |
| Ex. 64 | Polyamide 80 | 1P-36 20 | D1 0.06 | 1760 | 570 |

*1 Second-order modifier D1: maleic anhydride

Examples 65 and 66 and Comparative Example 26

In Examples 65 and 66 and Comparative Example 26, with respect to the second-order modified block copolymers shown in Table 23, the peeling strength was measured as follows. The second-order modified block copolymer was formed into a film having a thickness of about 100 μm. The polymer film was preheated on a substrate for 5 minutes at a predetermined temperature indicated in Table 24, and then pressed onto the substrate (load: 1 kg/cm$^2$) for 5 minutes so as to adhere the film onto the substrate (wherein an aluminum plate, a PET film and a canvas were individually used as a substrate). Then, the adhered polymer film was peeled off from the substrate at a peeling rate of 200 mm/min.

The results of the measurement of the peeling strength are shown in Table 24.

TABLE 23

| | | First-order modification | | Hydrogenation | | Second-order modification | |
| --- | --- | --- | --- | --- | --- | --- | --- |
| | Block copolymer | First-order modifier (mol/Li) *1 | | Hydrogenation catalyst | Hydrogenation ratio (%) | Second-order modifier (mol/Li) | Modification method |
| Second-order modification | 2P-20 | 1P-1 | — | — | — | D1 (1.0) | Melt-kneading method |
| | 2P-21 *2 | P-1 | M4 (1.0) | II | 98 | D1 (1.0) | Melt-kneading method |
| | 2P-22 *2 | P-1 | Propylene oxide (1.0) | II | 98 | D1 (1.0) | Melt-kneading method |

*1 First-order modifier M4: 1-methyl-2-pyrrolidone

*2 2P-21 and 2P-22 were produced as follows. P-1 was subjected to a first-order modification using a first-order modifier (indicated in Table 23) to obtain a first-order modified block copolymer. Then, the obtained first-order modified block copolymer was hydrogenated, followed by a second-order modification using a second-order modifier (indicated in Table 23), thereby obtaining a second-order modified block copolymer (2P-21 or 2P-22).

TABLE 24

| Block copolymer | Adhering temperature (° C.) | Peeling strength (gf/cm) | | |
|---|---|---|---|---|
| | | Aluminum plate (100 μm) | PET film (50 μm) | canvas |
| Ex. 65 | 2P-20 | 150 | — | 610 | — |
| | | 200 | 4010 | — | 4540 |
| Ex. 66 | 2P-21 | 150 | — | 550 | — |
| | | 200 | 2900 | — | 6330 |
| Comp. Ex. 26 | 2P-22 | 150 | — | 400 | — |
| | | 200 | 1170 | — | 3300 |

Example 67

A first-order modified block copolymer was produced in the same manner as in the production of first-order modified block copolymer 1P-12 (indicated in Table 5) except that living polymer P-8 was reacted with a modifier which was N-(1,3-dimethylbutylidene)-3-(triethoxysilyl)-1-propaneamine (modifier M5), wherein the modifier was used in an equimolar amount, relative to n-butyllithium used in the polymerization. Then, a flame retardant polymer composition was produced in the same manner as in Example 20 except that the above-produced first-order modified block copolymer was used instead of 1P-12. The produced flame retardant polymer composition had the same excellent properties (breaking strength, breaking elongation and oxygen index) as those of the flame retardant polymer composition obtained in Example 20.

INDUSTRIAL APPLICABILITY

The second-order modified block copolymer-containing polymer composition comprising the second-order modified block copolymer of the present invention as well as a thermoplastic resin and/or a rubbery polymer, exhibits an excellent balance of stiffness and impact resistance. By injection molding, extrusion molding or the like, this polymer composition can be formed into various shaped articles. The shaped articles can be advantageously used in various fields, such as the fields of automobile parts (interior and exterior parts for automobiles), various containers (such as food packaging), parts for household electrical appliances, parts for medical equipments, industrial parts, toys and the like. Further, by using the second-order modified block copolymer in combination with an appropriate component selected from various components, such as an inorganic filler, a tackifier, and an asphalt, there can be obtained a polymer composition having excellent properties suitable for various application fields, depending on the selected component.

The invention claimed is:

1. A polymer composition comprising:
   1 to 99% by weight, based on the total weight of components (I-1) and (II), of (I-1) a semimodified block copolymer comprising:
      a base block copolymer comprising at least one polymer block (A) comprised mainly of vinyl aromatic hydrocarbon monomer units and at least one polymer block (B) comprised mainly of conjugated diene monomer units, the amounts of said vinyl aromatic hydrocarbon monomer units and said conjugated diene monomer units in said base block copolymer being, respectively, 5 to 95% by weight and 95 to 5% by weight, based on the total weight of said vinyl aromatic hydrocarbon monomer units and said conjugated diene monomer units, and
      a functional group-containing first-order modifier group bonded to said base block copolymer,
      said base block copolymer being unhydrogenated or at least partially hydrogenated,
      wherein said semimodified block copolymer (I-1) is represented by a formula selected from the group consisting of the below-mentioned formulae (6) to (10),
   99 to 1% by weight, based on the total weight of components (I-1) and (II), of (II) at least one polymer selected from the group consisting of a thermoplastic resin and a rubbery polymer, and
   0.01 to 20 parts by weight, relative to 100 parts by weight of the total of components (I-1) and (II), of (III) a second-order modifier having a functional group which is reactive to said functional group of said first-order modifier group of said semimodified block copolymer (I-1),

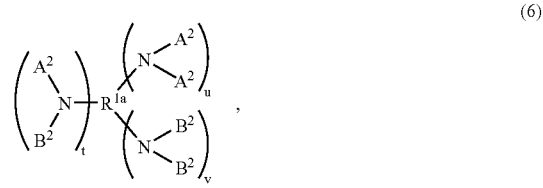
(6)

(7)

$C^2-NR^3-D^2$, (8)

$C^2-D^2$, and (9)

$E^2-F^2$ (10)

wherein:

$A^2$ represents a unit which is represented by any one of the following formulae (a-1) and (b-1):

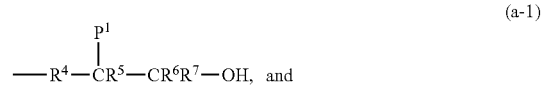

$-R^4-CR^5-CR^6R^7-OH$, and (a-1)

$-R^4-CR^5-CR^6R^7-P^1$, (b-1)
   |
   OH $B^2$ represents a unit which is represented by the following formula (c-1):

$-R^4-CR^5-CR^6R^7$, (c-1)
        \ /
         O $C^2$ represents a unit which is represented by any one of the following formulae (d-1) and (e-1):

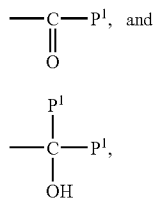

$D^2$ represents a unit which is represented by the following formula (f-1):

$$-R^8-NHR^3, \quad (f-1)$$

$E^2$ represents a unit which is represented by the following formula (g-1):

$$-R^9-P^1, \text{ and} \quad (g-1)$$

$F^2$ represents a unit which is represented by any one of the following formulae (h-1) to (j-1):

$$-NH-R^{10}-Si(OR^{11})_3, \quad (h-1)$$

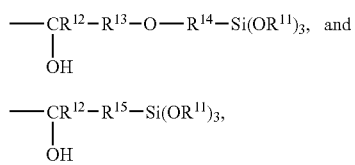

wherein, in the formulae (6) to (8) and (a-1) to (j-1):
N represents a nitrogen atom, Si represents a silicon atom, O represents an oxygen atom, C represents a carbon atom, and H represents a hydrogen atom,
$P^1$ represents the base block copolymer,
$R^{1a}$ represents a trivalent aliphatic $C_1$-$C_{48}$ hydrocarbon group,
each of $R^{1b}$, $R^4$, $R^8$ to $R^{10}$ and $R^{13}$ to $R^{20}$ independently represents a $C_1$-$C_{48}$ alkylene group,
each of $R^2$, $R^3$ and $R^{11}$ independently represents a $C_1$-$C_{48}$ alkyl group, a $C_6$-$C_{48}$ aryl group, an alkylaryl group comprised of $C_1$-$C_{48}$ alkyl and $C_6$-$C_{48}$ aryl, an aralkyl group comprised of $C_1$-$C_{48}$ alkyl and $C_6$-$C_{48}$ aryl, or a $C_3$-$C_{48}$ cycloalkyl group,
wherein each of $R^{1a}$, $R^{1b}$, $R^3$, $R^4$, $R^8$ to $R^{10}$ and $R^{13}$ to $R^{15}$ optionally independently has at least one functional group selected from the group consisting of a hydroxyl group, an epoxy group, an amino group, a silanol group and a $C_1$-$C_{24}$ alkoxysilane group,
each of $R^5$ to $R^7$ and $R^{12}$ independently represents a hydrogen atom, a $C_1$-$C_{48}$ alkyl group, a $C_6$-$C_{48}$ aryl group, an alkylaryl group comprised of $C_1$-$C_{48}$ alkyl and $C_6$-$C_{48}$ aryl, an aralkyl group comprised of $C_1$-$C_{48}$ alkyl and $C_6$-$C_{48}$ aryl, or a $C_3$-$C_{48}$ cycloalkyl group,
wherein each of $R^{1a}$, $R^{1b}$, $R^2$ to $R^4$ and $R^8$ to $R^{15}$ optionally independently has bonded thereto at least one atom selected from the group consisting of an oxygen atom, a nitrogen atom, a sulfur atom and a silicon atom, said at least one atom being bonded in a form other than a hydroxyl group, an epoxy group, an amino group, a silanol group and an alkoxysilane group, and
each of t, u, v and x is independently an integer of 0 or more, provided that both t and u are not simultaneously 0, and w is an integer of 1 or more.

2. The polymer composition according to claim 1, wherein said thermoplastic resin in component (II) is a functional group-containing thermoplastic resin and said rubbery polymer in component (II) is a functional group-containing rubbery polymer.

3. The polymer composition according to claim 2, wherein:
said functional group-containing thermoplastic resin comprises at least one member selected from the group consisting of a polyester resin, a polyamide resin, a polycarbonate resin, a polyurethane resin, a polyphenylene ether resin and a polyoxymethylene resin, and
said functional group-containing rubbery polymer comprises at least one member selected from the group consisting of an olefin elastomer and a styrene elastomer each of which contains at least one functional group selected from the group consisting of an acid anhydride group, a carboxyl group, a hydroxyl group, an epoxy group and an amino group.

4. The polymer composition according to claim 2, wherein said functional group of said second-order modifier (III) is reactive to both said functional group of said first-order modifier group of said semimodified block copolymer (I-1) and said functional group of said component (II).

5. A polymer composition comprising:
1 to 99% by weight, based on the total weight of components (I-1) and (II), of (I-1) a semimodified block copolymer comprising:
a base block copolymer comprising at least one polymer block (A) comprised mainly of vinyl aromatic hydrocarbon monomer units and at least one polymer block (B) comprised mainly of conjugated diene monomer units, the amounts of said vinyl aromatic hydrocarbon monomer units and said conjugated diene monomer units in said base block copolymer being, respectively, 5 to 95% by weight and 95 to 5% by weight, based on the total weight of said vinyl aromatic hydrocarbon monomer units and said conjugated diene monomer units, and
a functional group-containing first-order modifier group bonded to said base block copolymer,
said base block copolvmer being unhydrogenated or at least partially hydrogenated,
wherein said semimodified block copolymer (I-1) is represented by a formula selected from the group consisting of the below-mentioned formulae (6) to (10),
99 to 1% by weight, based on the total weight of components (I-1) and (II), of (II) at least one nolymer selected from the group consisting of a thermoplastic resin and a rubbery polymer, and
0.01 to 20 parts by weight, relative to 100 parts by weight of the total of components (I-1) and (II), of (III) a second-order modifier having a functional group which is reactive to said functional group of said first-order modifier group of said semimodified block copolymer (I-1),

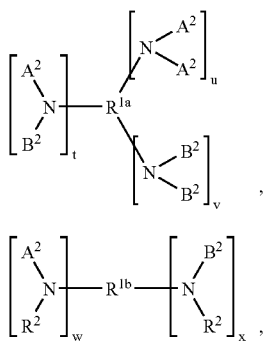                                    (6)

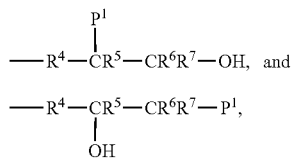                                    (7)

$C^2-NR^3-D^2$,                                    (8)

$C^2-D^2$, and                                    (9)

$E^2-F^2$                                    (10)

wherein:

$A^2$ represents a unit which is represented by any one of the following formulae (a-1) and (b-1):

$$—R^4—\underset{\underset{P^1}{|}}{C}R^5—CR^6R^7—OH, \text{ and} \quad (a\text{-}1)$$

$$—R^4—\underset{\underset{OH}{|}}{C}R^5—CR^6R^7—P^1, \quad (b\text{-}1)$$

$B^2$ represents a unit which is represented by the following formula (c-1):

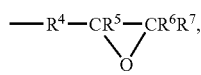                                    (c-1)

$C^2$ represents a unit which is represented by any one of the following formulae (d-1) and (e-1)

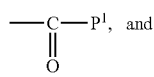                                    (d-1)

$$—\underset{\underset{OH}{|}}{\overset{\overset{P^1}{|}}{C}}—P^1, \quad (e\text{-}1)$$

$D^2$ represents a unit which is represented by the following formula (f-1):

$—R^8—NHR^3$,                                    (f-1)

$E^2$ represents a unit which is represented by the following formula (g-1):

$—R^9—P^1$, and $F^2$ represents a unit which is represented by any one of the following formulae (h-1) to (j-1):

$—NHR—R^{10}—Si(OR^{11})_3$,                                    (h-1)

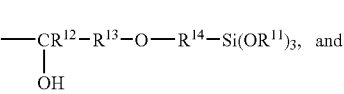                                    (i-1)

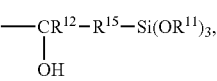                                    (j-1)

wherein, in the formulae (6) to (8) and (a-1) to (j-1):
N represents a nitrogen atom, Si represents a silicon atom, O represents an oxygen atom, C represents a carbon atom, and H represents a hydrogen atom,
$P^1$ represents the base block copolymer,
$R^{1a}$ represents a trivalent aliphatic $C_1$-$C_{48}$ hydrocarbon group,
each of $R^{1b}$, $R^4$, $R_8$ to $R^{10}$ and $R^{13}$ to $R^{20}$ independently represents a $C_1$-$C_{48}$ alkylene group,
each of $R^2$, $R^3$ and $R^{11}$ independently represents a $C_1$-$C_{48}$ alkyl group, a $C_6$-$C_{48}$ aryl group, an alkylaryl group comprised of $C_1$-$C_{48}$ alkyl and $C_6$-$C_{48}$ aryl, an aralkyl group comprised of $C_1$-$C_{48}$ alkyl and $C_6$-$C_{48}$ aryl, or a $C_3$-$C_{48}$ cycloalkyl group,
wherein each of $R^{1a}$, $R^{1b}$, $R^3$, $R^4$, $R^8$ to $R^{10}$ and $R^{13}$ to $R^{15}$ optionally independently has at least one functional group selected from the group consisting of a hydroxyl group, an epoxy group, an amino group, a silanol group and a $C_1$-$C_{24}$ alkoxysilane group,
each of $R^5$ to $R^7$ and $R^{12}$ independently represents a hydrogen atom, a $C_1$-$C_{48}$ alkyl group, a $C_6$-$C_{48}$ aryl group, an alkylaryl group comprised of $C_1$-$C_{48}$ alkyl and $C_6$-$C_{48}$ aryl, an aralkyl group comprised of $C_1$-$C_{48}$ alkyl and $C_6$-$C_{48}$ aryl, or a $C_3$-$C_{48}$ cycloalkyl group,
wherein each of $R^{1a}$, $R^{1b}$, $R^2$ to $R^4$ and $R^8$ to $R^{15}$ optionally independently has bonded thereto at least one atom selected from the group consisting of an oxygen atom, a nitrogen atom, a sulfur atom and a silicon atom, said at least one atom being bonded in a form other than a hydroxyl group, an epoxy group, an amino group, a silanol group and an alkoxysilane group, and
each of t, u, v and x is independently an integer of 0 or more, provided that both t and u are not simultaneously 0, and w is an integer of 1 or more,
wherein said functional group of said second-order modifier (III) comprises at least one member selected from the group consisting of a carboxyl group, an acid anhydride group, an isocyanate group, an epoxy group and an alkoxysilane group.

6. A flame retardant polymer composition comprising: 100 parts by weight of the polymer composition of claim 1, and 10 to 2000 parts by weight of (VI) an inorganic filler.

7. A crosslinked product obtained by subjecting the polymer composition of claim 1 to melt-kneading in the presence of a vulcanizing agent.

8. The polymer composition according to claim 5, wherein said functional group of said second-order modifier (III) comprises at least one member selected from the group consisting of an acid anhydride group and an epoxy group.

9. The polymer composition according to claim 5, wherein said second-order modifier (III) is at least one selected from the group consisting of maleic anhydride, itaconic anhydride, pyromellitic anhydride, cis-4-cyclohexane-1,2-dicarboxylic acid anhydride, 1,2,4,5-benzenetetracarboxylic acid dianhydride, 5-(2,5-dioxytetrahydroxyfuryl)-3-methyl-3-cyclohexene-1,2-dicarboxylic acid anhydride, tetraglycidyl-1,3-bisaminomethyl-cyclohexane, tetraglycidyl-m-xylenediamine, diglycidylaniline, ethylene glycol diglycidyl, propylene glycol diglycidyl, terephthalic acid diglycidyl ester acrylate, tetraglycidyl-m-xylene-diamine, tetraglycidyl-1,3-bisaminomethylcyclohexane, tetraglycidyl-p-phenylenediamine, tetraglycidyldiaminodiphenylmethane, diglycidylaniline, diglycidyl-o-toluidine, 4,4'-diglycidyl-diphenylmethylamine, 4,4'-diglycidyl-dibenzylmethylamine, diglycidylaminomethylcyclohexane, γ-glycidoxyethyltrimethoxysilane, γ-glycidoxypropyltrimethoxysilane, γ-glycidoxybutyltrimethoxysilane, γ-glycidoxypropyltriethoxysilane, γ-glycidoxypropyltripropoxysilane, γ-glycidoxypropyltributoxysilane, γ-glycidoxypropyltriphenoxysilane, γ-glycidoxypropylmethyldimethoxysilane, γ-glycidoxypropylethyldimethoxysilane, γ-glycidoxypropylethyldiethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropyldimethylmethoxysilane, γ-glycidoxypropyldiethylethoxysilane, γ-glycidoxypropyldimethylethoxysilane, γ-glycidoxypropyldimethylphenoxysilane, γ-glycidoxypropyldiethylmethoxysilane, γ-glycidoxypropylmethyldiisopropeneoxysilane, bis(γ-glycidoxypropyl)dimethoxysilane, bis(γ-glycidoxypropyl)diethoxysilane, bis(γ-glycidoxypropyl)dipropoxysilane, bis(γ-glycidoxypropyl)dibutoxysilane, bis(γ-glycidoxypropyl)diphenoxysilane, bis(γ-glycidoxypropyl)methylmethoxysilane, bis(γ-glycidoxypropyl)methylethoxysilane, bis(γ-glycidoxypropyl)methylpropoxysilane, bis(γ-glycidoxypropyl)methylbutoxysilane, bis(γ-glycidoxypropyl)methylphenoxysilane, tris(γ-glycidoxypropyl)methoxysilane, γ-methacryloxypropyltrimethoxysilane, γ-methacryloxypropyltriethoxysilane, γ-methacryloxymethyltrimethoxysilane, γ-methacryloxyethyltriethoxysilane, bis(γ-methacryloxypropyl)dimethoxysilane, tris(γ-methacryloxypropyl)methoxysilane, β-(3,4-epoxycyclohexyl)ethyltrimethoxysilane, β-(3,4-epoxycyclohexyl)ethyltriethoxysilane, β-(3,4-epoxycyclohexyl)ethyltripropoxysilane, β-(3,4-epoxycyclohexyl)ethyltributoxysilane, β-(3,4-epoxycyclohexyl)ethyltriphenoxysilane, β-(3,4-epoxycyclohexyl)propyltrimethoxysilane, β-(3,4-epoxycyclohexyl)ethylmethyldimethoxysilane, β-(3,4-epoxycyclohexyl)ethylethyldimethoxysilane, β-(3,4-epoxycyclohexyl)ethylethyldiethoxysilane, β-(3,4-epoxycyclohexyl)ethylmethyldiethoxysilane, β-(3,4-epoxycyclohexyl)ethylmethyldipropoxysilane, β-(3,4-epoxycyclohexyl)ethylmethyldibutoxysilane, β-(3,4-epoxycyclohexyl)ethylmethyldiphenoxysilane, β-(3,4-epoxycyclohexyl)ethyldimethylmethoxysilane, β-(3,4-epoxycyclohexyl)ethyldiethylethoxysilane, β-(3,4-epoxycyclohexyl)ethyldimethyethoxysilane, β-(3,4-epoxycyclohexyl)ethyldimethylpropoxysilane, β-(3,4-epoxycyclohexyl)ethyldimethylbutoxysilane, β-(3,4-epoxycyclohexyl)ethyldimethylphenoxysilane, β-(3,4-epoxycyclohexyl)ethyldiethylmethoxysilane, β-(3,4-epoxycyclohexyl)ethylmethyldiisopropeneoxysilane and N-(1,3-dimethylbutylidene)-3-(triethoxysilyl)-1-propane-amine.

* * * * *